United States Patent
Khanna

(10) Patent No.: US 12,516,097 B2
(45) Date of Patent: Jan. 6, 2026

(54) GENE THERAPIES FOR STARGARDT DISEASE (ABCA4)

(71) Applicant: University of Massachusetts, Boston, MA (US)

(72) Inventor: Hemant Khanna, Worcester, MA (US)

(73) Assignee: University of Massachusetts, Westborough, MA (US)

( * ) Notice: Subject to any disclaimer, the term of this patent is extended or adjusted under 35 U.S.C. 154(b) by 1087 days.

(21) Appl. No.: 17/604,556

(22) PCT Filed: Apr. 16, 2020

(86) PCT No.: PCT/US2020/028504
§ 371 (c)(1),
(2) Date: Oct. 18, 2021

(87) PCT Pub. No.: WO2020/214809
PCT Pub. Date: Oct. 22, 2020

(65) Prior Publication Data
US 2022/0177539 A1    Jun. 9, 2022

Related U.S. Application Data

(60) Provisional application No. 62/836,493, filed on Apr. 19, 2019.

(51) Int. Cl.
*C07K 14/705* (2006.01)
*A61K 48/00* (2006.01)
*C12N 15/86* (2006.01)

(52) U.S. Cl.
CPC ........ *C07K 14/705* (2013.01); *A61K 48/0058* (2013.01); *C12N 15/86* (2013.01); *C12N 2750/14143* (2013.01)

(58) Field of Classification Search
CPC ............... C07K 14/705; A61K 48/00
See application file for complete search history.

(56) References Cited

U.S. PATENT DOCUMENTS

| | | | |
|---|---|---|---|
| 5,399,363 A | 3/1995 | Liversidge et al. | |
| 5,543,158 A | 8/1996 | Gref et al. | |
| 5,552,157 A | 9/1996 | Yagi et al. | |
| 5,565,213 A | 10/1996 | Nakamori et al. | |
| 5,567,434 A | 10/1996 | Szoka, Jr. | |
| 5,641,515 A | 6/1997 | Ramtoola | |
| 5,738,868 A | 4/1998 | Shinkarenko | |
| 5,741,516 A | 4/1998 | Webb et al. | |
| 5,795,587 A | 8/1998 | Gao et al. | |
| 2003/0138772 A1 | 7/2003 | Gao et al. | |
| 2007/0042462 A1* | 2/2007 | Hildinger | C12P 21/06 435/69.1 |
| 2009/0214478 A1 | 8/2009 | Auricchio et al. | |
| 2015/0259395 A1 | 9/2015 | Chalberg et al. | |
| 2018/0369412 A1 | 12/2018 | Bennett et al. | |
| 2024/0207450 A1 | 6/2024 | Khanna | |

FOREIGN PATENT DOCUMENTS

| | | |
|---|---|---|
| CN | 106414474 A | 2/2017 |
| JP | 2017-510296 A | 4/2017 |
| WO | WO 2009/134418 A2 | 11/2009 |
| WO | WO 2015/142941 A1 | 9/2015 |
| WO | WO 2018/109011 A1 | 6/2018 |
| WO | WO 2018/157129 A1 | 8/2018 |
| WO | WO 2020/214809 A2 | 10/2020 |

OTHER PUBLICATIONS

Auricchio et al. (2015) "Gene therapy of ABCA4-associated diseases" Cold Spring Harbor perspectives in medicine, 5(5), a017301, 9 pages. (Year: 2015).*
Natkunarajah et al. (2008) "Assessment of ocular transduction using single-stranded and self-complementary recombinant adeno-associated virus serotype 2/8" Gene therapy, 15(6), 463-467. (Year: 2008).*
Wang et al. (2003) "Rapid and highly efficient transduction by double-stranded adeno-associated virus vectors in vitro and in vivo" Gene therapy, 10(26), 2105-2111. (Year: 2003).*
Invitation to Pay Additional Fees for Application No. PCT/US2020/028504, mailed Jul. 14, 2020.
International Search Report and Written Opinion for Application No. PCT/US2020/028504, mailed Oct. 14, 2020.
International Preliminary Report on Patentability for Application No. PCT/US2020/028504, mailed Oct. 28, 2021.
[No Author Listed], ABCA4 variant protein [*Homo spaiens*]. Genbank Acc. No. BAE06122.2. Sep. 19, 2015. Retrieved from https://www.ncbi.nlm.nih.gov/protein/BAE06122.2/. 3 pages.
[No Author Listed], *Homo sapiens* ATP binding cassette subfamily A member 4 (ABCA4), mRNA. NCBI Ref Seq No. NM_00350.3. Apr. 19, 2022. Retrieved from https://www.ncbi.nlm.nih.gov/nuccore/NM_000350.3/. 12 pages.
[No Author Listed], retinal-specific phospholipid-transporting ATPase ABCA4 [*Homo sapiens*]. NCBI Ref Seq No. NP_000341.2. Apr. 19, 2022. Retrieved from https://www.ncbi.nlm.nih.gov/protein/np_000341.2. 5 pages.
Bauwens et al., ABCA4-associated disease as a model for missing heritability in autosomal recessive disorders: novel noncoding splice, cis-regulatory, structural, and recurrent hypomorphic variants. Genet Med. Aug. 2019;21(8):1761-1771. doi: 10.1038/s41436-018-0420-y. Epub Jan. 23, 2019.

(Continued)

*Primary Examiner* — James Joseph Graber
(74) *Attorney, Agent, or Firm* — Wolf, Greenfield & Sacks, P.C.

(57) ABSTRACT

Aspects of the disclosure relate to compositions and methods useful for delivering minigenes to a subject. Accordingly, the disclosure is based, in part, on isolated nucleic acids and gene therapy vectors, such as viral (e.g., rAAV) vectors, comprising one or more gene fragments encoding a therapeutic gene product, such as a protein or peptide (e.g., a minigene). In some embodiments, the disclosure relates to gene therapy vectors encoding a ABCA4 protein (e.g., the gene product of ABCA4 gene) or a portion thereof. In some embodiments, compositions described by the disclosure are useful for treating diseases associated with mutations in the ABCA4 gene, for example Stargardt disease.

18 Claims, 5 Drawing Sheets
Specification includes a Sequence Listing.

(56) References Cited

OTHER PUBLICATIONS

Mammalian Gene Collection Program Team, Generation and initial analysis of more than 15,000 full-length human and mouse cDNA sequences. Proc Natl Acad Sci U S A. Dec. 24, 2002;99(26):16899-903. doi: 10.1073/pnas.242603899. Epub Dec. 11, 2002.

Plantier et al., A factor VIII minigene comprising the truncated intron I of factor IX highly improves the in vitro production of factor VIII. Thromb Haemost. Aug. 2001;86(2):596-603.

Sangermano et al., ABCA4 midigenes reveal the full splice spectrum of all reported noncanonical splice site variants in Stargardt disease. Genome Res. Jan. 2018;28(1):100-110. doi: 10.1101/gr.226621.117. Epub Nov. 21, 2017.

Schulz et al., Mutation Spectrum of the ABCA4 Gene in 335 Stargardt Disease Patients From a Multicenter German Cohort-Impact of Selected Deep Intronic Variants and Common SNPs. Invest Ophthalmol Vis Sci. Jan. 1, 2017;58(1):394-403. doi: 10.1167/iovs.16-19936.

Xiao et al., Rescue of the albino phenotype by introducing a functional tyrosinase minigene into Kunming albino mice. World J Gastroenterol. Jan. 14, 2007;13(2):244-9. doi: 10.3748/wjg.v13.i2.244.

Extended European Search Report for Application No. 20791568.7, mailed Dec. 21, 2022.

Invitation to Pay Additional Fees for Application No. PCT/US2022/026172, mailed Jul. 19, 2022.

International Search Report and Written Opinion for Application No. PCT/US2022/026172, mailed Sep. 29, 2022.

International Preliminary Report on Patentability for Application No. PCT/US2022/026172, mailed Nov. 9, 2023.

Dyka et al., Dual ABCA4-AAV Vector Treatment Reduces Pathogenic Retinal A2E Accumulation in a Mouse Model of Autosomal Recessive Stargardt Disease. Hum Gene Ther. Nov. 2019;30(11):1361-1370. doi: 10.1089/hum.2019.132. Epub Sep. 30, 2019.

Extended European Search Report for Application No. 22796493.9, mailed Mar. 10, 2025.

Al-Khuzaei et al., An Overview of the Genetics of ABCA4 Retinopathies, an Evolving Story. Genes (Basel). Aug. 13, 2021;12(8):1241. doi: 10.3390/genes12081241.

Kim et al., Retinal Photoreceptor Layer Thickness has Disease Specificity and Distinguishes Predicted FTLD-Tau from Biomarker Determined Alzheimer's Disease. Neurobiol Aging. Author manuscript; available in PMC: May 1, 2024. Published in final edited form as: Neurobiol Aging. Feb. 1, 2023;125:74-82. doi: 10.1016/j.neurobiolaging.2023.01.015.

Moreno-Garcia et al., An Overview of the Role of Lipofuscin in Age-Related Neurodegeneration. Front Neurosci. Jul. 5, 2018;12:464. doi: 10.3389/fnins.2018.00464. eCollection 2018.

Różanowska et al., Comparison of Antioxidant Properties of Dehydrolutein with Lutein and Zeaxanthin, and their Effects on Cultured Retinal Pigment Epithelial Cells. Antioxidants (Basel). May 10, 2021;10(5):753. doi: 10.3390/antiox10050753.

Zhao et al., Outer Retinal Layer Thickness Changes in White Matter Hyperintensity and Parkinson's Disease. Front Neurosci. Sep. 14, 2021;15:741651. doi: 10.3389/fnins.2021.741651. eCollection 2021.

\* cited by examiner

SEQUENCE LISTING

<160> NUMBER OF SEQ ID NOS: 24

<210> SEQ ID NO 1
<211> LENGTH: 7328
<212> TYPE: DNA
<213> ORGANISM: Homo sapiens

<400> SEQUENCE: 1

```
ggacacagcg tccggagcca gaggcgctct taacggcgtt tatgtccttt gctgtctgag      60
gggcctcagc tctgaccaat ctggtcttcg tgtggtcatt agcatgggct tcgtgagaca     120
gatacagctt ttgctctgga agaactggac cctgcggaaa aggcaaaaga ttcgctttgt     180
ggtggaactc gtgtggcctt tatctttatt tctggtcttg atctggttaa ggaatgccaa     240
cccactctac agccatcatg aatgccattt ccccaacaag gcgatgccct cagcaggaat     300
gctgccgtgg ctccagggga tcttctgcaa tgtgaacaat ccctgttttc aaagccccac     360
cccaggagaa tctcctggaa ttgtgtcaaa ctataacaac tccatcttgg caagggtata     420
tcgagatttt caagaactcc tcatgaatgc accagagagc cagcaccttg ccgtatttg      480 gacagagcta cacatcttgt cccaattcat ggacaccctc cggactcacc cggagagaat     540
tgcaggaaga ggaatacgaa taagggatat cttgaaagat gaagaaacac tgacactatt     600
tctcattaaa aacatcggcc tgtctgactc agtggtctac cttctgatca actctcaagt     660
ccgtccagag cagttcgctc atggagtccc ggacctggcg ctgaaggaca tcgcctgcag     720
cgaggccctc ctggagcgct tcatcatctt cagccagaga cgcggggcaa agacggtgcg     780
ctatgccctg tgctccctct cccagggcac cctacagtgg atagaagaca ctctgtatgc     840
caacgtggac ttcttcaagc tcttccgtgt gcttcccaca ctcctagaca gccgttctca     900
aggtatcaat ctgagatctt ggggaggaat attatctgat atgtcaccaa gaattcaaga     960
gtttatccat cggccgagta tgcaggactt gctgtgggtg accaggcccc tcatgcagaa    1020
tggtggtcca gagacccttta caaagctgat gggcatcctg tctgacctcc tgtgtggcta    1080
ccccgaggga ggtggctctc gggtgctctc cttcaactgg tatgaagaca ataactataa    1140
ggcctttctg gggattgact ccacaaggaa ggatcctatc tattcttatg acagaagaac    1200
aacatccttt tgtaatgcat tgatccagag cctggagtca atcctttaa ccaaaatcgc     1260 ttggagggcg gcaaagcctt tgctgatggg aaaaatcctg tacactcctg attcacctgc    1320
agcacgaagg atactgaaga atgccaactc aactttttgaa gaactggaac acgttaggaa    1380
gttggtcaaa gcctgggaag aagtagggcc ccagatctgg tacttctttg acaacagcac    1440
acagatgaac atgatcagag ataccctggg gaacccaaca gtaaaagact ttttgaatag    1500
gcagcttggt gaagaaggta ttactgctga agccatccta aacttcctct acaagggccc    1560
tcgggaaagc caggctgacg acatggccaa cttcgactgg agggacatat ttaacatcac    1620
tgatcgcacc ctccgcctgg tcaatcaata cctggagtgc ttggtcctgg ataagtttga    1680
aagctacaat gatgaaactc agctcaccca acgtgccctc tctctactgg aggaaaacat    1740
gttctgggcc ggagtggtat tccctgacat gtatccctgg accagctctc taccacccca    1800
cgtgaagtat aagatccgaa tggacataga cgtggtggag aaaaccaata agattaaaga    1860
caggtattgg gattctggtc ccagagctga tcccgtggaa gatttccggt acatctgggg    1920
cgggtttgcc tatctgcagg acatggttga acagggggatc acaaggagcc aggtgcaggc    1980
ggaggctcca gttggaatct acctccagca gatgccctac ccctgcttcg tggacgattc    2040
tttcatgatc atcctgaacc gctgtttccc tatcttcatg gtgctggcat ggatctactc    2100
```

```
tgtctccatg actgtgaaga gcatcgtctt ggagaaggag ttgcgactga aggagacctt    2160
gaaaaatcag ggtgtctcca atgcagtgat ttggtgtacc tggttcctgg acagcttctc    2220
catcatgtcg atgagcatct tcctcctgac gatattcatc atgcatggaa gaatcctaca    2280
ttacagcgac ccattcatcc tcttcctgtt cttgttggct ttctccactg ccaccatcat    2340
gctgtgcttt ctgctcagca ccttcttctc caaggccagt ctggcagcag cctgtagtgg    2400
tgtcatctat ttcaccctct acctgccaca catcctgtgc ttcgcctggc aggaccgcat    2460
gaccgctgag ctgaagaagg ctgtgagctt actgtctccg gtggcatttg gatttggcac    2520
tgagtacctg gttcgctttg aagagcaagg cctggggctg cagtgagcag acatcgggaa    2580
cagtcccacg gaaggggacg aattcagctt cctgctgtcc atgcagatga tgctccttga    2640
tgctgctgtc tatggcttac tcgcttggta ccttgatcag gtgtttccag agactatgg    2700 aaccccactt ccttggtact ttcttctaca agagtcgtat tggcttggcg gtgaagggtg    2760
ttcaaccaga gaagaaagag ccctggaaaa gaccgagccc ctaacagagg aaacggagga    2820
tccagagcac ccagaaggaa tacacgactc cttctttgaa cgtgagcatc cagggtgggt    2880
tcctggggta tgcgtgaaga atctggtaaa gattttgag ccctgtggcc ggccagctgt    2940
ggaccgtctg aacatcacct tctacgagaa ccagatcacc gcattcctgg gccacaatgg    3000
agctgggaaa accaccacct tgtccatcct gacgggtctg ttgccaccaa cctctgggac    3060
tgtgctcgtt gggggaaggg acattgaaac cagcctggat gcagtccggc agagccttgg    3120
catgtgtcca cagcacaaca tcctgttcca ccacctcacg gtggctgagc acatgctgtt    3180
ctatgcccag ctgaaaggaa agtcccagga ggaggcccag ctggagatgg aagccatgtt    3240
ggaggacaca ggcctccacc acaagcggaa tgaagaggct caggacctat caggtggcat    3300
gcagagaaag ctgtcggttg ccattgcctt tgtgggagat gccaaggtgg tgattctgga    3360
cgaacccacc tctggggtgg acccttactc gagacgctca atctgggatc tgctcctgaa    3420
gtatcgctca ggcagaacca tcatcatgtc cactcaccac atggacgagg ccgacctcct    3480
tggggaccgc attgccatca ttgcccaggg aaggctctac tgctcaggca ccccactctt    3540
cctgaagaac tgctttggca caggcttgta cttaaccttg gtgcgcaaga tgaaaaacat    3600
ccagagccaa aggaaaggca gtgagggac ctgcagctgc tcgtctaagg gtttctccac    3660
cacgtgtcca gcccacgtcg atgacctaac tccagaacaa gtcctggatg gggatgtaaa    3720
tgagctgatg gatgtagttc tccaccatgt tccagaggca aagctggtgg agtgcattgg    3780
tcaagaactt atcttccttc ttccaaataa gaacttcaag cacagagcat atgccagcct    3840
tttcagagag ctggaggaga cgctggctga ccttggtctc agcagttttg gaatttctga    3900
cactcccctg gaagagattt ttctgaaggt cacggaggat tctgattcag gacctctgtt    3960
tgcgggtggc gctcagcaga aaagagaaaa cgtcaacccc cgacaccct gcttgggtcc    4020 cagagagaag gctggacaga caccccagga ctccaatgtc tgctcccag gggcgccggc    4080 tgctcaccca gagggccagc ctccccaga gccagagtgc ccaggcccgc agctcaacac    4140
ggggacacag ctggtcctcc agcatgtgca ggcgctgctg gtcaagagat tccaacacac    4200
catccgcagc cacaaggact tcctggcgca gatcgtgctc ccggctacct tgtgtttttt    4260
ggctctgatg ctttctattg ttatccctcc ttttggcgaa taccccgctt tgacccttca    4320
cccctggata tatgggcagc agtacacctt cttcagcatg gatgaaccag gcagtgagca    4380
gttcacggta cttgcagacg tcctcctgaa taagccaggc tttggcaacc gctgcctgaa    4440
```

```
ggaagggtgg cttccggagt acccctgtgg caactcaaca ccctggaaga ctccttctgt    4500
gtccccaaac atcacccagc tgttccagaa gcagaaatgg acacaggtca acccttcacc    4560
atcctgcagg tgcagcacca gggagaagct caccatgctg ccagagtgcc ccgagggtgc    4620
cgggggcctc ccgcccccc agagaacaca gcgcagcacg gaaattctac aagacctgac     4680
ggacaggaac atctccgact tcttggtaaa aacgtatcct gctcttataa gaagcagctt    4740
aaagagcaaa ttctgggtca tgaacagag gtatggagga atttccattg gaggaaagct     4800
cccagtcgtc cccatcacgg gggaagcact tgttgggttt taagcgacc ttggccggat     4860 catgaatgtg agcgggggcc ctatcactag agaggcctct aaagaaatac ctgatttcct    4920
taaacatcta gaaactgaag acaacattaa ggtgtggttt aataacaaag gctggcatgc    4980
cctggtcagc tttctcaatg tggcccacaa cgccatctta cgggccagcc tgcctaagga    5040
caggagcccc gaggagtatg aatcaccgt cattagccaa cccctgaacc tgaccaagga     5100
gcagctctca gagattacag tgctgaccac ttcagtggat gctgtggttg ccatctgcgt    5160
gattttctcc atgtccttcg tcccagccag ctttgtcctt tatttgatcc aggagcgggt    5220
gaacaaatcc aagcacctcc agtttatcag tggagtgagc cccaccacct actgggtgac    5280
caacttcctc tgggacatca tgaattattc cgtgagtgct gggctggtgg tgggcatctt    5340
catcgggttt cagaagaaag cctacacttc tccagaaaac cttcctgccc ttgtggcact    5400
gctcctgctg tatggatggg cggtcattcc catgatgtac ccagcatcct tcctgtttga    5460
tgtccccagc acagcctatg tggctttatc ttgtgctaat ctgttcatcg gcatcaacag    5520
cagtgctatt accttcatct tggaattatt tgagaataac cggacgctgc tcaggttcaa    5580
cgccgtgctg aggaagctgc tcattgtctt cccccacttc tgcctgggcc ggggcctcat    5640
tgaccttgca ctgagccagg ctgtgacaga tgtctatgcc cggtttggtg aggagcactc    5700
tgcaaatccg ttccactggg acctgattgg gaagaacctg tttgccatgg tggtggaagg    5760
ggtggtgtac ttcctcctga ccctgctggt ccagcgccac ttcttcctct cccaatggat    5820
tgccgagccc actaaggagc ccattgttga tgaagatgat gatgtggctg aagaaagaca    5880
aagaattatt actggtggaa ataaaactga catcttaagg ctacatgaac taaccaagat    5940
ttatccaggc acctccagcc cagcagtgga caggctgtgt gtcggagttc gccctggaga    6000
gtgctttggc ctcctgggag tgaatggtgc cggcaaaaca accacattca agatgctcac    6060
tggggacacc acagtgacct caggggatgc caccgtagca ggcaagagta ttttaaccaa    6120
tatttctgaa gtccatcaaa atatgggcta ctgtcctcag tttgatgcaa ttgatgagct    6180
gctcacagga cgagaacatc tttacctta tgcccggcctt cgaggtgtac cagcagaaga    6240
aatcgaaaag gttgcaaact ggagtattaa gagcctgggc ctgactgtct acgccgactg    6300
cctggctggc acgtacagtg ggggcaacaa gcggaaactc tccacagcca tcgcactcat    6360
tggctgccca ccgctggtgc tgctggatga gcccaccaca gggatggacc cccaggcacg    6420
ccgcatgctg tggaacgtca tcgtgagcat catcagagaa gggagggctg tggtcctcac    6480
atcccacagc atggaagaat gtgaggcact gtgtacccgg ctggccatca tggtaaaggg    6540 cgccttcga tgtatgggca ccattcagca tctcaagtcc aaatttggag atggctatat     6600
cgtcacaatg aagatcaaat ccccgaagga cgacctgctt cctgacctga accctgtgga    6660
gcagttcttc cagggaactt cccaggcag tgtgcagagg gagaggcact acaacatgct     6720
ccagttccag gtctcctcct cctccctggc gaggatcttc cagctcctcc tctcccacaa    6780
ggacagcctg ctcatcgagg agtactcagt cacacagacc acactggacc aggtgtttgt    6840
```

-continued

```
aaattttgct aaacagcaga ctgaaagtca tgacctccct ctgcaccctc gagctgctgg     6900
agccagtcga caagcccagg actgatcttt cacaccgctc gttcctgcag ccagaaagga     6960
actctgggca gctggaggcg caggagcctg tgcccatatg gtcatccaaa tggactggcc     7020
agcgtaaatg accccactgc agcagaaaac aaacacacga ggagcatgca gcgaattcag     7080
aaagaggtct ttcagaagga aaccgaaact gacttgctca cctggaacac ctgatggtga     7140
aaccaaacaa atacaaaatc cttctcccaga ccccagaact agaaacccccg ggccatccca     7200 ctagcagctt tggcctccat attgctctca tttcaagcag atctgctttt ctgcatgttt     7260
gtctgtgtgt ctgcgttgtg tgtgattttc atggaaaaat aaaatgcaaa tgcactcatc     7320
acaaacta                                                             7328
```

<210> SEQ ID NO 2
<211> LENGTH: 2273
<212> TYPE: PRT
<213> ORGANISM: Homo sapiens

<400> SEQUENCE: 2

```
Met Gly Phe Val Arg Gln Ile Gln Leu Leu Leu Trp Lys Asn Trp Thr
1               5                   10                  15

Leu Arg Lys Arg Gln Lys Ile Arg Phe Val Val Glu Leu Val Trp Pro
            20                  25                  30

Leu Ser Leu Phe Leu Val Leu Ile Trp Leu Arg Asn Ala Asn Pro Leu
        35                  40                  45

Tyr Ser His His Glu Cys His Phe Pro Asn Lys Ala Met Pro Ser Ala
    50                  55                  60

Gly Met Leu Pro Trp Leu Gln Gly Ile Phe Cys Asn Val Asn Asn Pro
65                  70                  75                  80

Cys Phe Gln Ser Pro Thr Pro Gly Glu Ser Pro Gly Ile Val Ser Asn
                85                  90                  95

Tyr Asn Asn Ser Ile Leu Ala Arg Val Tyr Arg Asp Phe Gln Glu Leu
            100                 105                 110

Leu Met Asn Ala Pro Glu Ser Gln His Leu Gly Arg Ile Trp Thr Glu
        115                 120                 125

Leu His Ile Leu Ser Gln Phe Met Asp Thr Leu Arg Thr His Pro Glu
    130                 135                 140

Arg Ile Ala Gly Arg Gly Ile Arg Ile Arg Asp Ile Leu Lys Asp Glu
145                 150                 155                 160

Glu Thr Leu Thr Leu Phe Leu Ile Lys Asn Ile Gly Leu Ser Asp Ser
                165                 170                 175

Val Val Tyr Leu Leu Ile Asn Ser Gln Val Arg Pro Glu Gln Phe Ala
            180                 185                 190

His Gly Val Pro Asp Leu Ala Leu Lys Asp Ile Ala Cys Ser Glu Ala
        195                 200                 205

Leu Leu Glu Arg Phe Ile Ile Phe Ser Gln Arg Gly Ala Lys Thr
    210                 215                 220

Val Arg Tyr Ala Leu Cys Ser Leu Ser Gln Gly Thr Leu Gln Trp Ile
225                 230                 235                 240

Glu Asp Thr Leu Tyr Ala Asn Val Asp Phe Phe Lys Leu Phe Arg Val
                245                 250                 255

Leu Pro Thr Leu Leu Asp Ser Arg Ser Gln Gly Ile Asn Leu Arg Ser
            260                 265                 270

Trp Gly Gly Ile Leu Ser Asp Met Ser Pro Arg Ile Gln Glu Phe Ile
```

```
            275                 280                 285
His Arg Pro Ser Met Gln Asp Leu Leu Trp Val Thr Arg Pro Leu Met
290                 295                 300

Gln Asn Gly Gly Pro Glu Thr Phe Thr Lys Leu Met Gly Ile Leu Ser
305                 310                 315                 320

Asp Leu Leu Cys Gly Tyr Pro Glu Gly Gly Ser Arg Val Leu Ser
                325                 330                 335

Phe Asn Trp Tyr Glu Asp Asn Tyr Lys Ala Phe Leu Gly Ile Asp
            340                 345                 350

Ser Thr Arg Lys Asp Pro Ile Tyr Ser Tyr Asp Arg Thr Thr Ser
                355                 360                 365

Phe Cys Asn Ala Leu Ile Gln Ser Leu Glu Ser Asn Pro Leu Thr Lys
370                 375                 380

Ile Ala Trp Arg Ala Ala Lys Pro Leu Leu Met Gly Lys Ile Leu Tyr
385                 390                 395                 400

Thr Pro Asp Ser Pro Ala Ala Arg Arg Ile Leu Lys Asn Ala Asn Ser
                405                 410                 415

Thr Phe Glu Glu Leu Glu His Val Arg Lys Leu Val Lys Ala Trp Glu
                420                 425                 430

Glu Val Gly Pro Gln Ile Trp Tyr Phe Phe Asp Asn Ser Thr Gln Met
                435                 440                 445

Asn Met Ile Arg Asp Thr Leu Gly Asn Pro Thr Val Lys Asp Phe Leu
450                 455                 460

Asn Arg Gln Leu Gly Glu Gly Ile Thr Ala Glu Ala Ile Leu Asn
465                 470                 475                 480

Phe Leu Tyr Lys Gly Pro Arg Glu Ser Gln Ala Asp Met Ala Asn
                485                 490                 495

Phe Asp Trp Arg Asp Ile Phe Asn Ile Thr Asp Arg Thr Leu Arg Leu
                500                 505                 510

Val Asn Gln Tyr Leu Glu Cys Leu Val Leu Asp Lys Phe Glu Ser Tyr
                515                 520                 525

Asn Asp Glu Thr Gln Leu Thr Gln Arg Ala Leu Ser Leu Leu Glu Glu
                530                 535                 540

Asn Met Phe Trp Ala Gly Val Val Phe Pro Asp Met Tyr Pro Trp Thr
545                 550                 555                 560

Ser Ser Leu Pro Pro His Val Lys Tyr Lys Ile Arg Met Asp Ile Asp
                565                 570                 575

Val Val Glu Lys Thr Asn Lys Ile Lys Asp Arg Tyr Trp Asp Ser Gly
                580                 585                 590

Pro Arg Ala Asp Pro Val Glu Asp Phe Arg Tyr Ile Trp Gly Gly Phe
                595                 600                 605

Ala Tyr Leu Gln Asp Met Val Glu Gln Gly Ile Thr Arg Ser Gln Val
                610                 615                 620

Gln Ala Glu Ala Pro Val Gly Ile Tyr Leu Gln Gln Met Pro Tyr Pro
625                 630                 635                 640

Cys Phe Val Asp Asp Ser Phe Met Ile Ile Leu Asn Arg Cys Phe Pro
                645                 650                 655

Ile Phe Met Val Leu Ala Trp Ile Tyr Ser Val Ser Met Thr Val Lys
                660                 665                 670

Ser Ile Val Leu Glu Lys Glu Leu Arg Leu Lys Glu Thr Leu Lys Asn
                675                 680                 685

Gln Gly Val Ser Asn Ala Val Ile Trp Cys Thr Trp Phe Leu Asp Ser
                690                 695                 700
```

Phe Ser Ile Met Ser Met Ser Ile Phe Leu Leu Thr Ile Phe Ile Met
705                 710                 715                 720

His Gly Arg Ile Leu His Tyr Ser Asp Pro Phe Ile Leu Phe Leu Phe
                725                 730                 735

Leu Leu Ala Phe Ser Thr Ala Thr Ile Met Leu Cys Phe Leu Leu Ser
            740                 745                 750

Thr Phe Phe Ser Lys Ala Ser Leu Ala Ala Ala Cys Ser Gly Val Ile
        755                 760                 765

Tyr Phe Thr Leu Tyr Leu Pro His Ile Leu Cys Phe Ala Trp Gln Asp
    770                 775                 780

Arg Met Thr Ala Glu Leu Lys Lys Ala Val Ser Leu Leu Ser Pro Val
785                 790                 795                 800

Ala Phe Gly Phe Gly Thr Glu Tyr Leu Val Arg Phe Glu Glu Gln Gly
                805                 810                 815

Leu Gly Leu Gln Trp Ser Asn Ile Gly Asn Ser Pro Thr Glu Gly Asp
            820                 825                 830

Glu Phe Ser Phe Leu Leu Ser Met Gln Met Met Leu Leu Asp Ala Ala
        835                 840                 845

Val Tyr Gly Leu Leu Ala Trp Tyr Leu Asp Gln Val Phe Pro Gly Asp
    850                 855                 860

Tyr Gly Thr Pro Leu Pro Trp Tyr Phe Leu Leu Gln Glu Ser Tyr Trp
865                 870                 875                 880

Leu Gly Gly Glu Gly Cys Ser Thr Arg Glu Glu Arg Ala Leu Glu Lys
                885                 890                 895

Thr Glu Pro Leu Thr Glu Glu Thr Glu Asp Pro Glu His Pro Glu Gly
            900                 905                 910

Ile His Asp Ser Phe Phe Glu Arg Glu His Pro Gly Trp Val Pro Gly
        915                 920                 925

Val Cys Val Lys Asn Leu Val Lys Ile Phe Glu Pro Cys Gly Arg Pro
930                 935                 940

Ala Val Asp Arg Leu Asn Ile Thr Phe Tyr Glu Asn Gln Ile Thr Ala
945                 950                 955                 960

Phe Leu Gly His Asn Gly Ala Gly Lys Thr Thr Thr Leu Ser Ile Leu
                965                 970                 975

Thr Gly Leu Leu Pro Pro Thr Ser Gly Thr Val Leu Val Gly Gly Arg
            980                 985                 990

Asp Ile Glu Thr Ser Leu Asp Ala Val Arg Gln Ser Leu Gly Met Cys
        995                 1000                1005

Pro Gln His Asn Ile Leu Phe His His Leu Thr Val Ala Glu His
    1010                1015                1020

Met Leu Phe Tyr Ala Gln Leu Lys Gly Lys Ser Gln Glu Glu Ala
    1025                1030                1035

Gln Leu Glu Met Glu Ala Met Leu Glu Asp Thr Gly Leu His His
    1040                1045                1050

Lys Arg Asn Glu Glu Ala Gln Asp Leu Ser Gly Gly Met Gln Arg
    1055                1060                1065

Lys Leu Ser Val Ala Ile Ala Phe Val Gly Asp Ala Lys Val Val
    1070                1075                1080

Ile Leu Asp Glu Pro Thr Ser Gly Val Asp Pro Tyr Ser Arg Arg
    1085                1090                1095

Ser Ile Trp Asp Leu Leu Leu Lys Tyr Arg Ser Gly Arg Thr Ile
    1100                1105                1110

```
Ile Met Ser Thr His His Met Asp Glu Ala Asp Leu Leu Gly Asp
1115                1120                1125

Arg Ile Ala Ile Ile Ala Gln Gly Arg Leu Tyr Cys Ser Gly Thr
1130                1135                1140

Pro Leu Phe Leu Lys Asn Cys Phe Gly Thr Gly Leu Tyr Leu Thr
1145                1150                1155

Leu Val Arg Lys Met Lys Asn Ile Gln Ser Gln Arg Lys Gly Ser
1160                1165                1170

Glu Gly Thr Cys Ser Cys Ser Ser Lys Gly Phe Ser Thr Thr Cys
1175                1180                1185

Pro Ala His Val Asp Asp Leu Thr Pro Glu Gln Val Leu Asp Gly
1190                1195                1200

Asp Val Asn Glu Leu Met Asp Val Val Leu His His Val Pro Glu
1205                1210                1215

Ala Lys Leu Val Glu Cys Ile Gly Gln Glu Leu Ile Phe Leu Leu
1220                1225                1230

Pro Asn Lys Asn Phe Lys His Arg Ala Tyr Ala Ser Leu Phe Arg
1235                1240                1245

Glu Leu Glu Glu Thr Leu Ala Asp Leu Gly Leu Ser Ser Phe Gly
1250                1255                1260

Ile Ser Asp Thr Pro Leu Glu Glu Ile Phe Leu Lys Val Thr Glu
1265                1270                1275

Asp Ser Asp Ser Gly Pro Leu Phe Ala Gly Gly Ala Gln Gln Lys
1280                1285                1290

Arg Glu Asn Val Asn Pro Arg His Pro Cys Leu Gly Pro Arg Glu
1295                1300                1305

Lys Ala Gly Gln Thr Pro Gln Asp Ser Asn Val Cys Ser Pro Gly
1310                1315                1320

Ala Pro Ala Ala His Pro Glu Gly Gln Pro Pro Glu Pro Glu
1325                1330                1335

Cys Pro Gly Pro Gln Leu Asn Thr Gly Thr Gln Leu Val Leu Gln
1340                1345                1350

His Val Gln Ala Leu Leu Val Lys Arg Phe Gln His Thr Ile Arg
1355                1360                1365

Ser His Lys Asp Phe Leu Ala Gln Ile Val Leu Pro Ala Thr Phe
1370                1375                1380

Val Phe Leu Ala Leu Met Leu Ser Ile Val Ile Pro Pro Phe Gly
1385                1390                1395

Glu Tyr Pro Ala Leu Thr Leu His Pro Trp Ile Tyr Gly Gln Gln
1400                1405                1410

Tyr Thr Phe Phe Ser Met Asp Glu Pro Gly Ser Glu Gln Phe Thr
1415                1420                1425

Val Leu Ala Asp Val Leu Leu Asn Lys Pro Gly Phe Gly Asn Arg
1430                1435                1440

Cys Leu Lys Glu Gly Trp Leu Pro Glu Tyr Pro Cys Gly Asn Ser
1445                1450                1455

Thr Pro Trp Lys Thr Pro Ser Val Ser Pro Asn Ile Thr Gln Leu
1460                1465                1470

Phe Gln Lys Gln Lys Trp Thr Gln Val Asn Pro Ser Pro Ser Cys
1475                1480                1485

Arg Cys Ser Thr Arg Glu Lys Leu Thr Met Leu Pro Glu Cys Pro
1490                1495                1500

Glu Gly Ala Gly Gly Leu Pro Pro Pro Gln Arg Thr Gln Arg Ser
```

```
                    1505                     1510                    1515
Thr Glu Ile Leu Gln Asp Leu Thr Asp Arg Asn Ile Ser Asp Phe
    1520                    1525                    1530

Leu Val Lys Thr Tyr Pro Ala Leu Ile Arg Ser Ser Leu Lys Ser
    1535                    1540                    1545

Lys Phe Trp Val Asn Glu Gln Arg Tyr Gly Gly Ile Ser Ile Gly
    1550                    1555                    1560

Gly Lys Leu Pro Val Val Pro Ile Thr Gly Glu Ala Leu Val Gly
    1565                    1570                    1575

Phe Leu Ser Asp Leu Gly Arg Ile Met Asn Val Ser Gly Gly Pro
    1580                    1585                    1590

Ile Thr Arg Glu Ala Ser Lys Glu Ile Pro Asp Phe Leu Lys His
    1595                    1600                    1605

Leu Glu Thr Glu Asp Asn Ile Lys Val Trp Phe Asn Asn Lys Gly
    1610                    1615                    1620

Trp His Ala Leu Val Ser Phe Leu Asn Val Ala His Asn Ala Ile
    1625                    1630                    1635

Leu Arg Ala Ser Leu Pro Lys Asp Arg Ser Pro Glu Glu Tyr Gly
    1640                    1645                    1650

Ile Thr Val Ile Ser Gln Pro Leu Asn Leu Thr Lys Glu Gln Leu
    1655                    1660                    1665

Ser Glu Ile Thr Val Leu Thr Thr Ser Val Asp Ala Val Val Ala
    1670                    1675                    1680

Ile Cys Val Ile Phe Ser Met Ser Phe Val Pro Ala Ser Phe Val
    1685                    1690                    1695

Leu Tyr Leu Ile Gln Glu Arg Val Asn Lys Ser Lys His Leu Gln
    1700                    1705                    1710

Phe Ile Ser Gly Val Ser Pro Thr Thr Tyr Trp Val Thr Asn Phe
    1715                    1720                    1725

Leu Trp Asp Ile Met Asn Tyr Ser Val Ser Ala Gly Leu Val Val
    1730                    1735                    1740

Gly Ile Phe Ile Gly Phe Gln Lys Lys Ala Tyr Thr Ser Pro Glu
    1745                    1750                    1755

Asn Leu Pro Ala Leu Val Ala Leu Leu Leu Leu Tyr Gly Trp Ala
    1760                    1765                    1770

Val Ile Pro Met Met Tyr Pro Ala Ser Phe Leu Phe Asp Val Pro
    1775                    1780                    1785

Ser Thr Ala Tyr Val Ala Leu Ser Cys Ala Asn Leu Phe Ile Gly
    1790                    1795                    1800

Ile Asn Ser Ser Ala Ile Thr Phe Ile Leu Glu Leu Phe Glu Asn
    1805                    1810                    1815

Asn Arg Thr Leu Leu Arg Phe Asn Ala Val Leu Arg Lys Leu Leu
    1820                    1825                    1830

Ile Val Phe Pro His Phe Cys Leu Gly Arg Gly Leu Ile Asp Leu
    1835                    1840                    1845

Ala Leu Ser Gln Ala Val Thr Asp Val Tyr Ala Arg Phe Gly Glu
    1850                    1855                    1860

Glu His Ser Ala Asn Pro Phe His Trp Asp Leu Ile Gly Lys Asn
    1865                    1870                    1875

Leu Phe Ala Met Val Val Glu Gly Val Val Tyr Phe Leu Leu Thr
    1880                    1885                    1890

Leu Leu Val Gln Arg His Phe Phe Leu Ser Gln Trp Ile Ala Glu
    1895                    1900                    1905
```

```
Pro Thr Lys Glu Pro Ile Val Asp Glu Asp Asp Val Ala Glu
    1910            1915            1920

Glu Arg Gln Arg Ile Ile Thr Gly Gly Asn Lys Thr Asp Ile Leu
    1925            1930            1935

Arg Leu His Glu Leu Thr Lys Ile Tyr Pro Gly Thr Ser Ser Pro
    1940            1945            1950

Ala Val Asp Arg Leu Cys Val Gly Val Arg Pro Gly Glu Cys Phe
    1955            1960            1965

Gly Leu Leu Gly Val Asn Gly Ala Gly Lys Thr Thr Thr Phe Lys
    1970            1975            1980

Met Leu Thr Gly Asp Thr Thr Val Thr Ser Gly Asp Ala Thr Val
    1985            1990            1995

Ala Gly Lys Ser Ile Leu Thr Asn Ile Ser Glu Val His Gln Asn
    2000            2005            2010

Met Gly Tyr Cys Pro Gln Phe Asp Ala Ile Asp Glu Leu Leu Thr
    2015            2020            2025

Gly Arg Glu His Leu Tyr Leu Tyr Ala Arg Leu Arg Gly Val Pro
    2030            2035            2040

Ala Glu Glu Ile Glu Lys Val Ala Asn Trp Ser Ile Lys Ser Leu
    2045            2050            2055

Gly Leu Thr Val Tyr Ala Asp Cys Leu Ala Gly Thr Tyr Ser Gly
    2060            2065            2070

Gly Asn Lys Arg Lys Leu Ser Thr Ala Ile Ala Leu Ile Gly Cys
    2075            2080            2085

Pro Pro Leu Val Leu Leu Asp Glu Pro Thr Thr Gly Met Asp Pro
    2090            2095            2100

Gln Ala Arg Arg Met Leu Trp Asn Val Ile Val Ser Ile Ile Arg
    2105            2110            2115

Glu Gly Arg Ala Val Val Leu Thr Ser His Ser Met Glu Glu Cys
    2120            2125            2130

Glu Ala Leu Cys Thr Arg Leu Ala Ile Met Val Lys Gly Ala Phe
    2135            2140            2145

Arg Cys Met Gly Thr Ile Gln His Leu Lys Ser Lys Phe Gly Asp
    2150            2155            2160

Gly Tyr Ile Val Thr Met Lys Ile Lys Ser Pro Lys Asp Asp Leu
    2165            2170            2175

Leu Pro Asp Leu Asn Pro Val Glu Gln Phe Phe Gln Gly Asn Phe
    2180            2185            2190

Pro Gly Ser Val Gln Arg Glu Arg His Tyr Asn Met Leu Gln Phe
    2195            2200            2205

Gln Val Ser Ser Ser Ser Leu Ala Arg Ile Phe Gln Leu Leu Leu
    2210            2215            2220

Ser His Lys Asp Ser Leu Leu Ile Glu Glu Tyr Ser Val Thr Gln
    2225            2230            2235

Thr Thr Leu Asp Gln Val Phe Val Asn Phe Ala Lys Gln Gln Thr
    2240            2245            2250

Glu Ser His Asp Leu Pro Leu His Pro Arg Ala Ala Gly Ala Ser
    2255            2260            2265

Arg Gln Ala Gln Asp
    2270

<210> SEQ ID NO 3
<211> LENGTH: 3816
```

```
<212> TYPE: DNA
<213> ORGANISM: Artificial Sequence
<220> FEATURE:
<223> OTHER INFORMATION: Synthetic Polynucleotide

<400> SEQUENCE: 3
atgggcttcg tgagacagat acagcttttg ctctggaaga actggaccct gcggaaaagg    60
caaaagattc gctttgtggt ggaactcgtg tggcctttat ctttatttct ggtcttgatc   120
tggttaagga atgccaaccc gctctacagc catcatgaat gccatttccc caacaaggcg   180
atgccctcag caggaatgct gccgtggctc caggggatct tctgcaatgt gaacaatccc   240
tgttttcaaa gccccacccc aggagaatct cctggaattg tgtcaaacta taacaactcc   300
atcttggcaa gggtatatcg agattttcaa gaactcctca tgaatgcacc agagagccag   360
caccttggcc gtatttggac agagctacac atcttgtccc aattcatgga cacccctccgg   420 actcacccgg agagaattgc aggaagagga atacgaataa gggatatctt gaaagatgaa   480
gaaacactga cactatttct cattaaaaac atcggcctgt ctgactcagt ggtctacctt   540
ctgatcaact ctcaagtccg tccagagcag ttcgctcatg gagtcccgga cctggcgctg   600
aaggacatcg cctgcagcga ggccctcctg gagcgcttca tcatcttcag ccagagacgc   660
ggggcaaaga cggtgcgcta tgccctgtgc tccctctccc agggcaccct acagtggata   720
gaagacactc tgtattcttt catgatcatc ctgaaccgct gtttccctat cttcatggtg   780
ctggcatgga tctactctgt ctccatgact gtgaagagca tcgtcttgga aaggagttg    840 cgactgaagg agaccttgaa aaatcagggt gtctccaatg cagtgatttg gtgtacctgg   900
ttcctggaca gcttctccat catgtcgatg agcatcttcc tcctgacgat attcatcatg   960
catggaagaa tcctacatta cagcgaccca ttcatcctct tcctgttctt gttggctttc  1020
tccactgcca ccatcatgct gtgctttctg ctcagcacct tcttctccaa ggccagtctg  1080
gcagcagcct gtagtggtgt catctatttc accctctacc tgccacacat cctgtgcttc  1140
gcctggcagg accgcatgac cgctgagctg aagaaggctg tgagcttact gtctccggtg  1200
gcatttggat ttggcactga gtacctggtt cgctttgaag agcaaggcct ggggctgcag  1260
tggagcaaca tcgggaacag tcccacggaa ggggacgaat tcagcttcct gctgtccatg  1320
cagatgatgc tccttgatgc tgctgtctat ggcttactcg cttggtacct tgatcaggtg  1380
gtatgcgtga agaatctggt aaagatttt gagccctgtg gccggccagc tgtggaccgt  1440
ctgaacatca ccttctacga gaaccagatc accgcattcc tgggccacaa tggagctggg  1500
aaaaccacca ccttgtccat cctgacgggt ctgttgccac caacctctgg gactgtgctc  1560
gttgggggaa gggacattga aaccagcctg gatgcagtcc ggcagagcct ggcatgtgt   1620 ccacagcaca acatcctgtt ccaccacctc acggtggctg agcacatgct gttctatgcc  1680
cagctgaaag gaaagtccca ggaggaggcc cagctggaga tggaagccat gttggaggac  1740
acaggcctcc accacaagcg gaatgaagag gctcaggacc tatcaggtgg catgcagaga  1800
aagctgtcgg ttgccattgc ctttgtggga gatgccaagg tggtgattct ggacgaaccc  1860
acctctgggg tggacccta ctcgagacgc tcaatctggg atctgctcct gaagtatcgc  1920
tcaggcagaa ccatcatcat gtccactcac cacatggacg aggccgacct ccttgggac   1980 cgcattgcca tcattgccca gggaaggctc tactgctcag caccccact cttcctgaag  2040 aactgctttg gcagggctt gtacttaacc ttggtgggcg ataccccgc tttgacccttt  2100 cacccctgga tatatgggca gcagtacacc ttcttcagca tggatgaacc aggcagtgag  2160
```

```
cagttcacgg tacttgcaga cgtcctcctg aataagccag gctttggcaa ccgctgcctg    2220
aaggaagggt ggcttccgga gtaccccgt ggcaactcaa caccctggaa gactccttct     2280
```
(corrected line above per image:)
```
cagttcacgg tacttgcaga cgtcctcctg aataagccag gctttggcaa ccgctgcctg    2220
aaggaagggt ggcttccgga gtaccccgt ggcaactcaa caccctggaa gactccttct     2280
gtgtccccaa acatcaccca gctgttccag aagcagaaat ggacacaggt caacccttca    2340
ccatcctgca ggtgcagcac cagggagaag ctcaccatgc tgccagagtg ccccgagggt    2400
gccggggcc tcccgccccc ccagagaaca cagcgcagca cggaaattct acaagacctg     2460
acggacagga acatctccga cttcttggta aaaacgtatc ctgctcttat aagaagcagc    2520
ttaaagagca aattctgggt caatgaacag aggtatggag gaatttccat ggaggaaag    2580
ctcccagtcg tccccatcac gggggaagca cttgttgggt ttttaagcga ccttggccgg    2640
atcatgaatg tgagcggggg ccctatcact agagaggcct ctaaagaaat acctgatttc    2700
cttaaacatc tagaaactga agacaacatt aaggtgtggt ttaataacaa aggctggcat    2760
gccctggtca gctttctcaa tgtggcccac aacgccatct tacggttaag gctacatgaa    2820
ctaaccaaga tttatccagg cacctccagc ccagcagtgg acaggctgtg tgtcggagtt    2880
cgccctggag agtgctttgg cctcctggga gtgaatggtg ccggcaaaac aaccacattc    2940
aagatgctca ctggggacac cacagtgacc tcaggggatg ccaccgtagc aggcaagagt    3000
attttaacca atatttctga agtccatcaa aatatgggct actgtcctca gtttgatgca    3060
attgatgagc tgctcacagg acgagaacat ctttacctttt atgcccggct tcgaggtgta    3120
ccagcagaag aaatcgaaaa ggttgcaaac tggagtatta agagcctggg cctgactgtc    3180
tacgccgact gcctggctgg cacgtacagt gggggcaaca agcggaaact ctccacagcc    3240
atcgcactca ttggctgccc accgctggtg ctgctggatg agcccaccac agggatggac    3300
ccccaggcac gccgcatgct gtggaacgtc atcgtgagca tcatcagaga agggagggct    3360
gtggtcctca catcccacag catggaagaa tgtgaggcac tgtgtacccg gctggccatc    3420
atggtaaagg gcgcctttcg atgtatgggc accattcagc atctcaagtc caaatttgga    3480
gatggctata tcgtcacaat gaagatcaaa tccccgaagg acgacctgct tcctgacctg    3540
aaccctgtgg agcagttctt ccaggggaac ttcccaggca gtgtgcagag ggagaggcac    3600
tacaacatgc tccagttcca ggtctcctcc tcctccctgg cgaggatctt ccagctcctc    3660
ctctcccaca aggacagcct gctcatcgag gagtactcag tcacacagac cacactggac    3720
caggtgtttg taaattttgc taaacagcag actgaaagtc atgacctccc tctgcaccct    3780
cgagctgctg gagccagtcg acaagcccag gactga                              3816
```

<210> SEQ ID NO 4
<211> LENGTH: 3804
<212> TYPE: DNA
<213> ORGANISM: Artificial Sequence
<220> FEATURE:
<223> OTHER INFORMATION: Synthetic Polynucleotide

<400> SEQUENCE: 4

```
atgggcttcg tgagacagat acagcttttg ctctggaaga actggaccct gcggaaaagg      60
caaaagattc gctttgtggt ggaactcgtg tggcctttat ctttatttct ggtcttgatc     120
tggttaagga tgccaaccc gctctacagc atcatgaat gccatttccc caacaaggcg       180
atgccctcag caggaatgct gccgtggctc caggggatct tctgcaatgt gaacaatccc    240
tgttttcaaa gccccacccc aggagaatct cctggaattg tgtcaaacta taacaactcc    300
atcttggcaa gggtatatcg agattttcaa gaactcctca tgaatgcacc agagagccag    360
caccttggcc gtatttggac agagctacac atcttgtccc aattcatgga caccctccgg    420
```

```
actcacccgg agagaattgc aggaagagga atacgaataa gggatatctt gaaagatgaa    480
gaaacactga cactatttct cattaaaaac atcggcctgt ctgactcagt ggtctacctt    540
ctgatcaact ctcaagtccg tccagagcag ttcgctcatg gagtcccgga cctggcgctg    600
aaggacatcg cctgcagcga ggccctcctg gagcgcttca tcatcttcag ccagagacgc    660
ggggcaaaga cggtgcgcta tgccctgtgc tccctctccc agggcaccct acagtggata    720
gaagacactc tgtatgtatg cgtgaagaat ctggtaaaga ttttgagcc ctgtggccgg    780 ccagctgtgg accgtctgaa catcaccttc tacgagaacc agatcaccgc attcctgggc    840
cacaatggag ctgggaaaac caccaccttg tccatcctga cgggtctgtt gccaccaacc    900
tctgggactg tgctcgttgg gggaagggac attgaaacca gcctggatgc agtccggcag    960
agccttggca tgtgtccaca gcacaacatc ctgttccacc acctcacggt ggctgagcac   1020
atgctgttct atgcccagct gaaaggaaag tcccaggagg aggcccagct ggagatggaa   1080
gccatgttgg aggacacagg cctccaccac aagcggaatg aagaggctca ggacctatca   1140
ggtggcatgc agagaaagct gtcggttgcc attgcctttg tgggagatgc caaggtggtg   1200
attctggacg aacccaccatc tggggtggac ccttactcga cgctcaat ctgggatctg   1260 ctcctgaagt atcgctcagg cagaaccatc atcatgtcca ctcaccacat ggacgaggcc   1320
gacctccttg ggaccgcat tgccatcatt gcccagggaa ggctctactg ctcaggcacc   1380
ccactcttcc tgaagaactg ctttggcaca ggcttgtact taaccttggt gggcgaatac   1440
cccgctttga cccttcaccc ctggatatat gggcagcagt acaccttctt cagcatggat   1500
gaaccaggca gtgagcagtt cacggtactt gcagacgtcc tcctgaataa gccaggcttt   1560
ggcaaccgct gcctgaagga agggtggctt ccggagtacc cctgtggcaa ctcaacaccc   1620
tggaagactc cttctgtgtc cccaaacatc acccagctgt tccagaagca gaaatggaca   1680
caggtcaacc cttcaccatc ctgcaggtgc agcaccaggg agaagctcac catgctgcca   1740
gagtgccccg agggtgccgg gggcctcccg cccccccaga gaacacagcg cagcacggaa   1800
attctacaag acctgacgga caggaacatc tccgacttct tggtaaaaac gtatcctgct   1860
cttataagaa gcagcttaaa gagcaaattc tgggtcaatg aacagaggta tggaggaatt   1920
tccattggag gaaagctccc agtcgtcccc atcacggggg aagcacttgt tgggttttta   1980
agcgaccttg gccggatcat gaatgtgagc gggggcccta tcactagaga ggcctctaaa   2040
gaaatacctg atttccttaa acatctagaa actgaagaca acattaaggt gtggtttaat   2100
aacaaaggct ggcatgccct ggtcagcttt ctcaatgtgg cccacaacgc catcttacgg   2160
aacttcctct gggacatcat gaattattcc gtgagtgctg gctggtggt gggcatcttc   2220 atcgggttt agaagaaagc ctacacttct ccagaaaacc ttcctgccct tgtggcactg   2280
ctcctgctgt atggatgggc ggtcattccc atgatgtacc cagcatcctt cctgtttgat   2340
gtccccagca cagcctatgt ggctttatct tgtgctaatc tgttcatcgg catcaacagc   2400
agtgctatta ccttcatctt ggaattattt gagaataacc ggacgctgct caggttcaac   2460
gccgtgctga ggaagctgct cattgtcttc ccccacttct gcctgggccg gggcctcatt   2520
gaccttgcac tgagccaggc tgtgacagat gtctatgccc ggtttggtga ggagcactct   2580
gcaaatccgt tccactggga cctgattggg aagaacctgt tgccatggt ggtggaaggg   2640 gtggtgtact tcctcctgac cctgctggtc cagcgccact tcttcctctc ccaatggatt   2700
gccgagccca ctaaggagcc cattgttgat gaagatgatg atgtggctga agaaagacaa   2760
```

| | |
|---|---|
| agaattatta ctggtggaaa taaaactgac atcttaaggc tacatgaact aaccaagatt | 2820 |
| tatccaggca cctccagccc agcagtggac aggctgtgtg tcggagttcg ccctggagag | 2880 |
| tgctttggcc tcctgggagt gaatggtgcc ggcaaaacaa ccacattcaa gatgctcact | 2940 |
| ggggacacca cagtgacctc aggggatgcc accgtagcag gcaagagtat tttaaccaat | 3000 |
| atttctgaag tccatcaaaa tatgggctac tgtcctcagt ttgatgcaat tgatgagctg | 3060 |
| ctcacaggac gagaacatct ttaccttat gcccggcttc gaggtgtacc agcagaagaa | 3120 |
| atcgaaaagg ttgcaaactg gagtattaag agcctgggcc tgactgtcta cgccgactgc | 3180 |
| ctggctggca cgtacagtgg gggcaacaag cggaaactct ccacagccat cgcactcatt | 3240 |
| ggctgcccac cgctggtgct gctggatgag cccaccacag ggatggaccc ccaggcacgc | 3300 |
| cgcatgctgt ggaacgtcat cgtgagcatc atcagagaag ggagggctgt ggtcctcaca | 3360 |
| tcccacagca tggaagaatg tgaggcactg tgtacccggc tggccatcat ggtaaagggc | 3420 |
| gcctttcgat gtatgggcac cattcagcat ctcaagtcca aatttggaga tggctatatc | 3480 |
| gtcacaatga agatcaaatc cccgaaggac gacctgcttc ctgacctgaa ccctgtggag | 3540 |
| cagttcttcc aggggaactt cccaggcagt gtgcagaggg agaggcacta caacatgctc | 3600 |
| cagttccagg tctcctcctc ctccctggcg aggatcttcc agctcctcct ctcccacaag | 3660 |
| gacagcctgc tcatcgagga gtactcagtc acacagacca cactggacca ggtgtttgta | 3720 |
| aattttgcta acagcagac tgaaagtcat gacctccctc tgcaccctcg agctgctgga | 3780 |
| gccagtcgac aagcccagga ctga | 3804 |

<210> SEQ ID NO 5
<211> LENGTH: 4062
<212> TYPE: DNA
<213> ORGANISM: Artificial Sequence
<220> FEATURE:
<223> OTHER INFORMATION: Synthetic Polynucleotide

<400> SEQUENCE: 5

| | |
|---|---|
| atgggcttcg tgagacagat acagcttttg ctctggaaga actggaccct gcggaaaagg | 60 |
| caaaagattc gctttgtggt ggaactcgtg tggccttat ctttatttct ggtcttgatc | 120 |
| tggttaagga atgccaaccc gctctacagc catcatgaat gccatttccc caacaaggcg | 180 |
| atgccctcag caggaatgct gccgtggctc caggggatct tctgcaatgt gaacaatccc | 240 |
| tgttttcaaa gccccacccc aggagaatct cctggaattg tgtcaaacta taacaactcc | 300 |
| atcttggcaa gggtatatcg agattttcaa gaactcctca tgaatgcacc agagagccag | 360 |
| caccttggcc gtatttggac agagctacac atcttgtccc aattcatgga caccctccgg | 420 |
| actcacccgg agagaattgc aggaagagga atacgaataa gggatatctt gaaagatgaa | 480 |
| gaaacactga cactatttct cattaaaaac atcggcctgt ctgactcagt ggtctacctt | 540 |
| ctgatcaact ctcaagtccg tccagagcag ttcgctcatg gagtcccgga cctggcgctg | 600 |
| aaggacatcg cctgcagcga ggccctcctg agccgcttca tcatcttcag ccagagacgc | 660 |
| ggggcaaaga cggtgcgcta tgccctgtgc tccctctccc agggcaccct acagtggata | 720 |
| gaagacactc tgtatgccaa cgtggacttc ttcaagctct tccgtgtgct tcccacactc | 780 |
| ctagacagcc gttctcaagg tatcaatctg agatcttggg gaggaatatt atctgatatg | 840 |
| tcaccaagaa ttcaagagtt tatccatcgg ccgagtatgc aggacttgct gtgggtgacc | 900 |
| aggcccctca tgcagaatgg tggtccagag accttacaa agctgatggg catcctgtct | 960 |
| gacctcctgt gtggctaccc cgagggaggt ggctctcggg tgctctcctt caactggtat | 1020 |

```
gaagacaata actataaggc ctttctgggg attgactcca caaggaagga tcctatctat    1080
tcttatgaca gaagaacaac atccttttgt aatgcattga tccagagcct ggagtcaaat    1140
cctttaacca aaatcgcttg gagggcggca aagcctttgc tgatgggaaa atcctgtac     1200 actcctgatt cacctgcagc acgaaggata ctgaagaatg ccaactcaac ttttgaagaa    1260
ctggaacacg ttaggaagtt ggtcaaagcc tgggaagaag tagggcccca gatctggtac    1320
ttctttgaca acagcacaca gatgaacatg atcagagata ccctggggaa cccaacagta    1380
aaagactttt tgaataggca gcttggtgaa gaaggtatta ctgctgaagc atcctaaac     1440 ttcctctaca agggccctcg ggaaagccag gctgacgaca tggccaactt cgactggagg    1500
gacatattta acatcactga tcgcaccctc cgcctggtca atcaatacct ggagtgcttg    1560
gtcctggata agtttgaaag ctacaatgat gaaactcagc tcacccaacg tgccctctct    1620
ctactggagg aaaacatgtt ctgggccgga gtggtattcc ctgacatgta tcctggacc     1680 agctctctac caccccacgt gaagtataag atccgaatgg acatagacgt ggtggagaaa    1740
accaataaga ttaaagacag gtattgggat tctggtccca gagctgatcc cgtggaagat    1800
ttccggtaca tctggggcgg gtttgcctat ctgcaggaca tggttgaaca ggggatcaca    1860
aggagccagg tgcaggcgga ggctccagtt ggaatctacc tccagcagat gccctacccc    1920
tgcttcgtgg acgattcttt catgatcatc ctgaaccgct gtttccctat cttcatggtg    1980
ctggcatgga tctactctgt ctccatgact gtgaagagca tcgtcttgga aaggagttg     2040 cgactgaagg agaccttgaa aaatcagggt gtctccaatg cagtgatttg gtgtacctgg    2100
ttcctggaca gcttctccat catgtcgatg agcatcttcc tcctgacgat attcatcatg    2160 catgaagaa tcctacatta cagcgaccca ttcatcctct tcctgttctt gttggctttc     2220
tccactgcca ccatcatgct gtgctttctg ctcagcacct tcttctccaa ggccagtctg    2280
gcagcagcct gtagtggtgt catctatttc accctctacc tgccacacat cctgtgcttc    2340
gcctggcagg accgcatgac cgctgagctg aagaaggctg tgagcttact gtctccggtg    2400
gcatttggat ttggcactga gtacctggtt cgctttgaag agcaaggcct ggggctgcag    2460
tggagcaaca tcgggaacag tcccacggaa ggggacgaat tcagcttcct gctgtccatg    2520
cagatgatgc tccttgatgc tgctgtctat ggcttactcg cttggtacct tgatcaggtg    2580
ctaacagagg aaaacgagga tccagagcac ccagaaggaa tacacgactc cttctttgaa    2640
cgtgagcatc cagggtgggt tcctggggta tgcgtgaaga atctggtaaa gattttttgag   2700 ccctgtggcc ggccagctgt ggaccgtctg aacatcacct tctacgagaa ccagatcacc    2760
gcattcctgg ccacaatgg agctgggaaa accaccacct tgtccatcct gacgggtctg     2820
ttgccaccaa cctctgggac tgtgctcgtt ggggaaggg acattgaaac cagcctggat      2880
gcaggcgaat accccgcttt gacccttcac ccctggatat atgggcagca gtacaccttc    2940
ttcagcatga tgaaccagg cagtgagcag ttcacggtac ttgcagacgt cctcctgaat      3000
aagccaggct ttggcaaccg ctgcctgaag gaagggtggc ttccggagta ccctgtggc     3060 aactcaacac cctggaagac tccttctgtg tccccaaaca tcaccagct gttccagaag      3120 cagaaatgga cacaggtcaa cccttcacca tcctgcaggt gcagcaccag ggagaagctc    3180
accatgctgc cattaaggct acatgaacta accaagattt atccaggcac ctccagccca    3240
gcagtggaca ggctgtgtgt cggagttcgc cctggagagt gctttggcct cctgggagtg    3300
aatggtgccg gcaaaacaac cacattcaag atgctcactg gggacaccac agtgacctca    3360
```

-continued

| | |
|---|---|
| ggggatgcca ccgtagcagg caagagtatt ttaaccaata tttctgaagt ccatcaaaat | 3420 |
| atgggctact gtcctcagtt tgatgcaatt gatgagctgc tcacaggacg agaacatctt | 3480 |
| tacctttatg cccggcttcg aggtgtacca gcagaagaaa tcgaaaaggt tgcaaactgg | 3540 |
| agtattaaga gcctgggcct gactgtctac gccgactgcc tggctggcac gtacagtggg | 3600 |
| ggcaacaagc ggaaactctc cacagccatc gcactcattg gctgcccacc gctggtgctg | 3660 |
| ctggatgagc ccaccacagg gatggacccc caggcacgcc gcatgctgtg aacgtcatc | 3720 |
| gtgagcatca tcagagaagg gagggctgtg gtcctcacat cccacagcat ggaagaatgt | 3780 |
| gaggcactgt gtacccggct ggccatcatg gtaaagggcg cctttcgatg tatgggcacc | 3840 |
| attcagcatc tcaagtccaa atttggagat ggctatatcg tcacaatgaa gatcaaatcc | 3900 |
| ccgaaggacg acctgcttcc tgacctgaac cctgtggagc agttcttcca ggggaacttc | 3960 |
| ccaggcagtg tgcagaggga gaggcactac aacatgctcc agttccaggt ctcctcctcc | 4020 |
| tccctggcga ggatcttcca ggtgtttgta aattttgctt ga | 4062 |

<210> SEQ ID NO 6
<211> LENGTH: 3669
<212> TYPE: DNA
<213> ORGANISM: Artificial Sequence
<220> FEATURE:
<223> OTHER INFORMATION: Synthetic Polynucleotide

<400> SEQUENCE: 6

| | |
|---|---|
| atgggcttcg tgagacagat acagcttttg ctctggaaga actggaccct gcggaaaagg | 60 |
| caaaagattc gctttgtggt ggaactcgtg tggcctttat ctttatttct ggtcttgatc | 120 |
| tggttaagga atgccaaccc gctctacagc catcatgaat gccatttccc caacaaggcg | 180 |
| atgccctcag caggaatgct gccgtggctc caggggatct tctgcaatgt gaacaatccc | 240 |
| tgttttcaaa gccccacccc aggagaatct cctggaattg tgtcaaacta taacaactcc | 300 |
| atcttggcaa gggtatatcg agattttcaa gaactcctca tgaatgcacc agagagccag | 360 |
| caccttggcc gtatttggac agagctacac atcttgtccc aattcatgga caccctccgg | 420 |
| actcacccgg agagaattgc aggaagagga atacgaataa gggatatctt gaaagatgaa | 480 |
| gaaacactga cactatttct cattaaaaac atcggcctgt ctgactcagt ggtctacctt | 540 |
| ctgatcaact ctcaagtccg tccagagcag ttcgctcatg gagtcccgga cctggcgctg | 600 |
| aaggacatcg cctgcagcga ggccctcctg gagcgcttca tcatcttcag ccagagacgc | 660 |
| ggggcaaaga cggtgcgcta tgccctgtgc tccctctccc agggcaccct acagtggata | 720 |
| gaagacactc tgtatgccaa cgtggacttc ttcaagctct ccgtgtgct tcccacactc | 780 |
| ctagacagcc gttctcaagg tatcaatctg agatcttggg gaggaatatt atctgatatg | 840 |
| tcaccaagaa ttcaagagtt tatccatcgg ccgagtatgc aggacttgct gtgggtgacc | 900 |
| aggcccctca tgcagaatgg tggtccagag acctttacaa agctgatggg catcctgtct | 960 |
| gacctcctgt gtggctaccc cgagggaggt ggctctcggg tgctctcctt caactggtat | 1020 |
| gaagacaata actataaggc ctttctgggg attgactcca aaggaaggga tcctatctat | 1080 |
| tcttatgaca aagaacaac atcctttgt aatgcattga tccagagcct ggagtcaaat | 1140 |
| cctttaacca aaatcgcttg gagggcggca agcctttgc tgatgggaaa atcctgtac | 1200 |
| actcctgatt cacctgcagc acgaaggata ctgaagaatg ccaactcaac tttgaagaa | 1260 |
| ctggaacacg ttaggaagtt ggtcaaagcc tgggaagaag tagggcccca gatctggtac | 1320 |
| ttctttgaca acagcacaca gatgaacatg atcagagata cccctgggaa cccaacagta | 1380 |

```
aaagactttt tgaataggca gcttggtgaa gaaggtatta ctgctgaagc catcctaaac    1440
ttcctctaca agggccctcg ggaaagccag gctgacgaca tggccaactt cgactggagg    1500
gacatattta acatcactga tcgcaccctc cgcctggtca atcaatacct ggagtgcttg    1560
gtcctggata agtttgaaag ctacaatgat gaaactcagc tcacccaacg tgccctctct    1620
ctactggagg aaaacatgtt ctgggccgga gtggtattcc ctgacatgta tccctggacc    1680
agctctctac caccccacgt gaagtataag atccgaatgg acatagacgt ggtggagaaa    1740
accaataaga ttaaagacag gtattgggat tctggtccca gagctgatcc cgtggaagat    1800
ttccggtaca tctggggcgg gttttgcctat ctgcaggaca tggttgaaca ggggatcaca    1860
aggagccagg tgcaggcgga ggctccagtt ggaatctacc tccagcagat gccctacccc    1920
tgcttcgtgg acgattcttt catgatcatc ctgaaccgct gtttccctat cttcatggtg    1980
ctggcatgga tctactctgt ctccatgact gtgaagagca tcgtcttgga aaggagttg     2040
cgactgaagg agaccttgaa aaatcagggt gtctccaatg cagtgatttg gtgtacctgg    2100
ttcctggaca gcttctccat catgtcgatg agcatcttcc tcctgacgat attcatcatg    2160
catggaagaa tcctacatta cagcgaccca ttcatcctct tcctgttctt gttggctttc    2220
tccactgcca ccatcatgct gtgctttctg ctcagcacct tcttctccaa ggccagtctg    2280
gcagcagcct gtagtggtgt catctatttc accctctacc tgccacacat cctgtgcttc    2340
gcctggcagg accgcatgac cgctgagctg aagaaggctg tgagcttact gtctccggtg    2400
gcatttggat ttggcactga gtacctggtt cgctttgaag agcaaggcct ggggctgcag    2460
tggagcaaca tcgggaacag tcccacggaa ggggacgaat tcagcttcct gctgtccatg    2520
cagatgatgc tccttgatgc tgctgtctat ggcttactcg cttggtacct tgatcaggtg    2580
gtccggcaga gccttggcat gtgtccacag cacaacatcc tgttccacca cctcacggtg    2640
gctgagcaca tgctgttcta tgcccagctg aaaggaaagt cccaggagga ggcccagctg    2700
gagatggaag ccatgttgga ggacacaggc ctccaccaca gcggaatgaa agaggctcag    2760
gacctatcag gtggcatgca gagaaagctg tcggttgcca ttgcctttgt gggagatgcc    2820
aaggtggtga ttctggacga acccacctct ggggtggacc cttactcgag acgctcaatc    2880
tgggatctgc tcctgaagta tcgctcaggc agaaccatca tcatgtccac tcaccacatg    2940
gacgaggccg acctccttgg ggaccgcatt gccatcattg cccagggaag gctctactgc    3000
tcaggcaccc cactcttcct gaagaactgc tttggcacag gcttgtactt aaccttggtg    3060
ggcgaatacc ccgctttgac ccttcacccc tggatatatg gcagcagta caccttcttc    3120
agcatggatg aaccaggcag tgagcagttc acggtacttg cagacgtcct cctgaataag    3180
ccaggctttg caaccgctg cctgaaggaa gggtggcttc cggagtaccc ctgtggcaac    3240
tcaacaccct ggaagactcc ttctgtgtcc ccaaacatca cccagctgtt ccagaagcag    3300
aaatggacac aggtcaaccc ttcaccatcc tgcaggtgca gcaccaggga gaagctcacc    3360
atgctgccat taaggctaca tgaactaacc aagatttatc caggcacctc cagcccagca    3420
gtggacaggc tgtgtgtcgg agttcgccct ggagagtgct ttggcctcct gggagtgaat    3480
ggtgccggca aacaaccac attcaagatg ctcactgggg acaccacagt gacctcaggg    3540
gatgccaccg tagcaggcat caaatccccg aaggacgacc tgcttcctga cctgaaccct    3600
gtggagcagt tcttccaggg gaacttccca ggcagtgtgc agagggaggt gtttgtaaat    3660
tttgcttga                                                           3669
```

<210> SEQ ID NO 7
<211> LENGTH: 3069
<212> TYPE: DNA
<213> ORGANISM: Artificial Sequence
<220> FEATURE:
<223> OTHER INFORMATION: Synthetic Polynucleotide

<400> SEQUENCE: 7

| | | | | | |
|---|---|---|---|---|---|
| atgggcttcg | tgagacagat | acagcttttg | ctctggaaga | actggaccct | gcggaaaagg | 60 |
| caaaagattc | gctttgtggt | ggaactcgtg | tggcctttat | ctttatttct | ggtcttgatc | 120 |
| tggttaagga | tgccaaccc | gctctacagc | catcatgaat | gccatttccc | caacaaggcg | 180 |
| atgccctcag | caggaatgct | gccgtggctc | caggggatct | tctgcaatgt | gaacaatccc | 240 |
| tgttttcaaa | gccccacccc | aggagaatct | cctggaattg | tgtcaaacta | taacaactcc | 300 |
| atcttggcaa | gggtatatcg | agattttcaa | gaactcctca | tgaatgcacc | agagagccag | 360 |
| caccttggcc | gtatttggac | agagctacac | atcttgtccc | aattcatgga | caccctccgg | 420 |
| actcacccgg | agagaattgc | aggaagagga | atacgaataa | gggatatctt | gaaagatgaa | 480 |
| gaaacactga | cactatttct | cattaaaaac | atcggcctgt | ctgactcagt | ggtctacctt | 540 |
| ctgatcaact | ctcaagtccg | tccagagcag | ttcgctcatg | gagtcccgga | cctggcgctg | 600 |
| aaggacatcg | cctgcagcga | ggccctcctg | gagcgcttca | tcatcttcag | ccagagacgc | 660 |
| ggggcaaaga | cggtgcgcta | tgccctgtgc | tccctctccc | agggcaccct | acagtggata | 720 |
| gaagacactc | tgtattcttt | catgatcatc | ctgaaccgct | gtttccctat | cttcatggtg | 780 |
| ctggcatgga | tctactctgt | ctccatgact | gtgaagagca | tcgtcttgga | gaaggagttg | 840 |
| cgactgaagg | agaccttgaa | aaatcagggt | gtctccaatg | cagtgatttg | gtgtacctgg | 900 |
| ttcctggaca | gcttctccat | catgtcgatg | agcatcttcc | tcctgacgat | attcatcatg | 960 |
| catggaagaa | tcctacatta | cagcgaccca | ttcatcctct | tcctgttctt | gttggctttc | 1020 |
| tccactgcca | ccatcatgct | gtgctttctg | ctcagcacct | tcttctccaa | ggccagtctg | 1080 |
| gcagcagcct | gtagtggtgt | catctatttc | accctctacc | tgccacacat | cctgtgcttc | 1140 |
| gcctggcagg | accgcatgac | cgctgagctg | aagaaggctg | tgagcttact | gtctccggtg | 1200 |
| gcatttggat | ttggcactga | gtacctggtt | cgctttgaag | agcaaggcct | ggggctgcag | 1260 |
| tggagcaaca | tcgggaacag | tcccacggaa | ggggacgaat | tcagcttcct | gctgtccatg | 1320 |
| cagatgatgc | tccttgatgc | tgctgtctat | ggcttactcg | cttggtacct | tgatcaggtg | 1380 |
| ctaacagagg | aaacggagga | tccagagcac | ccagaaggaa | tacacgactc | cttctttgaa | 1440 |
| cgtgagcatc | caggtgggt | tcctggggta | tgcgtgaaga | atctggtaaa | gattttgag | 1500 |
| ccctgtggcc | ggccagctgt | ggaccgtctg | aacatcacct | tctacgagaa | ccagatcacc | 1560 |
| gcattcctgg | gccacaatgg | agctgggaaa | accaccacct | tgtccatcct | gacgggtctg | 1620 |
| ttgccaccaa | cctctgggac | tgtgctcgtt | gggggaaggg | acattgaaac | cagcctggat | 1680 |
| gcacacaagg | acttcctggc | gcagatcgtg | ctcccggcta | cctttgtgtt | tttggctctg | 1740 |
| atgctttcta | ttgttatccc | tccttttggc | gaatacccg | ctttgaccct | tcacccctgg | 1800 |
| atatatgggc | agcagtacac | cttcttcagc | atggatgaac | caggcagtga | gcagttcacg | 1860 |
| gtacttgcag | acgtcctcct | gaataagcca | ggctttggca | accgctgcct | gaaggaaggg | 1920 |
| tggcttccgg | agtaccccctg | tggcaactca | acaccctgga | agactccttc | tgtgtcccca | 1980 |
| aacatcaccc | agctgttcca | gaagcagaaa | tggacacagg | tcaacccttc | accatcctgc | 2040 |
| aggtgcagca | ccagggagaa | gctcaccatg | ctgccaaact | tcctctggga | catcatgaat | 2100 |

```
tattccgtga gtgctgggct ggtggtgggc atcttcatcg ggtttcagaa gaaagcctac    2160
acttctccag aaaaccttcc tgcccttgtg gcactgctcc tgctgtatgg atgggcggtc    2220
attcccatga tgtacccagc atccttcctg tttgatgtcc ccagcacagc ctatgtggct    2280
ttatcttgtg ctaatctgtt catcggcatc aacagcagtg ctattacctt catcttggaa    2340
ttatttgaga ataaccggac gctgctcagg ttcaacgccg tgctgaggaa gctgctcatt    2400
gtcttccccc acttctgcct gggccggggc ctcattgacc ttgcactgag ccaggctgtg    2460
acagatgtct atgcccggtt tggtgaggag cactctgcaa atccgttcca ctgggacctg    2520
attgggaaga acctgtttgc catggtggtg aaggggtgg tgtacttcct cctgaccctg    2580
ctggtccagc gccacttctt cctctcccaa tggattgccg agcccactaa ggagcccatt    2640
gttgatgaag atgatgatgt ggctgaagaa agacaaagaa ttattactgg tggaaataaa    2700
actgacatct taaggctaca tgaactaacc aagatttatc caggcacctc cagcccagca    2760
gtggacaggc tgtgtgtcgg agttcgccct ggagagtgct ttggcctcct gggagtgaat    2820
ggtgccggca aaacaaccac attcaagatg ctcactgggg acaccacagt gacctcaggg    2880
gatgccaccg tagcaggcat caaatccccg aaggacgacc tgcttcctga cctgaaccct    2940
gtggagcagt tcttccaggg gaacttccca ggcagtgtgc agagggagag gcactacaac    3000
atgctccagt ccaggtctc ctcctcctcc ctggcgagga tcttccaggt gtttgtaaat    3060
tttgcttga                                                            3069

<210> SEQ ID NO 8
<211> LENGTH: 4401
<212> TYPE: DNA
<213> ORGANISM: Artificial Sequence
<220> FEATURE:
<223> OTHER INFORMATION: Synthetic Polynucleotide

<400> SEQUENCE: 8
atgggcttcg tgagacagat acagcttttg ctctggaaga actggaccct gcggaaaagg      60
caaaagattc gctttgtggt ggaactcgtg tggcctttat ctttatttct ggtcttgatc     120
tggttaaggg ccaacgtgga cttcttcaag ctcttccgtg tgcttccac actcctagac     180 agccgttctc aaggtatcaa tctgagatct tggggaggaa tattatctga tatgtcacca     240
agaattcaag agtttatcca tcggccgagt atgcaggact gctgtgggt gaccaggccc     300 ctcatgcaga atggtggtcc agagacccttt acaaagctga tgggcatcct gtctgacctc     360
ctgtgtggct accccgaggg aggtggctct cgggtgctct ccttcaactg gtatgaagac     420
aataactata aggcctttct ggggattgac tccacaagga aggatcctat ctattcttat     480
gacagaagaa caacatcctt ttgtaatgca ttgatccaga gctggagtc aaatcctta     540 accaaaatcg cttggagggc ggcaaagcct ttgctgatgg aaaaatcct gtacactcct     600 gattcacctg cagcacgaag gatactgaag aatgccaact caacttttga gaactggaa     660 cacgttagga agttggtcaa agcctgggaa gaagtagggc cccagatctg gtacttcttt     720
gacaacagca cacagatgaa catgatcaga gataccctgg ggaacccaac agtaaaagac     780
tttttgaata ggcagcttgg tgaagaaggt attactgctg aagccatcct aaacttcctc     840
tacaagggcc ctcgggaaag ccaggctgac gacatggcca acttcgactg gagggacata     900
tttaacatca ctgatcgcac cctccgcctg gtcaatcaat acctggagtg cttggtcctg     960
gataagtttg aaagctacaa tgatgaaact cagctcaccc aacgtgccct ctctctactg    1020
```

```
gaggaaaaca tgttctgggc cggagtggta ttccctgaca tgtatccctg gaccagctct    1080
ctaccacccc acgtgaagta taagatccga atggacatag acgtggtgga gaaaaccaat    1140
aagattaaag acaggtattg ggattctggt cccagagctg atcccgtgga agatttccgg    1200
tacatctggg gcgggtttgc ctatctgcag gacatggttg aacagaggga cacaaggagc    1260
caggtgcagg cggaggctcc agttggaatc tacctccagc agatgcccta cccctgcttc    1320
gtggacgatt ctttcatgat catcctgaac cgctgtttcc ctatcttcat ggtgctggca    1380
tggatctact ctgtctccat gactgtgaag agcatcgtct tggagaagga gttgcgactg    1440
aaggagacct tgaaaaatca gggtgtctcc aatgcagtga tttggtgtac ctggttcctg    1500
gacagcttct ccatcatgtc gatgagcatc ttcctcctga cgatattcat catgcatgga    1560
agaatcctac attacagcga cccattcatc ctcttcctgt tcttgttggc tttctccact    1620
gccaccatca tgctgtgctt tctgctcagc accttcttct ccaaggccag tctggcagca    1680
gcctgtagtg gtgtcatcta tttcacccct acctgccac acatcctgtg cttcgcctgg    1740
caggaccgca tgaccgctga gctgaagaag gctgtgagct actgtctccc ggtggcattt    1800
ggatttggca ctgagtacct ggttcgcttt gaagagcaag gcctgggggct gcagtggagc    1860 aacatcggga acagtcccac ggaagggggac gaattcagct tcctgctgtc catgcagatg    1920
atgctccttg atgctgctgt ctatggctta ctcgcttggt accttgatca ggtggtccgg    1980
cagagccttg gcatgtgtcc acagcacaac atcctgttcc accacctcac ggtggctgag    2040
cacatgctgt tctatgccca gctgaaagga aagtcccagg aggagcccca gctggagatg    2100
gaagccatgt tggaggacac aggcctccac cacaagcgga atgaagaggc tcaggaccta    2160
tcaggtggca tgcagagaaa gctgtcggtt gccattgcct ttgtgggaga tgccaaggtg    2220
gtgattctgg acgaacccac ctctggggtg gaccctatct cgagacgctc aatctgggat    2280
ctgctcctga agtatcgctc aggcagaacc atcatcatgt ccactcacca catggacgag    2340
gccgacctcc ttggggaccg cattgccatc attgcccagg gaaggctcta ctgctcaggc    2400
accccactct tcctgaagaa ctgctttggc acaggcttgt acttaacctt ggtgcgcaag    2460
atgaaaaaca tccagagcca aaggaaaggc agtgagggga cctgcagctg ctcgtctaag    2520
ggtttctcca ccacgtgtcc agcccacgtc gatgacctaa ctccagaaca agtccacaag    2580
gacttcctgg cgcagatcgt gctcccggct acctttgtgt ttttggctct gatgctttct    2640
attgagtgcc ccgagggtgc cggggggcctc ccgcccccc agagaacaca gcgcagcacg    2700
gaaattctac aagacctgac ggacaggaac atctccgact tcttggtaaa aacgtatcct    2760
gctcttataa gaagcagctt aaagagcaaa ttctgggtca atgaacagag gtatggagga    2820
atttccattg gaggaaagct cccagtcgtc cccatcacgg gggaagcact tgttgggttt    2880
ttaagcgacc ttggccggat catgaatgtg agcgggggcc ctatcactag agaggcctct    2940
aaagaaatac ctgatttcct taaacatcta gaaactgaag acaacattaa ggtgtggttt    3000
aataacaaag gctggcatgc cctggtcagc tttctcaatg tggcccacaa cgccatctta    3060
cgggccagcc tgcctaagga caggagcccc gagaacttcc tctgggacat catgaattat    3120
tccgtgagtg ctgggctggt ggtgggcatc ttcatcgggt tcagaagaa agcctacact    3180 tctccagaaa accttcctgc ccttgtggca ctgctcctgc tgtatggatg gcggtcatt    3240 cccatgatgt acccagcatc cttcctgttt gatgtcccca gcacagccta tgtggcttta    3300
tcttgtgcta atctgttcat cggcatcaac agcagtgcta ttaccttcat cttgaatta    3360 tttgagaata accggacgct gctcaggttc aacgccgtgc tgaggaagct gctcattgtc    3420
```

-continued

```
ttcccccact tctgcctggg ccggggcctc attgaccttg cactgagcca ggctgtgaca    3480
gatgtctatg cccggtttgg tgaggagcac tctgcaaatc cgttccactg ggacctgatt    3540
gggaagaacc tgtttgccat ggtggtggaa ggggtggtgt acttcctcct gaccctgctg    3600
gtccagcgcc acttcttcct ctcccaatgg attgccgagc ccactaagga gcccattgtt    3660
gatgaagatg atgatgtggc tgaagaaaga caaagaatta ttactggtgg aaataaaact    3720
gacatcttaa agagtatttt aaccaatatt tctgaagtcc atcaaaatat gggctactgt    3780
cctcagtttg atgcaattga tgagctgctc acaggacgag aacatcttta cctttatgcc    3840
cggcttcgag gtgtaccagc agaagaaatc gaaaaggttg caaactggag tattaagagc    3900
ctgggcctga ctgtctacgc cgactgcctg gctggcacgt acagtggggg caacaagcgg    3960
aaactctcca cagccatcgc actcattggc tgcccaccgc tggtgctgct ggatgagccc    4020
accacaggga tggacccca ggcacgccgc atgctgtgga acgtcatcgt gagcatcatc    4080
agagaaggga gggctgtggt cctcacatcc cacagcatgg aagaatgtga ggcactgtgt    4140
acccggctgg ccatcatggt aaagggcgcc tttcgatgta tgggcaccat tcagcatctc    4200
aagtccaaat tggagatgg ctatatcgtc acaatgaagc tcctcctctc ccacaaggac    4260
agcctgctca tcgaggagta ctcagtcaca cagaccacac tggaccaggt gtttgtaaat    4320
tttgctaaac agcagactga aagtcatgac ctccctctgc accctcgagc tgctggagcc    4380
agtcgacaag cccaggactg a                                              4401
```

<210> SEQ ID NO 9
<211> LENGTH: 1271
<212> TYPE: PRT
<213> ORGANISM: Artificial Sequence
<220> FEATURE:
<223> OTHER INFORMATION: Synthetic Polypeptide

<400> SEQUENCE: 9

Met Gly Phe Val Arg Gln Ile Gln Leu Leu Leu Trp Lys Asn Trp Thr
1               5                   10                  15

Leu Arg Lys Arg Gln Lys Ile Arg Phe Val Val Glu Leu Val Trp Pro
            20                  25                  30

Leu Ser Leu Phe Leu Val Leu Ile Trp Leu Arg Asn Ala Asn Pro Leu
        35                  40                  45

Tyr Ser His His Glu Cys His Phe Pro Asn Lys Ala Met Pro Ser Ala
    50                  55                  60

Gly Met Leu Pro Trp Leu Gln Gly Ile Phe Cys Asn Val Asn Asn Pro
65                  70                  75                  80

Cys Phe Gln Ser Pro Thr Pro Gly Glu Ser Pro Gly Ile Val Ser Asn
                85                  90                  95

Tyr Asn Asn Ser Ile Leu Ala Arg Val Tyr Arg Asp Phe Gln Glu Leu
            100                 105                 110

Leu Met Asn Ala Pro Glu Ser Gln His Leu Gly Arg Ile Trp Thr Glu
        115                 120                 125

Leu His Ile Leu Ser Gln Phe Met Asp Thr Leu Arg Thr His Pro Glu
    130                 135                 140

Arg Ile Ala Gly Arg Gly Ile Arg Ile Arg Asp Ile Leu Lys Asp Glu
145                 150                 155                 160

Glu Thr Leu Thr Leu Phe Leu Ile Lys Asn Ile Gly Leu Ser Asp Ser
                165                 170                 175

Val Val Tyr Leu Leu Ile Asn Ser Gln Val Arg Pro Glu Gln Phe Ala

```
                180             185             190
His Gly Val Pro Asp Leu Ala Leu Lys Asp Ile Ala Cys Ser Glu Ala
            195             200             205
Leu Leu Glu Arg Phe Ile Ile Phe Ser Gln Arg Gly Ala Lys Thr
            210             215             220
Val Arg Tyr Ala Leu Cys Ser Leu Ser Gln Gly Thr Leu Gln Trp Ile
225             230             235             240
Glu Asp Thr Leu Tyr Ser Phe Met Ile Ile Leu Asn Arg Cys Phe Pro
            245             250             255
Ile Phe Met Val Leu Ala Trp Ile Tyr Ser Val Ser Met Thr Val Lys
            260             265             270
Ser Ile Val Leu Glu Lys Glu Leu Arg Leu Lys Glu Thr Leu Lys Asn
            275             280             285
Gln Gly Val Ser Asn Ala Val Ile Trp Cys Thr Trp Phe Leu Asp Ser
            290             295             300
Phe Ser Ile Met Ser Met Ser Ile Phe Leu Leu Thr Ile Phe Ile Met
305             310             315             320
His Gly Arg Ile Leu His Tyr Ser Asp Pro Phe Ile Leu Phe Leu Phe
            325             330             335
Leu Leu Ala Phe Ser Thr Ala Thr Ile Met Leu Cys Phe Leu Leu Ser
            340             345             350
Thr Phe Phe Ser Lys Ala Ser Leu Ala Ala Ala Cys Ser Gly Val Ile
            355             360             365
Tyr Phe Thr Leu Tyr Leu Pro His Ile Leu Cys Phe Ala Trp Gln Asp
            370             375             380
Arg Met Thr Ala Glu Leu Lys Lys Ala Val Ser Leu Leu Ser Pro Val
385             390             395             400
Ala Phe Gly Phe Gly Thr Glu Tyr Leu Val Arg Phe Glu Glu Gln Gly
            405             410             415
Leu Gly Leu Gln Trp Ser Asn Ile Gly Asn Ser Pro Thr Glu Gly Asp
            420             425             430
Glu Phe Ser Phe Leu Leu Ser Met Gln Met Met Leu Leu Asp Ala Ala
            435             440             445
Val Tyr Gly Leu Leu Ala Trp Tyr Leu Asp Gln Val Val Cys Val Lys
            450             455             460
Asn Leu Val Lys Ile Phe Glu Pro Cys Gly Arg Pro Ala Val Asp Arg
465             470             475             480
Leu Asn Ile Thr Phe Tyr Glu Asn Gln Ile Thr Ala Phe Leu Gly His
            485             490             495
Asn Gly Ala Gly Lys Thr Thr Thr Leu Ser Ile Leu Thr Gly Leu Leu
            500             505             510
Pro Pro Thr Ser Gly Thr Val Leu Val Gly Gly Arg Asp Ile Glu Thr
            515             520             525
Ser Leu Asp Ala Val Arg Gln Ser Leu Gly Met Cys Pro Gln His Asn
            530             535             540
Ile Leu Phe His His Leu Thr Val Ala Glu His Met Leu Phe Tyr Ala
545             550             555             560
Gln Leu Lys Gly Lys Ser Gln Glu Glu Ala Gln Leu Glu Met Glu Ala
            565             570             575
Met Leu Glu Asp Thr Gly Leu His His Lys Arg Asn Glu Glu Ala Gln
            580             585             590
Asp Leu Ser Gly Gly Met Gln Arg Lys Leu Ser Val Ala Ile Ala Phe
            595             600             605
```

```
Val Gly Asp Ala Lys Val Val Ile Leu Asp Glu Pro Thr Ser Gly Val
610                 615                 620

Asp Pro Tyr Ser Arg Arg Ser Ile Trp Asp Leu Leu Lys Tyr Arg
625                 630                 635                 640

Ser Gly Arg Thr Ile Ile Met Ser Thr His His Met Asp Glu Ala Asp
                645                 650                 655

Leu Leu Gly Asp Arg Ile Ala Ile Ala Gln Gly Arg Leu Tyr Cys
                660                 665                 670

Ser Gly Thr Pro Leu Phe Leu Lys Asn Cys Phe Gly Thr Gly Leu Tyr
                675                 680                 685

Leu Thr Leu Val Gly Glu Tyr Pro Ala Leu Thr Leu His Pro Trp Ile
690                 695                 700

Tyr Gly Gln Gln Tyr Thr Phe Phe Ser Met Asp Glu Pro Gly Ser Glu
705                 710                 715                 720

Gln Phe Thr Val Leu Ala Asp Val Leu Leu Asn Lys Pro Gly Phe Gly
                725                 730                 735

Asn Arg Cys Leu Lys Glu Gly Trp Leu Pro Glu Tyr Pro Cys Gly Asn
                740                 745                 750

Ser Thr Pro Trp Lys Thr Pro Ser Val Ser Pro Asn Ile Thr Gln Leu
                755                 760                 765

Phe Gln Lys Gln Lys Trp Thr Gln Val Asn Pro Ser Pro Ser Cys Arg
770                 775                 780

Cys Ser Thr Arg Glu Lys Leu Thr Met Leu Pro Glu Cys Pro Glu Gly
785                 790                 795                 800

Ala Gly Gly Leu Pro Pro Gln Arg Thr Gln Arg Ser Thr Glu Ile
                805                 810                 815

Leu Gln Asp Leu Thr Asp Arg Asn Ile Ser Asp Phe Leu Val Lys Thr
                820                 825                 830

Tyr Pro Ala Leu Ile Arg Ser Ser Leu Lys Ser Lys Phe Trp Val Asn
                835                 840                 845

Glu Gln Arg Tyr Gly Gly Ile Ser Ile Gly Gly Lys Leu Pro Val Val
850                 855                 860

Pro Ile Thr Gly Glu Ala Leu Val Gly Phe Leu Ser Asp Leu Gly Arg
865                 870                 875                 880

Ile Met Asn Val Ser Gly Gly Pro Ile Thr Arg Glu Ala Ser Lys Glu
                885                 890                 895

Ile Pro Asp Phe Leu Lys His Leu Gly Thr Glu Asp Asn Ile Lys Val
                900                 905                 910

Trp Phe Asn Asn Lys Gly Trp His Ala Leu Val Ser Phe Leu Asn Val
                915                 920                 925

Ala His Asn Ala Ile Leu Arg Leu Arg Leu His Glu Leu Thr Lys Ile
930                 935                 940

Tyr Pro Gly Thr Ser Ser Pro Ala Val Asp Arg Leu Cys Val Gly Val
945                 950                 955                 960

Arg Pro Gly Glu Cys Phe Gly Leu Leu Gly Val Asn Gly Ala Gly Lys
                965                 970                 975

Thr Thr Thr Phe Lys Met Leu Thr Gly Asp Thr Thr Val Thr Ser Gly
                980                 985                 990

Asp Ala Thr Val Ala Gly Lys Ser  Ile Leu Thr Asn Ile  Ser Glu Val
                995                 1000                1005

His Gln Asn Met Gly Tyr Cys  Pro Gln Phe Asp Ala  Ile Asp Glu
    1010                1015                1020
```

```
Leu Leu Thr Gly Arg Glu His Leu Tyr Leu Tyr Ala Arg Leu Arg
    1025                1030                1035

Gly Val Pro Ala Glu Glu Ile Glu Lys Val Ala Asn Trp Ser Ile
    1040                1045                1050

Lys Ser Leu Gly Leu Thr Val Tyr Ala Asp Cys Leu Ala Gly Thr
    1055                1060                1065

Tyr Ser Gly Gly Asn Lys Arg Lys Leu Ser Thr Ala Ile Ala Leu
    1070                1075                1080

Ile Gly Cys Pro Pro Leu Val Leu Leu Asp Glu Pro Thr Thr Gly
    1085                1090                1095

Met Asp Pro Gln Ala Arg Arg Met Leu Trp Asn Val Ile Val Ser
    1100                1105                1110

Ile Ile Arg Glu Gly Arg Ala Val Val Leu Thr Ser His Ser Met
    1115                1120                1125

Glu Glu Cys Glu Ala Leu Cys Thr Arg Leu Ala Ile Met Val Lys
    1130                1135                1140

Gly Ala Phe Arg Cys Met Gly Thr Ile Gln His Leu Lys Ser Lys
    1145                1150                1155

Phe Gly Asp Gly Tyr Ile Val Thr Met Lys Ile Lys Ser Pro Lys
    1160                1165                1170

Asp Asp Leu Leu Pro Asp Leu Asn Pro Val Glu Gln Phe Phe Gln
    1175                1180                1185

Gly Asn Phe Pro Gly Ser Val Gln Arg Glu Arg His Tyr Asn Met
    1190                1195                1200

Leu Gln Phe Gln Val Ser Ser Ser Leu Ala Arg Ile Phe Gln
    1205                1210                1215

Leu Leu Leu Ser His Lys Asp Ser Leu Leu Ile Glu Glu Tyr Ser
    1220                1225                1230

Val Thr Gln Thr Thr Leu Asp Gln Val Phe Val Asn Phe Ala Lys
    1235                1240                1245

Gln Gln Thr Glu Ser His Asp Leu Pro Leu His Pro Arg Ala Ala
    1250                1255                1260

Gly Ala Ser Arg Gln Ala Gln Asp
    1265                1270

<210> SEQ ID NO 10
<211> LENGTH: 1267
<212> TYPE: PRT
<213> ORGANISM: Artificial Sequence
<220> FEATURE:
<223> OTHER INFORMATION: Synthetic Polypeptide

<400> SEQUENCE: 10

Met Gly Phe Val Arg Gln Ile Gln Leu Leu Leu Trp Lys Asn Trp Thr
1               5                   10                  15

Leu Arg Lys Arg Gln Lys Ile Arg Phe Val Val Glu Leu Val Trp Pro
                20                  25                  30

Leu Ser Leu Phe Leu Val Leu Ile Trp Leu Arg Asn Ala Asn Pro Leu
            35                  40                  45

Tyr Ser His His Glu Cys His Phe Pro Asn Lys Ala Met Pro Ser Ala
        50                  55                  60

Gly Met Leu Pro Trp Leu Gln Gly Ile Phe Cys Asn Val Asn Asn Pro
65                  70                  75                  80

Cys Phe Gln Ser Pro Thr Pro Gly Glu Ser Pro Gly Ile Val Ser Asn
                85                  90                  95
```

```
Tyr Asn Asn Ser Ile Leu Ala Arg Val Tyr Arg Asp Phe Gln Glu Leu
                100                 105                 110
Leu Met Asn Ala Pro Glu Ser Gln His Leu Gly Arg Ile Trp Thr Glu
        115                 120                 125
Leu His Ile Leu Ser Gln Phe Met Asp Thr Leu Arg Thr His Pro Glu
    130                 135                 140
Arg Ile Ala Gly Arg Gly Ile Arg Ile Arg Asp Ile Leu Lys Asp Glu
145                 150                 155                 160
Glu Thr Leu Thr Leu Phe Leu Ile Lys Asn Ile Gly Leu Ser Asp Ser
                165                 170                 175
Val Val Tyr Leu Leu Ile Asn Ser Gln Val Arg Pro Glu Gln Phe Ala
            180                 185                 190
His Gly Val Pro Asp Leu Ala Leu Lys Asp Ile Ala Cys Ser Glu Ala
        195                 200                 205
Leu Leu Glu Arg Phe Ile Ile Phe Ser Gln Arg Arg Gly Ala Lys Thr
    210                 215                 220
Val Arg Tyr Ala Leu Cys Ser Leu Ser Gln Gly Thr Leu Gln Trp Ile
225                 230                 235                 240
Glu Asp Thr Leu Tyr Val Cys Val Lys Asn Leu Val Lys Ile Phe Glu
                245                 250                 255
Pro Cys Gly Arg Pro Ala Val Asp Arg Leu Asn Ile Thr Phe Tyr Glu
            260                 265                 270
Asn Gln Ile Thr Ala Phe Leu Gly His Asn Gly Ala Gly Lys Thr Thr
        275                 280                 285
Thr Leu Ser Ile Leu Thr Gly Leu Leu Pro Pro Thr Ser Gly Thr Val
    290                 295                 300
Leu Val Gly Gly Arg Asp Ile Glu Thr Ser Leu Asp Ala Val Arg Gln
305                 310                 315                 320
Ser Leu Gly Met Cys Pro Gln His Asn Ile Leu Phe His His Leu Thr
                325                 330                 335
Val Ala Glu His Met Leu Phe Tyr Ala Gln Leu Lys Gly Lys Ser Gln
            340                 345                 350
Glu Glu Ala Gln Leu Glu Met Glu Ala Met Leu Glu Asp Thr Gly Leu
        355                 360                 365
His His Lys Arg Asn Glu Glu Ala Gln Asp Leu Ser Gly Gly Met Gln
    370                 375                 380
Arg Lys Leu Ser Val Ala Ile Ala Phe Val Gly Asp Ala Lys Val Val
385                 390                 395                 400
Ile Leu Asp Glu Pro Thr Ser Gly Val Asp Pro Tyr Ser Arg Arg Ser
                405                 410                 415
Ile Trp Asp Leu Leu Leu Lys Tyr Arg Ser Gly Arg Thr Ile Ile Met
            420                 425                 430
Ser Thr His His Met Asp Glu Ala Asp Leu Leu Gly Asp Arg Ile Ala
        435                 440                 445
Ile Ile Ala Gln Gly Arg Leu Tyr Cys Ser Gly Thr Pro Leu Phe Leu
    450                 455                 460
Lys Asn Cys Phe Gly Thr Gly Leu Tyr Leu Thr Leu Val Gly Glu Tyr
465                 470                 475                 480
Pro Ala Leu Thr Leu His Pro Trp Ile Tyr Gly Gln Gln Tyr Thr Phe
                485                 490                 495
Phe Ser Met Asp Glu Pro Gly Ser Glu Gln Phe Thr Val Leu Ala Asp
            500                 505                 510
Val Leu Leu Asn Lys Pro Gly Phe Gly Asn Arg Cys Leu Lys Glu Gly
```

-continued

```
            515                 520                 525
Trp Leu Pro Glu Tyr Pro Cys Gly Asn Ser Thr Pro Trp Lys Thr Pro
        530                 535                 540
Ser Val Ser Pro Asn Ile Thr Gln Leu Phe Gln Lys Gln Lys Trp Thr
545                 550                 555                 560
Gln Val Asn Pro Ser Pro Ser Cys Arg Cys Ser Thr Arg Glu Lys Leu
                565                 570                 575
Thr Met Leu Pro Glu Cys Pro Glu Gly Ala Gly Gly Leu Pro Pro Pro
                580                 585                 590
Gln Arg Thr Gln Arg Ser Thr Glu Ile Leu Gln Asp Leu Thr Asp Arg
            595                 600                 605
Asn Ile Ser Asp Phe Leu Val Lys Thr Tyr Pro Ala Leu Ile Arg Ser
        610                 615                 620
Ser Leu Lys Ser Lys Phe Trp Val Asn Glu Gln Arg Tyr Gly Gly Ile
625                 630                 635                 640
Ser Ile Gly Gly Lys Leu Pro Val Val Pro Ile Thr Gly Glu Ala Leu
                645                 650                 655
Val Gly Phe Leu Ser Asp Leu Gly Arg Ile Met Asn Val Ser Gly Gly
                660                 665                 670
Pro Ile Thr Arg Glu Ala Ser Lys Glu Ile Pro Asp Phe Leu Lys His
            675                 680                 685
Leu Glu Thr Glu Asp Asn Ile Lys Val Trp Phe Asn Asn Lys Gly Trp
        690                 695                 700
His Ala Leu Val Ser Phe Leu Asn Val Ala His Asn Ala Ile Leu Arg
705                 710                 715                 720
Asn Phe Leu Trp Asp Ile Met Asn Tyr Ser Val Ser Ala Gly Leu Val
                725                 730                 735
Val Gly Ile Phe Ile Gly Phe Gln Lys Lys Ala Tyr Thr Ser Pro Glu
                740                 745                 750
Asn Leu Pro Ala Leu Val Ala Leu Leu Leu Tyr Gly Trp Ala Val
            755                 760                 765
Ile Pro Met Met Tyr Pro Ala Ser Phe Leu Phe Asp Val Pro Ser Thr
        770                 775                 780
Ala Tyr Val Ala Leu Ser Cys Ala Asn Leu Phe Ile Gly Ile Asn Ser
785                 790                 795                 800
Ser Ala Ile Thr Phe Ile Leu Glu Leu Phe Glu Asn Asn Arg Thr Leu
                805                 810                 815
Leu Arg Phe Asn Ala Val Leu Arg Lys Leu Leu Ile Val Phe Pro His
            820                 825                 830
Phe Cys Leu Gly Arg Gly Leu Ile Asp Leu Ala Leu Ser Gln Ala Val
        835                 840                 845
Thr Asp Val Tyr Ala Arg Phe Gly Glu Glu His Ser Ala Asn Pro Phe
850                 855                 860
His Trp Asp Leu Ile Gly Lys Asn Leu Phe Ala Met Val Val Glu Gly
865                 870                 875                 880
Val Val Tyr Phe Leu Leu Thr Leu Leu Val Gln Arg His Phe Phe Leu
                885                 890                 895
Ser Gln Trp Ile Ala Glu Pro Thr Lys Glu Pro Ile Val Asp Glu Asp
            900                 905                 910
Asp Asp Val Ala Glu Glu Arg Gln Arg Ile Ile Thr Gly Gly Asn Lys
        915                 920                 925
Thr Asp Ile Leu Arg Leu His Glu Leu Thr Lys Ile Tyr Pro Gly Thr
930                 935                 940
```

```
Ser Ser Pro Ala Val Asp Arg Leu Cys Val Gly Val Arg Pro Gly Glu
945                 950                 955                 960

Cys Phe Gly Leu Leu Gly Val Asn Gly Ala Gly Lys Thr Thr Thr Phe
                965                 970                 975

Lys Met Leu Thr Gly Asp Thr Thr Val Thr Ser Gly Asp Ala Thr Val
            980                 985                 990

Ala Gly Lys Ser Ile Leu Thr Asn Ile Ser Glu Val His Gln Asn Met
        995                 1000                1005

Gly Tyr Cys Pro Gln Phe Asp Ala Ile Asp Glu Leu Leu Thr Gly
    1010                1015                1020

Arg Glu His Leu Tyr Leu Tyr Ala Arg Leu Arg Gly Val Pro Ala
    1025                1030                1035

Glu Glu Ile Glu Lys Val Ala Asn Trp Ser Ile Lys Ser Leu Gly
    1040                1045                1050

Leu Thr Val Tyr Ala Asp Cys Leu Ala Gly Thr Tyr Ser Gly Gly
    1055                1060                1065

Asn Lys Arg Lys Leu Ser Thr Ala Ile Ala Leu Ile Gly Cys Pro
    1070                1075                1080

Pro Leu Val Leu Leu Asp Glu Pro Thr Thr Gly Met Asp Pro Gln
    1085                1090                1095

Ala Arg Arg Met Leu Trp Asn Val Ile Val Ser Ile Ile Arg Glu
    1100                1105                1110

Gly Arg Ala Val Val Leu Thr Ser His Ser Met Glu Glu Cys Glu
    1115                1120                1125

Ala Leu Cys Thr Arg Leu Ala Ile Met Val Lys Gly Ala Phe Arg
    1130                1135                1140

Cys Met Gly Thr Ile Gln His Leu Lys Ser Lys Phe Gly Asp Gly
    1145                1150                1155

Tyr Ile Val Thr Met Lys Ile Lys Ser Pro Lys Asp Asp Leu Leu
    1160                1165                1170

Pro Asp Leu Asn Pro Val Glu Gln Phe Phe Gln Gly Asn Phe Pro
    1175                1180                1185

Gly Ser Val Gln Arg Glu Arg His Tyr Asn Met Leu Gln Phe Gln
    1190                1195                1200

Val Ser Ser Ser Ser Leu Ala Arg Ile Phe Gln Leu Leu Leu Ser
    1205                1210                1215

His Lys Asp Ser Leu Leu Ile Glu Glu Tyr Ser Val Thr Gln Thr
    1220                1225                1230

Thr Leu Asp Gln Val Phe Val Asn Phe Ala Lys Gln Gln Thr Glu
    1235                1240                1245

Ser His Asp Leu Pro Leu His Pro Arg Ala Ala Gly Ala Ser Arg
    1250                1255                1260

Gln Ala Gln Asp
    1265

<210> SEQ ID NO 11
<211> LENGTH: 1353
<212> TYPE: PRT
<213> ORGANISM: Artificial Sequence
<220> FEATURE:
<223> OTHER INFORMATION: Synthetic Polypeptide

<400> SEQUENCE: 11

Met Gly Phe Val Arg Gln Ile Gln Leu Leu Leu Trp Lys Asn Trp Thr
1               5                   10                  15
```

```
Leu Arg Lys Arg Gln Lys Ile Arg Phe Val Glu Leu Val Trp Pro
         20                  25                  30

Leu Ser Leu Phe Leu Val Leu Ile Trp Leu Arg Asn Ala Asn Pro Leu
     35                  40                  45

Tyr Ser His His Glu Cys His Phe Pro Asn Lys Ala Met Pro Ser Ala
     50                  55                  60

Gly Met Leu Pro Trp Leu Gln Gly Ile Phe Cys Asn Val Asn Asn Pro
 65              70                  75                  80

Cys Phe Gln Ser Pro Thr Pro Gly Glu Ser Pro Gly Ile Val Ser Asn
             85                  90                  95

Tyr Asn Asn Ser Ile Leu Ala Arg Val Tyr Arg Asp Phe Gln Glu Leu
            100                 105                 110

Leu Met Asn Ala Pro Glu Ser Gln His Leu Gly Arg Ile Trp Thr Glu
            115                 120                 125

Leu His Ile Leu Ser Gln Phe Met Asp Thr Leu Arg Thr His Pro Glu
    130                 135                 140

Arg Ile Ala Gly Arg Gly Ile Arg Ile Arg Asp Ile Leu Lys Asp Glu
145                 150                 155                 160

Glu Thr Leu Thr Leu Phe Leu Ile Lys Asn Ile Gly Leu Ser Asp Ser
                165                 170                 175

Val Val Tyr Leu Leu Ile Asn Ser Gln Val Arg Pro Glu Gln Phe Ala
            180                 185                 190

His Gly Val Pro Asp Leu Ala Leu Lys Asp Ile Ala Cys Ser Glu Ala
        195                 200                 205

Leu Leu Glu Arg Phe Ile Ile Phe Ser Gln Arg Arg Gly Ala Lys Thr
    210                 215                 220

Val Arg Tyr Ala Leu Cys Ser Leu Ser Gln Gly Thr Leu Gln Trp Ile
225                 230                 235                 240

Glu Asp Thr Leu Tyr Ala Asn Val Asp Phe Phe Lys Leu Phe Arg Val
                245                 250                 255

Leu Pro Thr Leu Leu Asp Ser Arg Ser Gln Gly Ile Asn Leu Arg Ser
            260                 265                 270

Trp Gly Gly Ile Leu Ser Asp Met Ser Pro Arg Ile Gln Glu Phe Ile
        275                 280                 285

His Arg Pro Ser Met Gln Asp Leu Leu Trp Val Thr Arg Pro Leu Met
    290                 295                 300

Gln Asn Gly Gly Pro Glu Thr Phe Thr Lys Leu Met Gly Ile Leu Ser
305                 310                 315                 320

Asp Leu Leu Cys Gly Tyr Pro Glu Gly Gly Ser Arg Val Leu Ser
                325                 330                 335

Phe Asn Trp Tyr Glu Asp Asn Asn Tyr Lys Ala Phe Leu Gly Ile Asp
            340                 345                 350

Ser Thr Arg Lys Asp Pro Ile Tyr Ser Tyr Asp Arg Arg Thr Thr Ser
            355                 360                 365

Phe Cys Asn Ala Leu Ile Gln Ser Leu Glu Ser Asn Pro Leu Thr Lys
    370                 375                 380

Ile Ala Trp Arg Ala Ala Lys Pro Leu Leu Met Gly Lys Ile Leu Tyr
385                 390                 395                 400

Thr Pro Asp Ser Pro Ala Ala Arg Arg Ile Leu Lys Asn Ala Asn Ser
                405                 410                 415

Thr Phe Glu Glu Leu Glu His Val Arg Lys Leu Val Lys Ala Trp Glu
            420                 425                 430
```

-continued

Glu Val Gly Pro Gln Ile Trp Tyr Phe Phe Asp Asn Ser Thr Gln Met
            435                 440                 445

Asn Met Ile Arg Asp Thr Leu Gly Asn Pro Thr Val Lys Asp Phe Leu
450                 455                 460

Asn Arg Gln Leu Gly Glu Gly Ile Thr Ala Glu Ala Ile Leu Asn
465                 470                 475                 480

Phe Leu Tyr Lys Gly Pro Arg Glu Ser Gln Ala Asp Asp Met Ala Asn
                485                 490                 495

Phe Asp Trp Arg Asp Ile Phe Asn Ile Thr Asp Arg Thr Leu Arg Leu
                500                 505                 510

Val Asn Gln Tyr Leu Glu Cys Leu Val Leu Asp Lys Phe Glu Ser Tyr
            515                 520                 525

Asn Asp Glu Thr Gln Leu Thr Gln Arg Ala Leu Ser Leu Leu Glu Glu
530                 535                 540

Asn Met Phe Trp Ala Gly Val Val Phe Pro Asp Met Tyr Pro Trp Thr
545                 550                 555                 560

Ser Ser Leu Pro Pro His Val Lys Tyr Lys Ile Arg Met Asp Ile Asp
                565                 570                 575

Val Val Glu Lys Thr Asn Lys Ile Lys Asp Arg Tyr Trp Asp Ser Gly
            580                 585                 590

Pro Arg Ala Asp Pro Val Glu Asp Phe Arg Tyr Ile Trp Gly Gly Phe
            595                 600                 605

Ala Tyr Leu Gln Asp Met Val Glu Gln Gly Ile Thr Arg Ser Gln Val
            610                 615                 620

Gln Ala Glu Ala Pro Val Gly Ile Tyr Leu Gln Gln Met Pro Tyr Pro
625                 630                 635                 640

Cys Phe Val Asp Asp Ser Phe Met Ile Ile Leu Asn Arg Cys Phe Pro
                645                 650                 655

Ile Phe Met Val Leu Ala Trp Ile Tyr Ser Val Ser Met Thr Val Lys
                660                 665                 670

Ser Ile Val Leu Glu Lys Glu Leu Arg Leu Lys Glu Thr Leu Lys Asn
            675                 680                 685

Gln Gly Val Ser Asn Ala Val Ile Trp Cys Thr Trp Phe Leu Asp Ser
690                 695                 700

Phe Ser Ile Met Ser Met Ser Ile Phe Leu Leu Thr Ile Phe Ile Met
705                 710                 715                 720

His Gly Arg Ile Leu His Tyr Ser Asp Pro Phe Ile Leu Phe Leu Phe
                725                 730                 735

Leu Leu Ala Phe Ser Thr Ala Thr Ile Met Leu Cys Phe Leu Leu Ser
                740                 745                 750

Thr Phe Phe Ser Lys Ala Ser Leu Ala Ala Ala Cys Ser Gly Val Ile
                755                 760                 765

Tyr Phe Thr Leu Tyr Leu Pro His Ile Leu Cys Phe Ala Trp Gln Asp
                770                 775                 780

Arg Met Thr Ala Glu Leu Lys Lys Ala Val Ser Leu Leu Ser Pro Val
785                 790                 795                 800

Ala Phe Gly Phe Gly Thr Glu Tyr Leu Val Arg Phe Glu Glu Gln Gly
                805                 810                 815

Leu Gly Leu Gln Trp Ser Asn Ile Gly Asn Ser Pro Thr Glu Gly Asp
                820                 825                 830

Glu Phe Ser Phe Leu Leu Ser Met Gln Met Met Leu Leu Asp Ala Ala
                835                 840                 845

Val Tyr Gly Leu Leu Ala Trp Tyr Leu Asp Gln Val Leu Thr Glu Glu

```
                850             855             860
Thr Glu Asp Pro Glu His Pro Glu Gly Ile His Asp Ser Phe Phe Glu
865                 870             875                 880

Arg Glu His Pro Gly Trp Val Pro Val Cys Val Lys Asn Leu Val
            885             890                 895

Lys Ile Phe Glu Pro Cys Gly Arg Pro Ala Val Asp Arg Leu Asn Ile
                900             905                 910

Thr Phe Tyr Glu Asn Gln Ile Thr Ala Phe Leu Gly His Asn Gly Ala
            915             920             925

Gly Lys Thr Thr Thr Leu Ser Ile Leu Thr Gly Leu Leu Pro Pro Thr
        930             935             940

Ser Gly Thr Val Leu Val Gly Gly Arg Asp Ile Glu Thr Ser Leu Asp
945             950             955                 960

Ala Gly Glu Tyr Pro Ala Leu Thr Leu His Pro Trp Ile Tyr Gly Gln
            965             970             975

Gln Tyr Thr Phe Phe Ser Met Asp Glu Pro Gly Ser Glu Gln Phe Thr
        980             985             990

Val Leu Ala Asp Val Leu Leu Asn Lys Pro Gly Phe Gly Asn Arg Cys
        995             1000            1005

Leu Lys Glu Gly Trp Leu Pro Glu Tyr Pro Cys Gly Asn Ser Thr
    1010            1015            1020

Pro Trp Lys Thr Pro Ser Val Ser Pro Asn Ile Thr Gln Leu Phe
    1025            1030            1035

Gln Lys Gln Lys Trp Thr Gln Val Asn Pro Ser Pro Ser Cys Arg
    1040            1045            1050

Cys Ser Thr Arg Glu Lys Leu Thr Met Leu Pro Leu Arg Leu His
    1055            1060            1065

Glu Leu Thr Lys Ile Tyr Pro Gly Thr Ser Pro Ala Val Asp
    1070            1075            1080

Arg Leu Cys Val Gly Val Arg Pro Gly Glu Cys Phe Gly Leu Leu
    1085            1090            1095

Gly Val Asn Gly Ala Gly Lys Thr Thr Thr Phe Lys Met Leu Thr
    1100            1105            1110

Gly Asp Thr Thr Val Thr Ser Gly Asp Ala Thr Val Ala Gly Lys
    1115            1120            1125

Ser Ile Leu Thr Asn Ile Ser Glu Val His Gln Asn Met Gly Tyr
    1130            1135            1140

Cys Pro Gln Phe Asp Ala Ile Asp Glu Leu Leu Thr Gly Arg Glu
    1145            1150            1155

His Leu Tyr Leu Tyr Ala Arg Leu Arg Gly Val Pro Ala Glu Glu
    1160            1165            1170

Ile Glu Lys Val Ala Asn Trp Ser Ile Lys Ser Leu Gly Leu Thr
    1175            1180            1185

Val Tyr Ala Asp Cys Leu Ala Gly Thr Tyr Ser Gly Gly Asn Lys
    1190            1195            1200

Arg Lys Leu Ser Thr Ala Ile Ala Leu Ile Gly Cys Pro Pro Leu
    1205            1210            1215

Val Leu Leu Asp Glu Pro Thr Thr Gly Met Asp Pro Gln Ala Arg
    1220            1225            1230

Arg Met Leu Trp Asn Val Ile Val Ser Ile Ile Arg Glu Gly Arg
    1235            1240            1245

Ala Val Val Leu Thr Ser His Ser Met Glu Glu Cys Glu Ala Leu
    1250            1255            1260
```

-continued

Cys Thr Arg Leu Ala Ile Met Val Lys Gly Ala Phe Arg Cys Met
            1265                1270                1275

Gly Thr Ile Gln His Leu Lys Ser Lys Phe Gly Asp Gly Tyr Ile
    1280                1285                1290

Val Thr Met Lys Ile Lys Ser Pro Lys Asp Asp Leu Leu Pro Asp
1295                1300                1305

Leu Asn Pro Val Glu Gln Phe Phe Gln Gly Asn Phe Pro Gly Ser
    1310                1315                1320

Val Gln Arg Glu Arg His Tyr Asn Met Leu Gln Phe Gln Val Ser
1325                1330                1335

Ser Ser Ser Leu Ala Arg Ile Phe Gln Val Phe Val Asn Phe Ala
    1340                1345                1350

<210> SEQ ID NO 12
<211> LENGTH: 1222
<212> TYPE: PRT
<213> ORGANISM: Artificial Sequence
<220> FEATURE:
<223> OTHER INFORMATION: Synthetic Polypeptide

<400> SEQUENCE: 12

Met Gly Phe Val Arg Gln Ile Gln Leu Leu Leu Trp Lys Asn Trp Thr
1               5                   10                  15

Leu Arg Lys Arg Gln Lys Ile Arg Phe Val Val Glu Leu Val Trp Pro
            20                  25                  30

Leu Ser Leu Phe Leu Val Leu Ile Trp Leu Arg Asn Ala Asn Pro Leu
        35                  40                  45

Tyr Ser His His Glu Cys His Phe Pro Asn Lys Ala Met Pro Ser Ala
    50                  55                  60

Gly Met Leu Pro Trp Leu Gln Gly Ile Phe Cys Asn Val Asn Asn Pro
65                  70                  75                  80

Cys Phe Gln Ser Pro Thr Pro Gly Glu Ser Pro Gly Ile Val Ser Asn
                85                  90                  95

Tyr Asn Asn Ser Ile Leu Ala Arg Val Tyr Arg Asp Phe Gln Glu Leu
            100                 105                 110

Leu Met Asn Ala Pro Glu Ser Gln His Leu Gly Arg Ile Trp Thr Glu
        115                 120                 125

Leu His Ile Leu Ser Gln Phe Met Asp Thr Leu Arg Thr His Pro Glu
    130                 135                 140

Arg Ile Ala Gly Arg Gly Ile Arg Ile Arg Asp Ile Leu Lys Asp Glu
145                 150                 155                 160

Glu Thr Leu Thr Leu Phe Leu Ile Lys Asn Ile Gly Leu Ser Asp Ser
                165                 170                 175

Val Val Tyr Leu Leu Ile Asn Ser Gln Val Arg Pro Glu Gln Phe Ala
            180                 185                 190

His Gly Val Pro Asp Leu Ala Leu Lys Asp Ile Ala Cys Ser Glu Ala
        195                 200                 205

Leu Leu Glu Arg Phe Ile Ile Phe Ser Gln Arg Arg Gly Ala Lys Thr
    210                 215                 220

Val Arg Tyr Ala Leu Cys Ser Leu Ser Gln Gly Thr Leu Gln Trp Ile
225                 230                 235                 240

Glu Asp Thr Leu Tyr Ala Asn Val Asp Phe Phe Lys Leu Phe Arg Val
                245                 250                 255

Leu Pro Thr Leu Leu Asp Ser Arg Ser Gln Gly Ile Asn Leu Arg Ser
            260                 265                 270

```
Trp Gly Gly Ile Leu Ser Asp Met Ser Pro Arg Ile Gln Glu Phe Ile
        275                 280                 285

His Arg Pro Ser Met Gln Asp Leu Leu Trp Val Thr Arg Pro Leu Met
290                 295                 300

Gln Asn Gly Gly Pro Glu Thr Phe Thr Lys Leu Met Gly Ile Leu Ser
305                 310                 315                 320

Asp Leu Leu Cys Gly Tyr Pro Glu Gly Gly Ser Arg Val Leu Ser
                325                 330                 335

Phe Asn Trp Tyr Glu Asp Asn Tyr Lys Ala Phe Leu Gly Ile Asp
                340                 345                 350

Ser Thr Arg Lys Asp Pro Ile Tyr Ser Tyr Asp Arg Thr Thr Ser
        355                 360                 365

Phe Cys Asn Ala Leu Ile Gln Ser Leu Glu Ser Asn Pro Leu Thr Lys
    370                 375                 380

Ile Ala Trp Arg Ala Ala Lys Pro Leu Leu Met Gly Lys Ile Leu Tyr
385                 390                 395                 400

Thr Pro Asp Ser Pro Ala Ala Arg Arg Ile Leu Lys Asn Ala Asn Ser
                405                 410                 415

Thr Phe Glu Glu Leu Glu His Val Arg Lys Leu Val Lys Ala Trp Glu
                420                 425                 430

Glu Val Gly Pro Gln Ile Trp Tyr Phe Phe Asp Asn Ser Thr Gln Met
        435                 440                 445

Asn Met Ile Arg Asp Thr Leu Gly Asn Pro Thr Val Lys Asp Phe Leu
    450                 455                 460

Asn Arg Gln Leu Gly Glu Gly Ile Thr Ala Glu Ala Ile Leu Asn
465                 470                 475                 480

Phe Leu Tyr Lys Gly Pro Arg Glu Ser Gln Ala Asp Asp Met Ala Asn
                485                 490                 495

Phe Asp Trp Arg Asp Ile Phe Asn Ile Thr Asp Arg Thr Leu Arg Leu
                500                 505                 510

Val Asn Gln Tyr Leu Glu Cys Leu Val Leu Asp Lys Phe Glu Ser Tyr
        515                 520                 525

Asn Asp Glu Thr Gln Leu Thr Gln Arg Ala Leu Ser Leu Leu Glu Glu
    530                 535                 540

Asn Met Phe Trp Ala Gly Val Val Phe Pro Asp Met Tyr Pro Trp Thr
545                 550                 555                 560

Ser Ser Leu Pro Pro His Val Lys Tyr Lys Ile Arg Met Asp Ile Asp
                565                 570                 575

Val Val Glu Lys Thr Asn Lys Ile Lys Asp Arg Tyr Trp Asp Ser Gly
                580                 585                 590

Pro Arg Ala Asp Pro Val Glu Asp Phe Arg Tyr Ile Trp Gly Gly Phe
        595                 600                 605

Ala Tyr Leu Gln Asp Met Val Glu Gln Gly Ile Thr Arg Ser Gln Val
    610                 615                 620

Gln Ala Glu Ala Pro Val Gly Ile Tyr Leu Gln Gln Met Pro Tyr Pro
625                 630                 635                 640

Cys Phe Val Asp Asp Ser Phe Met Ile Ile Leu Asn Arg Cys Phe Pro
                645                 650                 655

Ile Phe Met Val Leu Ala Trp Ile Tyr Ser Val Ser Met Thr Val Lys
                660                 665                 670

Ser Ile Val Leu Glu Lys Glu Leu Arg Leu Lys Glu Thr Leu Lys Asn
        675                 680                 685
```

-continued

```
Gln Gly Val Ser Asn Ala Val Ile Trp Cys Thr Trp Phe Leu Asp Ser
    690             695                 700
Phe Ser Ile Met Ser Met Ser Ile Phe Leu Leu Thr Ile Phe Ile Met
705             710                 715                 720
His Gly Arg Ile Leu His Tyr Ser Asp Pro Phe Ile Leu Phe Leu Phe
            725                 730                 735
Leu Leu Ala Phe Ser Thr Ala Thr Ile Met Leu Cys Phe Leu Leu Ser
            740                 745                 750
Thr Phe Phe Ser Lys Ala Ser Leu Ala Ala Ala Cys Ser Gly Val Ile
            755                 760                 765
Tyr Phe Thr Leu Tyr Leu Pro His Ile Leu Cys Phe Ala Trp Gln Asp
770             775                 780
Arg Met Thr Ala Glu Leu Lys Lys Ala Val Ser Leu Leu Ser Pro Val
785             790                 795                 800
Ala Phe Gly Phe Gly Thr Glu Tyr Leu Val Arg Phe Glu Glu Gln Gly
            805                 810                 815
Leu Gly Leu Gln Trp Ser Asn Ile Gly Asn Ser Pro Thr Glu Gly Asp
            820                 825                 830
Glu Phe Ser Phe Leu Leu Ser Met Gln Met Met Leu Leu Asp Ala Ala
            835                 840                 845
Val Tyr Gly Leu Leu Ala Trp Tyr Leu Asp Gln Val Val Arg Gln Ser
850             855                 860
Leu Gly Met Cys Pro Gln His Asn Ile Leu Phe His His Leu Thr Val
865             870                 875                 880
Ala Glu His Met Leu Phe Tyr Ala Gln Leu Lys Gly Lys Ser Gln Glu
            885                 890                 895
Glu Ala Gln Leu Glu Met Glu Ala Met Leu Glu Asp Thr Gly Leu His
            900                 905                 910
His Lys Arg Asn Glu Glu Ala Gln Asp Leu Ser Gly Gly Met Gln Arg
            915                 920                 925
Lys Leu Ser Val Ala Ile Ala Phe Val Gly Asp Ala Lys Val Val Ile
            930                 935                 940
Leu Asp Glu Pro Thr Ser Gly Val Asp Pro Tyr Ser Arg Arg Ser Ile
945             950                 955                 960
Trp Asp Leu Leu Leu Lys Tyr Arg Ser Gly Arg Thr Ile Ile Met Ser
            965                 970                 975
Thr His His Met Asp Glu Ala Asp Leu Leu Gly Asp Arg Ile Ala Ile
            980                 985                 990
Ile Ala Gln Gly Arg Leu Tyr Cys Ser Gly Thr Pro Leu Phe Leu Lys
            995                 1000                1005
Asn Cys Phe Gly Thr Gly Leu Tyr Leu Thr Leu Val Gly Glu Tyr
    1010            1015                1020
Pro Ala Leu Thr Leu His Pro Trp Ile Tyr Gly Gln Gln Tyr Thr
    1025            1030                1035
Phe Phe Ser Met Asp Glu Pro Gly Ser Glu Gln Phe Thr Val Leu
    1040            1045                1050
Ala Asp Val Leu Leu Asn Lys Pro Gly Phe Gly Asn Arg Cys Leu
    1055            1060                1065
Lys Glu Gly Trp Leu Pro Glu Tyr Pro Cys Gly Asn Ser Thr Pro
    1070            1075                1080
Trp Lys Thr Pro Ser Val Ser Pro Asn Ile Thr Gln Leu Phe Gln
    1085            1090                1095
Lys Gln Lys Trp Thr Gln Val Asn Pro Ser Pro Ser Cys Arg Cys
```

```
            1100                1105                1110

Ser Thr Arg Glu Lys Leu Thr Met Leu Pro Leu Arg Leu His Glu
        1115                1120                1125

Leu Thr Lys Ile Tyr Pro Gly Thr Ser Ser Pro Ala Val Asp Arg
        1130                1135                1140

Leu Cys Val Gly Val Arg Pro Gly Glu Cys Phe Gly Leu Leu Gly
        1145                1150                1155

Val Asn Gly Ala Gly Lys Thr Thr Thr Phe Lys Met Leu Thr Gly
        1160                1165                1170

Asp Thr Thr Val Thr Ser Gly Asp Ala Thr Val Ala Gly Ile Lys
        1175                1180                1185

Ser Pro Lys Asp Asp Leu Leu Pro Asp Leu Asn Pro Val Glu Gln
        1190                1195                1200

Phe Phe Gln Gly Asn Phe Pro Gly Ser Val Gln Arg Glu Val Phe
        1205                1210                1215

Val Asn Phe Ala
        1220

<210> SEQ ID NO 13
<211> LENGTH: 1022
<212> TYPE: PRT
<213> ORGANISM: Artificial Sequence
<220> FEATURE:
<223> OTHER INFORMATION: Synthetic Polypeptide

<400> SEQUENCE: 13

Met Gly Phe Val Arg Gln Ile Gln Leu Leu Trp Lys Asn Trp Thr
1               5                   10                  15

Leu Arg Lys Arg Gln Lys Ile Arg Phe Val Val Glu Leu Val Trp Pro
        20                  25                  30

Leu Ser Leu Phe Leu Val Leu Ile Trp Leu Arg Asn Ala Asn Pro Leu
            35                  40                  45

Tyr Ser His His Glu Cys His Phe Pro Asn Lys Ala Met Pro Ser Ala
        50                  55                  60

Gly Met Leu Pro Trp Leu Gln Gly Ile Phe Cys Asn Val Asn Asn Pro
65                  70                  75                  80

Cys Phe Gln Ser Pro Thr Pro Gly Glu Ser Pro Gly Ile Val Ser Asn
                85                  90                  95

Tyr Asn Asn Ser Ile Leu Ala Arg Val Tyr Arg Asp Phe Gln Glu Leu
                100                 105                 110

Leu Met Asn Ala Pro Glu Ser Gln His Leu Gly Arg Ile Trp Thr Glu
            115                 120                 125

Leu His Ile Leu Ser Gln Phe Met Asp Thr Leu Arg Thr His Pro Glu
        130                 135                 140

Arg Ile Ala Gly Arg Gly Ile Arg Ile Arg Asp Ile Leu Lys Asp Glu
145                 150                 155                 160

Glu Thr Leu Thr Leu Phe Leu Ile Lys Asn Ile Gly Leu Ser Asp Ser
                165                 170                 175

Val Val Tyr Leu Leu Ile Asn Ser Gln Val Arg Pro Glu Gln Phe Ala
                180                 185                 190

His Gly Val Pro Asp Leu Ala Leu Lys Asp Ile Ala Cys Ser Glu Ala
            195                 200                 205

Leu Leu Glu Arg Phe Ile Ile Phe Ser Gln Arg Gly Ala Lys Thr
        210                 215                 220

Val Arg Tyr Ala Leu Cys Ser Leu Ser Gln Gly Thr Leu Gln Trp Ile
```

-continued

```
            225                 230                 235                 240
Glu Asp Thr Leu Tyr Ser Phe Met Ile Ile Leu Asn Arg Cys Phe Pro
                    245                 250                 255

Ile Phe Met Val Leu Ala Trp Ile Tyr Ser Val Ser Met Thr Val Lys
                260                 265                 270

Ser Ile Val Leu Glu Lys Glu Leu Arg Leu Lys Glu Thr Leu Lys Asn
                275                 280                 285

Gln Gly Val Ser Asn Ala Val Ile Trp Cys Thr Trp Phe Leu Asp Ser
            290                 295                 300

Phe Ser Ile Met Ser Met Ser Ile Phe Leu Leu Thr Ile Phe Ile Met
305                 310                 315                 320

His Gly Arg Ile Leu His Tyr Ser Asp Pro Phe Ile Leu Phe Leu Phe
                    325                 330                 335

Leu Leu Ala Phe Ser Thr Ala Thr Ile Met Leu Cys Phe Leu Leu Ser
                340                 345                 350

Thr Phe Phe Ser Lys Ala Ser Leu Ala Ala Ala Cys Ser Gly Val Ile
                355                 360                 365

Tyr Phe Thr Leu Tyr Leu Pro His Ile Leu Cys Phe Ala Trp Gln Asp
            370                 375                 380

Arg Met Thr Ala Glu Leu Lys Lys Ala Val Ser Leu Leu Ser Pro Val
385                 390                 395                 400

Ala Phe Gly Phe Gly Thr Glu Tyr Leu Val Arg Phe Glu Glu Gln Gly
                    405                 410                 415

Leu Gly Leu Gln Trp Ser Asn Ile Gly Asn Ser Pro Thr Glu Gly Asp
                420                 425                 430

Glu Phe Ser Phe Leu Leu Ser Met Gln Met Met Leu Leu Asp Ala Ala
            435                 440                 445

Val Tyr Gly Leu Leu Ala Trp Tyr Leu Asp Gln Val Leu Thr Glu Glu
            450                 455                 460

Thr Glu Asp Pro Glu His Pro Glu Gly Ile His Asp Ser Phe Phe Glu
465                 470                 475                 480

Arg Glu His Pro Gly Trp Val Pro Gly Val Cys Val Lys Asn Leu Val
                    485                 490                 495

Lys Ile Phe Glu Pro Cys Gly Arg Pro Ala Val Asp Arg Leu Asn Ile
                500                 505                 510

Thr Phe Tyr Glu Asn Gln Ile Thr Ala Phe Leu Gly His Asn Gly Ala
            515                 520                 525

Gly Lys Thr Thr Thr Leu Ser Ile Leu Thr Gly Leu Leu Pro Pro Thr
            530                 535                 540

Ser Gly Thr Val Leu Val Gly Gly Arg Asp Ile Glu Thr Ser Leu Asp
545                 550                 555                 560

Ala His Lys Asp Phe Leu Ala Gln Ile Val Leu Pro Ala Thr Phe Val
                    565                 570                 575

Phe Leu Ala Leu Met Leu Ser Ile Val Ile Pro Pro Phe Gly Glu Tyr
                580                 585                 590

Pro Ala Leu Thr Leu His Pro Trp Ile Tyr Gly Gln Gln Tyr Thr Phe
                595                 600                 605

Phe Ser Met Asp Glu Pro Gly Ser Glu Gln Phe Thr Val Leu Ala Asp
            610                 615                 620

Val Leu Leu Asn Lys Pro Gly Phe Gly Asn Arg Cys Leu Lys Glu Gly
625                 630                 635                 640

Trp Leu Pro Glu Tyr Pro Cys Gly Asn Ser Thr Pro Trp Lys Thr Pro
                    645                 650                 655
```

Ser Val Ser Pro Asn Ile Thr Gln Leu Phe Gln Lys Gln Lys Trp Thr
         660                 665                 670

Gln Val Asn Pro Ser Pro Ser Cys Arg Cys Ser Thr Arg Glu Lys Leu
         675                 680                 685

Thr Met Leu Pro Asn Phe Leu Trp Asp Ile Met Asn Tyr Ser Val Ser
690                 695                 700

Ala Gly Leu Val Val Gly Ile Phe Ile Gly Phe Gln Lys Lys Ala Tyr
705                 710                 715                 720

Thr Ser Pro Glu Asn Leu Pro Ala Leu Val Ala Leu Leu Leu Leu Tyr
                725                 730                 735

Gly Trp Ala Val Ile Pro Met Met Tyr Pro Ala Ser Phe Leu Phe Asp
                740                 745                 750

Val Pro Ser Thr Ala Tyr Val Ala Leu Ser Cys Ala Asn Leu Phe Ile
            755                 760                 765

Gly Ile Asn Ser Ser Ala Ile Thr Phe Ile Leu Glu Leu Phe Glu Asn
        770                 775                 780

Asn Arg Thr Leu Leu Arg Phe Asn Ala Val Leu Arg Lys Leu Leu Ile
785                 790                 795                 800

Val Phe Pro His Phe Cys Leu Gly Arg Gly Leu Ile Asp Leu Ala Leu
                805                 810                 815

Ser Gln Ala Val Thr Asp Val Tyr Ala Arg Phe Gly Glu Glu His Ser
                820                 825                 830

Ala Asn Pro Phe His Trp Asp Leu Ile Gly Lys Asn Leu Phe Ala Met
            835                 840                 845

Val Val Glu Gly Val Val Tyr Phe Leu Leu Thr Leu Leu Val Gln Arg
850                 855                 860

His Phe Phe Leu Ser Gln Trp Ile Ala Glu Pro Thr Lys Glu Pro Ile
865                 870                 875                 880

Val Asp Glu Asp Asp Asp Val Ala Glu Glu Arg Gln Arg Ile Ile Thr
                885                 890                 895

Gly Gly Asn Lys Thr Asp Ile Leu Arg Leu His Glu Leu Thr Lys Ile
            900                 905                 910

Tyr Pro Gly Thr Ser Ser Pro Ala Val Asp Arg Leu Cys Val Gly Val
        915                 920                 925

Arg Pro Gly Glu Cys Phe Gly Leu Leu Gly Val Asn Gly Ala Gly Lys
930                 935                 940

Thr Thr Thr Phe Lys Met Leu Thr Gly Asp Thr Val Thr Ser Gly
945                 950                 955                 960

Asp Ala Thr Val Ala Gly Ile Lys Ser Pro Lys Asp Asp Leu Leu Pro
                965                 970                 975

Asp Leu Asn Pro Val Glu Gln Phe Phe Gln Gly Asn Phe Pro Gly Ser
            980                 985                 990

Val Gln Arg Glu Arg His Tyr Asn  Met Leu Gln Phe Gln  Val Ser Ser
        995                 1000                 1005

Ser Ser  Leu Ala Arg Ile Phe  Gln Val Phe Val Asn  Phe Ala
    1010                 1015                 1020

<210> SEQ ID NO 14
<211> LENGTH: 1466
<212> TYPE: PRT
<213> ORGANISM: Artificial Sequence
<220> FEATURE:
<223> OTHER INFORMATION: Synthetic Polypeptide

<400> SEQUENCE: 14

```
Met Gly Phe Val Arg Gln Ile Gln Leu Leu Leu Trp Lys Asn Trp Thr
1               5                   10                  15

Leu Arg Lys Arg Gln Lys Ile Arg Phe Val Val Glu Leu Val Trp Pro
            20                  25                  30

Leu Ser Leu Phe Leu Val Leu Ile Trp Leu Arg Ala Asn Val Asp Phe
        35                  40                  45

Phe Lys Leu Phe Arg Val Leu Pro Thr Leu Leu Asp Ser Arg Ser Gln
    50                  55                  60

Gly Ile Asn Leu Arg Ser Trp Gly Gly Ile Leu Ser Asp Met Ser Pro
65                  70                  75                  80

Arg Ile Gln Glu Phe Ile His Arg Pro Ser Met Gln Asp Leu Leu Trp
                85                  90                  95

Val Thr Arg Pro Leu Met Gln Asn Gly Gly Pro Glu Thr Phe Thr Lys
            100                 105                 110

Leu Met Gly Ile Leu Ser Asp Leu Leu Cys Gly Tyr Pro Glu Gly Gly
            115                 120                 125

Gly Ser Arg Val Leu Ser Phe Asn Trp Tyr Glu Asp Asn Asn Tyr Lys
130                 135                 140

Ala Phe Leu Gly Ile Asp Ser Thr Arg Lys Asp Pro Ile Tyr Ser Tyr
145                 150                 155                 160

Asp Arg Arg Thr Thr Ser Phe Cys Asn Ala Leu Ile Gln Ser Leu Glu
                165                 170                 175

Ser Asn Pro Leu Thr Lys Ile Ala Trp Arg Ala Ala Lys Pro Leu Leu
            180                 185                 190

Met Gly Lys Ile Leu Tyr Thr Pro Asp Ser Pro Ala Ala Arg Arg Ile
            195                 200                 205

Leu Lys Asn Ala Asn Ser Thr Phe Glu Glu Leu Glu His Val Arg Lys
    210                 215                 220

Leu Val Lys Ala Trp Glu Glu Val Gly Pro Gln Ile Trp Tyr Phe Phe
225                 230                 235                 240

Asp Asn Ser Thr Gln Met Asn Met Ile Arg Asp Thr Leu Gly Asn Pro
                245                 250                 255

Thr Val Lys Asp Phe Leu Asn Arg Gln Leu Gly Glu Glu Gly Ile Thr
            260                 265                 270

Ala Glu Ala Ile Leu Asn Phe Leu Tyr Lys Gly Pro Arg Glu Ser Gln
            275                 280                 285

Ala Asp Asp Met Ala Asn Phe Asp Trp Arg Asp Ile Phe Asn Ile Thr
            290                 295                 300

Asp Arg Thr Leu Arg Leu Val Asn Gln Tyr Leu Glu Cys Leu Val Leu
305                 310                 315                 320

Asp Lys Phe Glu Ser Tyr Asn Asp Glu Thr Gln Leu Thr Gln Arg Ala
                325                 330                 335

Leu Ser Leu Leu Glu Glu Asn Met Phe Trp Ala Gly Val Val Phe Pro
            340                 345                 350

Asp Met Tyr Pro Trp Thr Ser Ser Leu Pro Pro His Val Lys Tyr Lys
            355                 360                 365

Ile Arg Met Asp Ile Asp Val Val Glu Lys Thr Asn Lys Ile Lys Asp
            370                 375                 380

Arg Tyr Trp Asp Ser Gly Pro Arg Ala Asp Pro Val Glu Asp Phe Arg
385                 390                 395                 400

Tyr Ile Trp Gly Gly Phe Ala Tyr Leu Gln Asp Met Val Glu Gln Gly
                405                 410                 415
```

-continued

```
Ile Thr Arg Ser Gln Val Gln Ala Glu Ala Pro Val Gly Ile Tyr Leu
                420                 425                 430
Gln Gln Met Pro Tyr Pro Cys Phe Val Asp Asp Ser Phe Met Ile Ile
            435                 440                 445
Leu Asn Arg Cys Phe Pro Ile Phe Met Val Leu Ala Trp Ile Tyr Ser
        450                 455                 460
Val Ser Met Thr Val Lys Ser Ile Val Leu Glu Lys Glu Leu Arg Leu
465                 470                 475                 480
Lys Glu Thr Leu Lys Asn Gln Gly Val Ser Asn Ala Val Ile Trp Cys
                485                 490                 495
Thr Trp Phe Leu Asp Ser Phe Ser Ile Met Ser Met Ser Ile Phe Leu
            500                 505                 510
Leu Thr Ile Phe Ile Met His Gly Arg Ile Leu His Tyr Ser Asp Pro
        515                 520                 525
Phe Ile Leu Phe Leu Phe Leu Leu Ala Phe Ser Thr Ala Thr Ile Met
530                 535                 540
Leu Cys Phe Leu Leu Ser Thr Phe Phe Ser Lys Ala Ser Leu Ala Ala
545                 550                 555                 560
Ala Cys Ser Gly Val Ile Tyr Phe Thr Leu Tyr Leu Pro His Ile Leu
                565                 570                 575
Cys Phe Ala Trp Gln Asp Arg Met Thr Ala Glu Leu Lys Lys Ala Val
            580                 585                 590
Ser Leu Leu Ser Pro Val Ala Phe Gly Phe Gly Thr Glu Tyr Leu Val
        595                 600                 605
Arg Phe Glu Glu Gln Gly Leu Gly Leu Gln Trp Ser Asn Ile Gly Asn
610                 615                 620
Ser Pro Thr Glu Gly Asp Glu Phe Ser Phe Leu Leu Ser Met Gln Met
625                 630                 635                 640
Met Leu Leu Asp Ala Ala Val Tyr Gly Leu Leu Ala Trp Tyr Leu Asp
                645                 650                 655
Gln Val Val Arg Gln Ser Leu Gly Met Cys Pro Gln His Asn Ile Leu
            660                 665                 670
Phe His His Leu Thr Val Ala Glu His Met Leu Phe Tyr Ala Gln Leu
        675                 680                 685
Lys Gly Lys Ser Gln Glu Glu Ala Gln Leu Glu Met Glu Ala Met Leu
690                 695                 700
Glu Asp Thr Gly Leu His His Lys Arg Asn Glu Glu Ala Gln Asp Leu
705                 710                 715                 720
Ser Gly Gly Met Gln Arg Lys Leu Ser Val Ala Ile Ala Phe Val Gly
                725                 730                 735
Asp Ala Lys Val Val Ile Leu Asp Glu Pro Thr Ser Gly Val Asp Pro
            740                 745                 750
Tyr Ser Arg Arg Ser Ile Trp Asp Leu Leu Leu Lys Tyr Arg Ser Gly
        755                 760                 765
Arg Thr Ile Ile Met Ser Thr His His Met Asp Glu Ala Asp Leu Leu
770                 775                 780
Gly Asp Arg Ile Ala Ile Ile Ala Gln Gly Arg Leu Tyr Cys Ser Gly
785                 790                 795                 800
Thr Pro Leu Phe Leu Lys Asn Cys Phe Gly Thr Gly Leu Tyr Leu Thr
                805                 810                 815
Leu Val Arg Lys Met Lys Asn Ile Gln Ser Gln Arg Lys Gly Ser Glu
            820                 825                 830
Gly Thr Cys Ser Cys Ser Ser Lys Gly Phe Ser Thr Thr Cys Pro Ala
```

```
                835                 840                 845
His Val Asp Asp Leu Thr Pro Glu Gln Val His Lys Asp Phe Leu Ala
    850                 855                 860

Gln Ile Val Leu Pro Ala Thr Phe Val Phe Leu Ala Leu Met Leu Ser
865                 870                 875                 880

Ile Glu Cys Pro Glu Gly Ala Gly Gly Leu Pro Pro Gln Arg Thr
                885                 890                 895

Gln Arg Ser Thr Glu Ile Leu Gln Asp Leu Thr Asp Arg Asn Ile Ser
                900                 905                 910

Asp Phe Leu Val Lys Thr Tyr Pro Ala Leu Ile Arg Ser Ser Leu Lys
        915                 920                 925

Ser Lys Phe Trp Val Asn Glu Gln Arg Tyr Gly Gly Ile Ser Ile Gly
    930                 935                 940

Gly Lys Leu Pro Val Val Pro Ile Thr Gly Ala Leu Val Gly Phe
945                 950                 955                 960

Leu Ser Asp Leu Gly Arg Ile Met Asn Val Ser Gly Gly Pro Ile Thr
                965                 970                 975

Arg Glu Ala Ser Lys Glu Ile Pro Asp Phe Leu Lys His Leu Glu Thr
            980                 985                 990

Glu Asp Asn Ile Lys Val Trp Phe Asn Asn Lys Gly Trp His Ala Leu
        995                 1000                1005

Val Ser Phe Leu Asn Val Ala His Asn Ala Ile Leu Arg Ala Ser
    1010                1015                1020

Leu Pro Lys Asp Arg Ser Pro Glu Asn Phe Leu Trp Asp Ile Met
    1025                1030                1035

Asn Tyr Ser Val Ser Ala Gly Leu Val Val Gly Ile Phe Ile Gly
    1040                1045                1050

Phe Gln Lys Lys Ala Tyr Thr Ser Pro Glu Asn Leu Pro Ala Leu
    1055                1060                1065

Val Ala Leu Leu Leu Leu Tyr Gly Trp Ala Val Ile Pro Met Met
    1070                1075                1080

Tyr Pro Ala Ser Phe Leu Phe Asp Val Pro Ser Thr Ala Tyr Val
    1085                1090                1095

Ala Leu Ser Cys Ala Asn Leu Phe Ile Gly Ile Asn Ser Ser Ala
    1100                1105                1110

Ile Thr Phe Ile Leu Glu Leu Phe Glu Asn Asn Arg Thr Leu Leu
    1115                1120                1125

Arg Phe Asn Ala Val Leu Arg Lys Leu Leu Ile Val Phe Pro His
    1130                1135                1140

Phe Cys Leu Gly Arg Gly Leu Ile Asp Leu Ala Leu Ser Gln Ala
    1145                1150                1155

Val Thr Asp Val Tyr Ala Arg Phe Gly Glu Glu His Ser Ala Asn
    1160                1165                1170

Pro Phe His Trp Asp Leu Ile Gly Lys Asn Leu Phe Ala Met Val
    1175                1180                1185

Val Glu Gly Val Val Tyr Phe Leu Leu Thr Leu Val Gln Arg
    1190                1195                1200

His Phe Phe Leu Ser Gln Trp Ile Ala Glu Pro Thr Lys Glu Pro
    1205                1210                1215

Ile Val Asp Glu Asp Asp Val Ala Glu Glu Arg Gln Arg Ile
    1220                1225                1230

Ile Thr Gly Gly Asn Lys Thr Asp Ile Leu Lys Ser Ile Leu Thr
    1235                1240                1245
```

Asn Ile Ser Glu Val His Gln Asn Met Gly Tyr Cys Pro Gln Phe
1250                1255                1260

Asp Ala Ile Asp Glu Leu Leu Thr Gly Arg Glu His Leu Tyr Leu
1265                1270                1275

Tyr Ala Arg Leu Arg Gly Val Pro Ala Glu Glu Ile Glu Lys Val
1280                1285                1290

Ala Asn Trp Ser Ile Lys Ser Leu Gly Leu Thr Val Tyr Ala Asp
1295                1300                1305

Cys Leu Ala Gly Thr Tyr Ser Gly Gly Asn Lys Arg Lys Leu Ser
1310                1315                1320

Thr Ala Ile Ala Leu Ile Gly Cys Pro Pro Leu Val Leu Leu Asp
1325                1330                1335

Glu Pro Thr Thr Gly Met Asp Pro Gln Ala Arg Arg Met Leu Trp
1340                1345                1350

Asn Val Ile Val Ser Ile Ile Arg Glu Gly Arg Ala Val Val Leu
1355                1360                1365

Thr Ser His Ser Met Glu Glu Cys Glu Ala Leu Cys Thr Arg Leu
1370                1375                1380

Ala Ile Met Val Lys Gly Ala Phe Arg Cys Met Gly Thr Ile Gln
1385                1390                1395

His Leu Lys Ser Lys Phe Gly Asp Gly Tyr Ile Val Thr Met Lys
1400                1405                1410

Leu Leu Leu Ser His Lys Asp Ser Leu Leu Ile Glu Glu Tyr Ser
1415                1420                1425

Val Thr Gln Thr Thr Leu Asp Gln Val Phe Val Asn Phe Ala Lys
1430                1435                1440

Gln Gln Thr Glu Ser His Asp Leu Pro Leu His Pro Arg Ala Ala
1445                1450                1455

Gly Ala Ser Arg Gln Ala Gln Asp
1460                1465

<210> SEQ ID NO 15
<211> LENGTH: 3483
<212> TYPE: DNA
<213> ORGANISM: Artificial Sequence
<220> FEATURE:
<223> OTHER INFORMATION: Synthetic Polynucleotide

<400> SEQUENCE: 15
atgggcttcg tgagacagat acagcttttg ctctggaaga actggaccct gcggaaaagg      60
caaaagattc gctttgtggt ggaactcgtg tggcctttat ctttatttct ggtcttgatc     120
tggttaagga atgccaaccc actctacagc catcatgaat gccatttccc caacaaggcg     180
atgccctcag caggaatgct gccgtggctc caggggatct tctgcaatgt gaacaatccc     240
tgttttcaaa gccccacccc aggagaatct cctggaattg tgtcaaacta taacaactcc     300
atcttggcaa gggtatatcg agattttcaa gaactcctca tgaatgcacc agagagccag     360
caccttggcc gtatttggac agagctacac atcttgtccc aattcatgga caccctccgg     420
actcaccccg agagaattgc aggaagagga atacgaataa gggatatctt gaaagatgaa     480
gaaacactga cactatttct cattaaaaac atcggcctgt ctgactcagt ggtctacctt     540
ctgatcaact tcaagtccgt ccagagcag ttcgctcatg agtcccgga cctggcgctg     600 aaggacatcg cctgcagcga ggccctcctg gagcgcttca tcatcttcag ccagagacgc     660
ggggcaaaga cggtgcgcta tgccctgtgc tccctctccc aggcacccct acagtggata     720

```
gaagacactc tgtatgccaa cgtggacttc ttcaagctct tccgtgtgct tcccacactc    780
ctagacagcc gttctcaagg tatcaatctg agatcttggg gaggaatatt atctgatatg    840
tcaccaagaa ttcaagagtt tatccatcgg ccgagtatgc aggacttgct gtgggtgacc    900
aggcccctca tgcagaatgg tggtccagag acctttacaa agctgatggg catcctgtct    960
gacctcctgt gtggctaccc cgagggaggt ggctctcggg tgctctcctt caactggtat   1020
gaagacaata actataaggc ctttctgggg attgactcca caaggaagga tcctatctat   1080
tcttatgaca gaagaacaac atccttttgt aatgcattga tccagagcct ggagtcaaat   1140
cctttaacca aaatcgcttg gagggcggca agcctttgc tgatgggaaa atcctgtac    1200 actcctgatt cacctgcagc acgaaggata ctgaagaatg ccaactcaac ttttgaagaa   1260
ctggaacacg ttaggaagtt ggtcaaagcc tgggaagaag tagggcccca gatctggtac   1320
ttctttgaca acagcacaca gatgaacatg atcagagata ccctggggaa cccaacagta   1380
aaagactttt tgaataggca gcttggtgaa gaaggtatta ctgctgaagc catcctaaac   1440
ttcctctaca agggccctcg ggaaagccag gctgacgaca tggccaactt cgactggagg   1500
gacatattta acatcactga tcgcaccctc cgcctggtca atcaatacct ggagtgcttg   1560
gtcctggata agtttgaaag ctacaatgat gaaactcagc tcacccaacg tgccctctct   1620
ctactgaagg aaaacatgtt ctgggccgga gtggtattcc ctgacatgta tcctggacc    1680 agctctctac caccccacgt gaagtataag atccgaatgg acatagacgt ggtggagaaa   1740
accaataaga ttaaagacag gtattgggat tctggtccca gagctgatcc cgtggaagat   1800
ttccggtaca tctgggcgg gtttgcctat ctgcaggaca tggttgaaca ggggatcaca   1860
aggagccagg tgcaggcgga ggctccagtt ggaatctacc tccagcagat gccctacccc   1920
tgcttcgtgg acgattcttt catgatcatc ctgaaccgct gtttccctat cttcatggtg   1980
ctggcatgga tctactctgt ctccatgact gtgaagagca tcgtcttgga aaggagttg    2040 cgactgaagg agaccttgaa aaatcagggt gtctccaatg cagtgatttg gtgtacctgg   2100
ttcctggaca gcttctccat catgtcgatg agcatcttcc tcctgacgat attcatcatg   2160
catggaagaa tcctacatta cagcgaccca ttcatcctct tcctgttctt gttggctttc   2220
tccactgcca ccatcatgct gtgctttctg ctcagcacct tcttctccaa ggccagtctg   2280
gcagcagcct gtagtggtgt catctatttc accctctacc tgccacacat cctgtgcttc   2340
gcctggcagg accgcatgac cgctgagctg aagaaggctg tgagcttact gtctccggtg   2400
gcatttggat ttggcactga gtacctggtt cgctttgaag agcaaggcct ggggctgcag   2460
tggagcaaca tcgggaacag tcccacggaa ggggacgaat tcagcttcct gctgtccatg   2520
cagatgatgc tccttgatgc tgctgtctat ggcttactcg cttggtacct tgatcaggtg   2580
tttccaggag actatggaac cccacttcct tggtactttc ttctacaaga gtcgtattgg   2640
cttggcggtg aagggtgttc aaccagagaa gaaagagccc tggaaaagac cgagcccta    2700 acagaggaaa cggaggatcc agagcaccca gaaggaatac acgactcctt ctttgaacgt   2760
gagcatccag ggtgggttcc tgggtatgc gtgaagaatc tggtaaagat ttttgagccc   2820
tgtggccggc cagctgtgga ccgtctgaac atcaccttct acgagaacca gatcaccgca   2880
ttcctgggcc acaatggagc tgggaaaacc accaccttgt ccatcctgac gggtctgttg   2940
ccaccaacct ctgggactgt gctcgttggg ggaaggaca ttgaaaccag cctggatgca   3000
gtccggcaga gccttggcat gtgtccacag cacaacatcc tgttccacca cctcacggtg   3060
```

```
gctgagcaca tgctgttcta tgcccagctg aaaggaaagt cccaggagga ggcccagctg    3120
gagatggaag ccatgttgga ggacacaggc ctccaccaca agcggaatga agaggctcag    3180
gacctatcag gtggcatgca gagaaagctg tcggttgcca ttgcctttgt gggagatgcc    3240
aaggtggtga ttctggacga acccaccctct ggggtggacc cttactcgag acgctcaatc   3300
tgggatctgc tcctgaagta tcgctcaggc agaaccatca tcatgtccac tcaccacatg    3360
gacgaggccg acctccttgg ggaccgcatt gccatcattg cccagggaag gctctactgc    3420
tcaggcaccc cactcttcct gaagaactgc tttggcacag gcttgtactt aaccttggtg    3480
tga                                                                  3483

<210> SEQ ID NO 16
<211> LENGTH: 2754
<212> TYPE: DNA
<213> ORGANISM: Artificial Sequence
<220> FEATURE:
<223> OTHER INFORMATION: Synthetic Polynucleotide

<400> SEQUENCE: 16
atgggcttcg tgagacagat acagcttttg ctctggaaga actggaccct gcggaaaagg     60
atcgtgctcc cggctacctt tgtgttttg gctctgatgc tttctattgt tatccctcct     120
tttggcgaat accccgcttt gacccttcac ccctggatat atgggcagca gtacaccttc     180
ttcagcatgg atgaaccagg cagtgagcag ttcacggtac ttgcagacgt cctcctgaat     240
aagccaggct ttggcaaccg ctgcctgaag aagggtggc ttccggagta cccctgtggc      300
aactcaacac cctggaagac tccttctgtg tccccaaaca tcaccagct gttccagaag      360 cagaaatgga cacaggtcaa cccttcacca tcctgcaggt gcagcaccag ggagaagctc     420
accatgctgc cagagtgccc cgagggtgcc ggggcctcc cgccccccca gagaacacag      480
cgcagcacgg aaattctaca agacctgacg gacaggaaca tctccgactt cttggtaaaa     540
acgtatcctg ctcttataag aagcagctta aagagcaaat tctgggtcaa tgaacagagg     600
tatggaggaa tttccattgg aggaaagctc ccagtcgtcc ccatcacggg ggaagcactt     660
gttggttttt aagcgacct tggccggatc atgaatgtga gcggggccc tatcactaga       720 gaggcctcta agaaatacc tgatttcctt aaacatctag aaactgaaga caacattaag      780
gtgtggttta ataacaaagg ctggcatgcc ctggtcagct ttctcaatgt ggcccacaac     840
gccatcttac gggccagcct gcctaaggac aggagccccg aggagtatgg aatcaccgtc     900
attagccaac ccctgaacct gaccaaggag cagctctcag agattacagt gctgaccact     960
tcagtggatg ctgtggttgc catctgcgtg atttttctcca tgtccttcgt cccagccagc    1020
tttgtccttt atttgatcca ggagcggtg aacaaatcca agcacctcca gtttatcagt      1080
ggagtgagcc ccaccaccta ctgggtgacc aacttcctct gggacatcat gaattattcc     1140
gtgagtgctg gctggtggt gggcatcttc atcgggtttc agaagaaagc ctacacttct     1200
ccagaaaacc ttcctgccct tgtggcactg ctcctgctgt atggatgggc ggtcattccc    1260
atgatgtacc cagcatcctt cctgtttgat gtccccagca cagcctatgt ggctttatct    1320
tgtgctaatc tgttcatcgg catcaacagc agtgctatta ccttcatctt ggaattattt     1380
gagaataacc ggacgctgct caggttcaac gccgtgctga ggaagctgct cattgtcttc     1440
ccccacttct gcctgggccg gggcctcatt gaccttgcac tgagccaggc tgtgacagat    1500
gtctatgccc ggtttggtga ggagcactct gcaaatccgt tccactggga cctgattggg     1560
aagaacctgt ttgccatggt ggtggaaggg gtggtgtact tcctcctgac cctgctggtc    1620
```

```
cagcgccact tcttcctctc ccaatggatt gccgagccca ctaaggagcc cattgttgat    1680
gaagatgatg atgtggctga agaaagacaa agaattatta ctggtggaaa taaaactgac    1740
atcttaaggc tacatgaact aaccaagatt tatccaggca cctccagccc agcagtggac    1800
aggctgtgtg tcggagttcg ccctggagag tgctttggcc tcctgggagt gaatggtgcc    1860
ggcaaaacaa ccacattcaa gatgctcact ggggacacca cagtgacctc aggggatgcc    1920
accgtagcag gcaagagtat tttaaccaat atttctgaag tccatcaaaa tatgggctac    1980
tgtcctcagt ttgatgcaat tgatgagctg ctcacaggac gagaacatct ttacctttat    2040
gcccggcttc gaggtgtacc agcagaagaa atcgaaaagg ttgcaaactg gagtattaag    2100
agcctgggcc tgactgtcta cgccgactgc ctggctggca cgtacagtgg gggcaacaag    2160
cggaaactct ccacagccat cgcactcatt ggctgcccac cgctggtgct gctggatgag    2220
cccaccacag gatggacccc caggcacgc cgcatgctgt ggaacgtcat cgtgagcatc    2280
atcagagaag ggagggctgt ggtcctcaca tcccacagca tggaagaatg tgaggcactg    2340
tgtacccggc tggccatcat ggtaaagggc gcctttcgat gtatgggcac cattcagcat    2400
ctcaagtcca aatttggaga tggctatatc gtcacaatga gatcaaaatc cccgaaggac    2460
gacctgcttc ctgacctgaa ccctgtggag cagttcttcc aggggaactt cccaggcagt    2520
gtgcagaggg agaggcacta caacatgctc cagttccagg tctcctcctc ctccctggcg    2580
aggatcttcc agctcctcct ctcccacaag gacagcctgc tcatcgagga gtactcagtc    2640
acacagacca cactggacca ggtgtttgta aattttgcta acagcagac tgaaagtcat    2700 gacctcccctc tgcaccctcg agctgctgga gccagtcgac aagcccagga ctga          2754
```

<210> SEQ ID NO 17
<211> LENGTH: 3459
<212> TYPE: DNA
<213> ORGANISM: Artificial Sequence
<220> FEATURE:
<223> OTHER INFORMATION: Synthetic Polynucleotide

<400> SEQUENCE: 17

```
atgggcttcg tgagacagat acagcttttg ctctggaaga actggaccct gcggaaaagg      60
caaaagattc gctttgtggt ggaactcgtg tggcctttat ctttatttct ggtcttgatc     120
tggttaagga atgccaaccc actctacatg ccctaccct gcttcgtgga cgattctttc      180
atgatcatcc tgaaccgctg tttccctatc ttcatggtgc tggcatggat ctactctgtc     240
tccatgactg tgaagagcat cgtcttggag aaggagttgc gactgaagga gacccttgaaa   300 aatcagggtg tctccaatgc agtgatttgg tgtacctggt tcctggacag cttctccatc    360
atgtcgatga gcatcttcct cctgacgata ttcatcatgc atggaagaat cctacattac    420
agcgacccat tcatcctctt cctgttcttg ttggctttct ccactgccac catcatgctg   480
tgctttctgc tcagcacctt cttctccaag gccagtctgg cagcagcctg tagtggtgtc    540
atctatttca ccctctacct gccacacatc ctgtgcttcg cctggcagga ccgcatgacc    600
gctgagctga agaaggctgt gagcttactg tctccggtgg catttggatt tggcactgag    660
tacctggttc gctttgaaga gcaaggcctg ggctgcagt ggagcaacat cgggaacagt    720
cccacggaag gggacgaatt cagcttcctg ctgtccatgc agatgatgct ccttgatgct    780
gctgtctatg gcttactcgc ttggtacctt gatcaggtgt ttccaggaga ctatggaacc    840
ccacttcctt ggtactttct tctacaagag tcgtattggc ttggcggtga agggtgttca    900
```

```
accagagaag aaagagccct ggaaaagacc gagcccctaa cagaggaaac ggaggatcca    960
gagcacccag aaggaataca cgactccttc tttgaacgtg agcatccagg gtgggttcct   1020
ggggtatgcg tgaagaatct ggtaaagatt tttgagccct gtggccggcc agctgtggac   1080
cgtctgaaca tcaccttcta cgagaaccag atcaccgcat tcctgggcca caatggagct   1140
gggaaaacca ccaccttgtc catcctgacg ggtctgttgc caccaacctc tgggactgtg   1200
ctcgttgggg gaagggacat tgaaaccagc ctggatgcag tccggcagag ccttggcatg   1260
tgtccacagc acaacatcct gttccaccac ctcacggtgg ctgagcacat gctgttctat   1320
gcccagctga aggaaagtc ccaggaggag gcccagctgg agatgaaagc catgttggag   1380
gacacaggcc tccaccacaa gcggaatgaa gaggctcagg acctatcagg tggcatgcag   1440
agaaagctgt cggttgccat tgcctttgtg ggagatgcca aggtggtgat tctggacgaa   1500
cccacctctg gggtggaccc ttactcgaga cgctcaatct gggatctgct cctgaagtat   1560
cgctcaggca gaaccatcat catgtccact caccacatgg acgaggccga cctccttggg   1620
gaccgcattg ccatcattgc ccaggaagg ctctactgct caggcacccc actcttcctg   1680
aagaactgct ttggcacagg cttggacttc ctggcgcaga tcgtgctccc ggctaccttt   1740
gtgttttttgg ctctgatgct ttctattgtt atccctcctt ttggcgaata ccccgctacc   1800
acctactggg tgaccaactt cctctgggac atcatgaatt attccgtgag tgctgggctg   1860
gtggtgggca tcttcatcgg gtttcagaag aaagcctaca cttctccaga aaaccttcct   1920
gcccttgtgg cactgctcct gctgtatgga tgggcggtca ttcccatgat gtacccagca   1980
tccttcctgt tgatgtccc cagcacagcc tatgtggctt atcttgtgc taatctgttc   2040
atcggcatca acagcagtgc tattaccttc atcttggaat tatttgagaa taaccggacg   2100
ctgctcaggt tcaacgccgt gctgaggaag ctgctcattg tcttcccccca cttctgcctg   2160
ggccggggcc tcattgacct tgcactgagc caggctgtga cagatgtcta tgcccggttt   2220
ggtgaggagc actctgcaaa tccgttccac tgggacctga ttgggaagaa cctgtttgcc   2280
atggtggtgg aaggggtggt gtacttcctc ctgaccctgc tggtccagcg ccacttcttc   2340
ctctcccaat ggattgccga gcccactaag gagcccattg ttgatgaaga tgatgatgtg   2400
gctgaagaaa gacaaagaat tattactggt ggaaataaaa ctgacatctt aaggctacat   2460
gaactaacca agatttatcc aggcacctcc agcccagcag tggacaggct gtgtgtcgga   2520
gttcgccctg gagagtgctt tggcctcctg ggagtgaatg gtgccggcaa aacaaccaca   2580
ttcaagatgc tcactgggga caccacagtg acctcagggg atgccaccgt agcaggcaag   2640
agtatttaa ccaatatttc tgaagtccat caaaatatgg gctactgtcc tcagtttgat   2700
gcaattgatg agctgctcac aggacgagaa catctttacc tttatgcccg gcttcgaggt   2760
gtaccagcag aagaaatcga aaaggttgca aactggagta ttaagagcct gggcctgact   2820
gtctacgccg actgcctggc tggcacgtac agtgggggca acaagcggaa actctccaca   2880
gccatcgcac tcattggctg cccaccgctg tgctgctgg atgagcccac acagggatg   2940
gacccccagg cacgccgcat gctgtggaac gtcatcgtga gcatcatcag agaagggagg   3000
gctgtggtcc tcacatccca cagcatggaa gaatgtgagg cactgtgtac ccggctggcc   3060
atcatggtaa agggcgcctt tcgatgtatg ggcaccattc agcatctcaa gtccaaattt   3120
ggagatggct atatcgtcac aatgaagatc aaatccccga aggacgacct gcttcctgac   3180
ctgaaccctg tggagcagtt cttccagggg aacttcccag gcagtgtgca gagggagagg   3240
cactacaaca tgctccagtt ccaggtctcc tcctcctccc tggcgaggat cttccagctc   3300
```

| | |
|---|---|
| ctcctctccc acaaggacag cctgctcatc gaggagtact cagtcacaca gaccacactg | 3360 |
| gaccaggtgt ttgtaaattt tgctaaacag cagactgaaa gtcatgacct ccctctgcac | 3420 |
| cctcgagctg ctggagccag tcgacaagcc caggactga | 3459 |

<210> SEQ ID NO 18
<211> LENGTH: 3780
<212> TYPE: DNA
<213> ORGANISM: Artificial Sequence
<220> FEATURE:
<223> OTHER INFORMATION: Synthetic Polynucleotide

<400> SEQUENCE: 18

| | |
|---|---|
| atgggcttcg tgagacagat acagcttttg ctctggaaga actggaccct gcggaaaagg | 60 |
| caaaagattc gctttgtggt ggaactcgtg tggcctttat cttttatttct ggtcttgatc | 120 |
| tggttaagga atgccaaccc actctacagc catcatgaat gccatttccc caacaaggcg | 180 |
| atgccctcag caggaatgct gccgtggctc caggggatct tctgcaatgt gaacaatccc | 240 |
| tgttttcaaa gccccacccc aggagaatct cctggaattg tgtcaaacta taacaactcc | 300 |
| atcttggcaa gggtatatcg agattttcaa gaactcctca tgaatgcacc agagagccag | 360 |
| caccttggcc gtatttggac agagctacac atcttgtccc aattcatgga caccctccgg | 420 |
| actcacccgg agagaattgc aggaagagga atacgaataa gggatatctt gaaagatgaa | 480 |
| gaaacactga cactatttct cattaaaaac atcggcctgt ctgactcagt ggtctacctt | 540 |
| ctgatcaact ccaagtccg tccagagcag ttcgctcatg gagtcccgga cctggcgctg | 600 |
| aaggacatcg cctgcagcga ggccctcctg gagcgcttca tcatcttcag ccagagacgc | 660 |
| ggggcaaaga cggtgcgcta tgccctgtgc tccctctccc agggcaccct acagtggata | 720 |
| gaagacactc tgtatgccaa cgtggacttc ttcaagctct ccgtgtgct cccacactc | 780 |
| ctagacagcc gttctcaagg tatcaatctg agatcttggg gaggaatatt atctgatatg | 840 |
| tcaccaagaa ttcaagagtt tatccatcgg ccgagtatgc aggacttgct gtgggtgacc | 900 |
| aggcccctca tgcagaatgg tggtccagag accttttacaa agctgatggg catcctgtct | 960 |
| gacctcctgt gtggctaccc cgagggaggt ggctctcggg tgctctcctt caactggtat | 1020 |
| gaagacaata actataaggc ctttctgggg attgactcca caggaaggga tcctatctat | 1080 |
| tcttatgaca gaagaacaac atccttttgt aatgcattga tccagagcct ggagtcaaat | 1140 |
| cctttaacca aaatcgcttg gagggcggca aagcctttgc tgatgggaaa aatcctgtac | 1200 |
| actcctgatt cacctgcagc acgaaggata ctgaagaatg ccaactcaac ttttgaagaa | 1260 |
| ctggaacacg ttaggaagtt ggtcaaagcc tgggaagaag tagggcccca gatctggtac | 1320 |
| ttctttgaca cagcacaca gatgaacatg atcagagata ccctgggaa cccaacagta | 1380 |
| aaagactttt tgaataggca gcttggtgaa gaaggtatta ctgctgaagc catcctaaac | 1440 |
| ttcctctaca ggggccctcg ggaaagccag gctgacgaca tggccaactt cgactggagg | 1500 |
| gacatattta acatcactga tcgcaccctc cgcctggtca atcaatacct ggagtgcttg | 1560 |
| gtcctggata gtttgaaag ctacaatgat gaaactcagc tcacccaacg tgccctctct | 1620 |
| ctactggagg aaaacatgtt ctgggccgga gtggtattcc ctgacatgta tccctggacc | 1680 |
| agctctctac caccccacgt gaagtataag atccgaatgg acatagacgt ggtggagaaa | 1740 |
| accaataaga ttaagacag gtattgggat tctggtccca gagctgatcc cgtgaagat | 1800 |
| ttccggtaca tctgggcgg gtttgcctat ctgcaggaca tggttgaaca ggggatcaca | 1860 |

| | |
|---|---|
| aggagccagg tgcaggcgga ggctccagtt ggaatctacc tccagcagat gccctacccc | 1920 |
| tgcttcgtgg acgattcttt catgatcatc ctgaaccgct gtttccctat cttcatggtg | 1980 |
| ctggcatgga tctactctgt ctccatgact gtgaagagca tcgtcttgga aaggagttg | 2040 |
| cgactgaagg agaccttgaa aaatcagggt gtctccaatg cagtgatttg gtgtacctgg | 2100 |
| ttcctggaca gcttctccat catgtcgatg agcatcttcc tcctgacgat attcatcatg | 2160 |
| catggaagaa tcctacatta cagcgaccca ttcatcctct tcctgttctt gttggctttc | 2220 |
| tccactgcca ccatcatgct gtgctttctg ctcagcacct tcttctccaa ggccagtctg | 2280 |
| gcagcagcct gtagtggtgt catctatttc accctctacc tgccacacat cctgtgcttc | 2340 |
| gcctggcagg accgcatgac cgctgagctg aagaaggctg tgagcttact gtctccggtg | 2400 |
| gcatttggat ttggcactga gtacctggtt cgctttgaag agcaaggcct ggggctgcag | 2460 |
| tggagcaaca tcgggaacag tcccacggaa ggggacgaat tcagcttcct gctgtccatg | 2520 |
| cagatgatgc tccttgatgc tgctgtctat ggcttactcg cttggtacct tgatcaggtg | 2580 |
| gttcctgggg tatgcgtgaa gaatctgtga agattttg agccctgtgg ccggccagct | 2640 |
| gtggaccgtc tgaacatcac cttctacgag aaccagatca ccgcattcct gggccacaat | 2700 |
| ggagctggga aaaccaccac cttgtccatc ctgacgggtc tgttgccacc aacctctggg | 2760 |
| actgtgctcg ttgggggaag ggacattgaa accagcctgg atgcagtccg gcagagcctt | 2820 |
| ggcatgtgtc cacagcacaa catcctgttc caccacctca cggtggctga gcacatgctg | 2880 |
| ttctatgccc agctgaaagg aaagtcccag gaggaggccc agctggagat ggaagccatg | 2940 |
| ttggaggaca caggcctcca ccacaagcgg aatgaagagg ctcaggacct atcaggtggc | 3000 |
| atgcagagaa agctgtcggt tgccattgcc tttgtgggag atgccaaggt ggtgattctg | 3060 |
| gacgaaccca cctctggggt ggacccttac tcgagacgct caatctggga tctgctcctg | 3120 |
| aagtatcgct caggcagaac catcatcatg tccactcacc acatggacga ggccgacctc | 3180 |
| cttggggacc gcattgccat cattgcccag ggaaggctct actgctcagg caccccactc | 3240 |
| ttcctgaaga actgctttgt gaccaacttc ctctgggaca tcatgaatta ttccgtgagt | 3300 |
| gctgggctgg tggtgggcat cttcatcggg tttcagaaga aagcctacac ttctccagaa | 3360 |
| aaccttcctg cccttgtggc actgctcctg ctgtatggat gggcggtcat tcccatgatg | 3420 |
| tacccagcat cctcctgtt tgatgtcccc agcacagcct atgtggcttt atcttgtgct | 3480 |
| aatctgttca tcggcatcaa cagcagtgct attaccttca tcttggaatt atttgagaat | 3540 |
| aaccggacgc tgctcaggtt caacgccgtg ctgaggaagc tgctcattgt cttccccac | 3600 |
| ttctgcctgg gccggggcct cattgacctt gcactgagcc aggctgtgac agatgtctat | 3660 |
| gcccggtttg gtgaggagca ctctgcaaat ccgttccact gggacctgat tgggaagaac | 3720 |
| ctgtttgcca tggtggtgga agggtggtg tacttcctcc tgaccctgct ggtccagtga | 3780 |

<210> SEQ ID NO 19
<211> LENGTH: 3498
<212> TYPE: DNA
<213> ORGANISM: Artificial Sequence
<220> FEATURE:
<223> OTHER INFORMATION: Synthetic Polynucleotide

<400> SEQUENCE: 19

| | |
|---|---|
| atgggcttcg tgagacagat acagcttttg ctctggaaga actggaccct gcggaaaagg | 60 |
| caaaagattc gctttgtggt ggaactcgtg tggcctttat cttatttct ggtcttgatc | 120 |
| tggttaagga atgccaacgt ggacgattct ttcatgatca tcctgaaccg ctgtttccct | 180 |

```
atcttcatgg tgctggcatg gatctactct gtctccatga ctgtgaagag catcgtcttg      240
gagaaggagt tgcgactgaa ggagaccttg aaaaatcagg gtgtctccaa tgcagtgatt      300
tggtgtacct ggttcctgga cagcttctcc atcatgtcga tgagcatctt cctcctgacg      360
atattcatca tgcatggaag aatcctacat tacagcgacc cattcatcct cttcctgttc      420
ttgttggctt tctccactgc caccatcatg ctgtgctttc tgctcagcac cttcttctcc      480
aaggccagtc tggcagcagc ctgtagtggt gtcatctatt tcaccctcta cctgccacac      540
atcctgtgct tcgcctggca ggaccgcatg accgctgagc tgaagaaggc tgtgagctta      600
ctgtctccgg tggcatttgg atttggcact gagtacctgg ttcgctttga agagcaaggc      660
ctggggctgc agtggagcaa catcgggaac agtcccacgg aagggacga attcagcttc      720 ctgctgtcca tgcagatgat gctccttgat gctgctgtct atggcttact cgcttggtac      780
cttgatcagg tgttcctggc gcagatcgtg ctcccggcta cctttgtgtt tttggctctg      840
atgctttcta ttgttatccc tccttttggc gaatacccg ctttgaccct tcaccctgg       900 atatatgggc agcagtacac cttcttcagc atggatgaac caggcagtga gcagttcacg      960
gtacttgcag acgtcctcct gaataagcca ggctttggca accgctgcct gaaggaaggg     1020
tggcttccgg agtaccctg tggcaactca acaccctgga agactccttc tgtgtcccca      1080
aacatcaccc agctgttcca gaagcagaaa tggacacagg tcaaccttc accatcctgc      1140 aggtgcagca ccagggagaa gctcaccatg ctgccagagt gccccgaggg tgccgggggc     1200
ctcccgcccc cccagagaac acagcgcagc acggaaattc tacaagacct gacggacagg     1260
aacatctccg acttcttggt aaaaacgtat cctgctctta agaagcag cttaaagagc       1320 aaattctggg tcaatgaaca gaggtatgga ggaatttcca ttggaggaaa gctcccagtc     1380
gtccccatca cggggaagc acttgttggg tttttaagcg accttggccg gatcatgaat     1440
gtgagcgggg gccctatcac tagagaggcc tctaaagaaa tacctgattt ccttaaacat     1500
ctagaaactg aagacaacat taaggtgtgg tttaataaca aaggctggca tgccctggtc     1560
agctttctca atgtggccca caacgccatc ttacgggcca gcctgcctaa ggacaggagc     1620
cccgaggagt atggaatcac cgtcattagc caaccctga acctgaccaa ggagcagctc      1680
tcagagatta cagtgctgac cacttcagtg gatgctgtgg ttgccatctg cgtgattttc     1740
tccatgtcct tcgtcccagc cagctttgtc ctttatttga tccaggagcg ggtgaacaaa     1800
tccaagcacc tccagtttat cagtggagtg agccccacca cctactgggt gaccaacttc     1860
ctctgggaca tcatgaatta ttccgtgagt gctgggctgg tggtgggcat cttcatcggg     1920
tttcagaaga aagcctacac ttctccagaa aaccttcctg cccttgtggc actgctcctg     1980
ctgtatggat gggcggtcat tcccatgatg tacccagcat ccttcctgtt tgatgtcccc     2040
agcacagcct atgtggcttt atcttgtgct aatctgttca tcggcatcaa cagcagtgct     2100
attaccttca tcttggaatt atttgagaat aaccggacgc tgctcaggtt caacgccgtg     2160
ctgaggaagc tgctcattgt cttcccccac ttctgcctgg gccgggcct cattgacctt     2220 gcactgagcc aggctgtgac agatgtctat gcccggtttg gtgaggagca ctctgcaaat     2280
ccgttccact gggaccctgat tgggaagaac ctgtttgcca tggtggtgga aggggtggtg     2340
tacttcctcc tgaccctgct ggtccagcgc cacttcttcc tctcccaatg gattgccgag     2400
cccactaagg agcccattgt tgatgaagat gatgatgtgg ctgaagaaag acaaagaatt     2460
attactggtg gaaataaaac tgacatctta aggctacatg aactaaccaa gatttatcca     2520
```

```
ggcacctcca gcccagcagt ggacaggctg tgtgtcggag ttcgccctgg agagtgcttt    2580
ggcctcctgg gagtgaatgg tgccggcaaa acaaccacat tcaagatgct cactggggac    2640
accacagtga cctcagggga tgccaccgta gcaggcaaga gtattttaac caatatttct    2700
gaagtccatc aaaatatggg ctactgtcct cagtttgatg caattgatga gctgctcaca    2760
ggacgagaac atctttacct ttatgcccgg cttcgaggtg taccagcaga agaaatcgaa    2820
aaggttgcaa actggagtat taagagcctg ggcctgactg tctacgccga ctgcctggct    2880
ggcacgtaca gtgggggcaa caagcggaaa ctctccacag ccatcgcact cattggctgc    2940
ccaccgctgg tgctgctgga tgagcccacc acagggatgg accccaggc acgccgcatg    3000 ctgtggaacg tcatcgtgag catcatcaga gaagggaggg ctgtggtcct cacatcccac    3060
agcatggaag aatgtgaggc actgtgtacc cggctggcca tcatggtaaa gggcgccttt    3120
cgatgtatgg gcaccattca gcatctcaag tccaaatttg gagatggcta tatcgtcaca    3180
atgaagatca atccccgaa ggacgacctg cttcctgacc tgaaccctgt ggagcagttc    3240
ttccagggga acttcccagg cagtgtgcag agggagaggc actacaacat gctccagttc    3300
caggtctcct cctcctccct ggcgaggatc ttccagctcc tcctctccca caaggacagc    3360
ctgctcatcg aggagtactc agtcacacag accacactgg accaggtgtt tgtaaatttt    3420
gctaaacagc agactgaaag tcatgacctc cctctgcacc ctcgagctgc tggagccagt    3480
cgacaagccc aggactga                                                  3498
```

<210> SEQ ID NO 20
<211> LENGTH: 1160
<212> TYPE: PRT
<213> ORGANISM: Artificial Sequence
<220> FEATURE:
<223> OTHER INFORMATION: Synthetic Polypeptide

<400> SEQUENCE: 20

```
Met Gly Phe Val Arg Gln Ile Gln Leu Leu Leu Trp Lys Asn Trp Thr
1               5                   10                  15

Leu Arg Lys Arg Gln Lys Ile Arg Phe Val Val Glu Leu Val Trp Pro
            20                  25                  30

Leu Ser Leu Phe Leu Val Leu Ile Trp Leu Arg Asn Ala Asn Pro Leu
        35                  40                  45

Tyr Ser His His Glu Cys His Phe Pro Asn Lys Ala Met Pro Ser Ala
    50                  55                  60

Gly Met Leu Pro Trp Leu Gln Gly Ile Phe Cys Asn Val Asn Asn Pro
65                  70                  75                  80

Cys Phe Gln Ser Pro Thr Pro Gly Glu Ser Pro Gly Ile Val Ser Asn
                85                  90                  95

Tyr Asn Asn Ser Ile Leu Ala Arg Val Tyr Arg Asp Phe Gln Glu Leu
            100                 105                 110

Leu Met Asn Ala Pro Glu Ser Gln His Leu Gly Arg Ile Trp Thr Glu
        115                 120                 125

Leu His Ile Leu Ser Gln Phe Met Asp Thr Leu Arg Thr His Pro Glu
    130                 135                 140

Arg Ile Ala Gly Arg Gly Ile Arg Ile Arg Asp Ile Leu Lys Asp Glu
145                 150                 155                 160

Glu Thr Leu Thr Leu Phe Leu Ile Lys Asn Ile Gly Leu Ser Asp Ser
                165                 170                 175

Val Val Tyr Leu Leu Ile Asn Ser Gln Val Arg Pro Glu Gln Phe Ala
            180                 185                 190
```

-continued

```
His Gly Val Pro Asp Leu Ala Leu Lys Asp Ile Ala Cys Ser Glu Ala
        195                 200                 205

Leu Leu Glu Arg Phe Ile Ile Phe Ser Gln Arg Arg Gly Ala Lys Thr
    210                 215                 220

Val Arg Tyr Ala Leu Cys Ser Leu Ser Gln Gly Thr Leu Gln Trp Ile
225                 230                 235                 240

Glu Asp Thr Leu Tyr Ala Asn Val Asp Phe Phe Lys Leu Phe Arg Val
                245                 250                 255

Leu Pro Thr Leu Leu Asp Ser Arg Ser Gln Gly Ile Asn Leu Arg Ser
            260                 265                 270

Trp Gly Gly Ile Leu Ser Asp Met Ser Pro Arg Ile Gln Glu Phe Ile
        275                 280                 285

His Arg Pro Ser Met Gln Asp Leu Leu Trp Val Thr Arg Pro Leu Met
    290                 295                 300

Gln Asn Gly Gly Pro Glu Thr Phe Thr Lys Leu Met Gly Ile Leu Ser
305                 310                 315                 320

Asp Leu Leu Cys Gly Tyr Pro Glu Gly Gly Ser Arg Val Leu Ser
                325                 330                 335

Phe Asn Trp Tyr Glu Asp Asn Tyr Lys Ala Phe Leu Gly Ile Asp
            340                 345                 350

Ser Thr Arg Lys Asp Pro Ile Tyr Ser Tyr Asp Arg Arg Thr Thr Ser
        355                 360                 365

Phe Cys Asn Ala Leu Ile Gln Ser Leu Glu Ser Asn Pro Leu Thr Lys
    370                 375                 380

Ile Ala Trp Arg Ala Ala Lys Pro Leu Leu Met Gly Lys Ile Leu Tyr
385                 390                 395                 400

Thr Pro Asp Ser Pro Ala Ala Arg Arg Ile Leu Lys Asn Ala Asn Ser
                405                 410                 415

Thr Phe Glu Glu Leu Glu His Val Arg Lys Leu Val Lys Ala Trp Glu
            420                 425                 430

Glu Val Gly Pro Gln Ile Trp Tyr Phe Phe Asp Asn Ser Thr Gln Met
        435                 440                 445

Asn Met Ile Arg Asp Thr Leu Gly Asn Pro Thr Val Lys Asp Phe Leu
    450                 455                 460

Asn Arg Gln Leu Gly Glu Gly Ile Thr Ala Glu Ala Ile Leu Asn
465                 470                 475                 480

Phe Leu Tyr Lys Gly Pro Arg Glu Ser Gln Ala Asp Met Ala Asn
                485                 490                 495

Phe Asp Trp Arg Asp Ile Phe Asn Ile Thr Asp Arg Thr Leu Arg Leu
            500                 505                 510

Val Asn Gln Tyr Leu Glu Cys Leu Val Leu Asp Lys Phe Glu Ser Tyr
        515                 520                 525

Asn Asp Glu Thr Gln Leu Thr Gln Arg Ala Leu Ser Leu Leu Glu Glu
    530                 535                 540

Asn Met Phe Trp Ala Gly Val Val Phe Pro Asp Met Tyr Pro Trp Thr
545                 550                 555                 560

Ser Ser Leu Pro Pro His Val Lys Tyr Lys Ile Arg Met Asp Ile Asp
                565                 570                 575

Val Val Glu Lys Thr Asn Lys Ile Lys Asp Arg Tyr Trp Asp Ser Gly
            580                 585                 590

Pro Arg Ala Asp Pro Val Glu Asp Phe Arg Tyr Ile Trp Gly Gly Phe
        595                 600                 605
```

```
Ala Tyr Leu Gln Asp Met Val Glu Gln Gly Ile Thr Arg Ser Gln Val
        610                 615                 620

Gln Ala Glu Ala Pro Val Gly Ile Tyr Leu Gln Gln Met Pro Tyr Pro
625                 630                 635                 640

Cys Phe Val Asp Asp Ser Phe Met Ile Ile Leu Asn Arg Cys Phe Pro
                645                 650                 655

Ile Phe Met Val Leu Ala Trp Ile Tyr Ser Val Ser Met Thr Val Lys
            660                 665                 670

Ser Ile Val Leu Glu Lys Glu Leu Arg Leu Lys Glu Thr Leu Lys Asn
        675                 680                 685

Gln Gly Val Ser Asn Ala Val Ile Trp Cys Thr Trp Phe Leu Asp Ser
690                 695                 700

Phe Ser Ile Met Ser Met Ser Ile Phe Leu Leu Thr Ile Phe Ile Met
705                 710                 715                 720

His Gly Arg Ile Leu His Tyr Ser Asp Pro Phe Ile Leu Phe Leu Phe
            725                 730                 735

Leu Leu Ala Phe Ser Thr Ala Thr Ile Met Leu Cys Phe Leu Leu Ser
        740                 745                 750

Thr Phe Phe Ser Lys Ala Ser Leu Ala Ala Ala Cys Ser Gly Val Ile
    755                 760                 765

Tyr Phe Thr Leu Tyr Leu Pro His Ile Leu Cys Phe Ala Trp Gln Asp
770                 775                 780

Arg Met Thr Ala Glu Leu Lys Lys Ala Val Ser Leu Leu Ser Pro Val
785                 790                 795                 800

Ala Phe Gly Phe Gly Thr Glu Tyr Leu Val Arg Phe Glu Glu Gln Gly
            805                 810                 815

Leu Gly Leu Gln Trp Ser Asn Ile Gly Asn Ser Pro Thr Glu Gly Asp
        820                 825                 830

Glu Phe Ser Phe Leu Leu Ser Met Gln Met Met Leu Leu Asp Ala Ala
    835                 840                 845

Val Tyr Gly Leu Leu Ala Trp Tyr Leu Asp Gln Val Phe Pro Gly Asp
850                 855                 860

Tyr Gly Thr Pro Leu Pro Trp Tyr Phe Leu Leu Gln Glu Ser Tyr Trp
865                 870                 875                 880

Leu Gly Gly Glu Gly Cys Ser Thr Arg Glu Glu Arg Ala Leu Glu Lys
            885                 890                 895

Thr Glu Pro Leu Thr Glu Thr Glu Asp Pro Glu His Pro Glu Gly
        900                 905                 910

Ile His Asp Ser Phe Phe Glu Arg Glu His Pro Gly Trp Val Pro Gly
    915                 920                 925

Val Cys Val Lys Asn Leu Val Lys Ile Phe Glu Pro Cys Gly Arg Pro
930                 935                 940

Ala Val Asp Arg Leu Asn Ile Thr Phe Tyr Glu Asn Gln Ile Thr Ala
945                 950                 955                 960

Phe Leu Gly His Asn Gly Ala Gly Lys Thr Thr Thr Leu Ser Ile Leu
            965                 970                 975

Thr Gly Leu Leu Pro Pro Thr Ser Gly Thr Val Leu Val Gly Gly Arg
        980                 985                 990

Asp Ile Glu Thr Ser Leu Asp Ala  Val Arg Gln Ser Leu  Gly Met Cys
    995                 1000                 1005

Pro Gln  His Asn Ile Leu Phe  His His Leu Thr Val  Ala Glu His
    1010                 1015                 1020

Met Leu  Phe Tyr Ala Gln Leu  Lys Gly Lys Ser Gln  Glu Glu Ala
```

```
            1025                1030                1035

Gln Leu Glu Met Glu Ala Met Leu Glu Asp Thr Gly Leu His His
            1040                1045                1050

Lys Arg Asn Glu Glu Ala Gln Asp Leu Ser Gly Gly Met Gln Arg
            1055                1060                1065

Lys Leu Ser Val Ala Ile Ala Phe Val Gly Asp Ala Lys Val Val
            1070                1075                1080

Ile Leu Asp Glu Pro Thr Ser Gly Val Asp Pro Tyr Ser Arg Arg
            1085                1090                1095

Ser Ile Trp Asp Leu Leu Leu Lys Tyr Arg Ser Gly Arg Thr Ile
            1100                1105                1110

Ile Met Ser Thr His His Met Asp Glu Ala Asp Leu Leu Gly Asp
            1115                1120                1125

Arg Ile Ala Ile Ile Ala Gln Gly Arg Leu Tyr Cys Ser Gly Thr
            1130                1135                1140

Pro Leu Phe Leu Lys Asn Cys Phe Gly Thr Gly Leu Tyr Leu Thr
            1145                1150                1155

Leu Val
    1160

<210> SEQ ID NO 21
<211> LENGTH: 917
<212> TYPE: PRT
<213> ORGANISM: Artificial Sequence
<220> FEATURE:
<223> OTHER INFORMATION: Synthetic Polypeptide

<400> SEQUENCE: 21

Met Gly Phe Val Arg Gln Ile Gln Leu Leu Leu Trp Lys Asn Trp Thr
1               5                   10                  15

Leu Arg Lys Arg Ile Val Leu Pro Ala Thr Phe Val Phe Leu Ala Leu
                20                  25                  30

Met Leu Ser Ile Val Ile Pro Pro Phe Gly Glu Tyr Pro Ala Leu Thr
            35                  40                  45

Leu His Pro Trp Ile Tyr Gly Gln Gln Tyr Thr Phe Phe Ser Met Asp
50                  55                  60

Glu Pro Gly Ser Glu Gln Phe Thr Val Leu Ala Asp Val Leu Leu Asn
65                  70                  75                  80

Lys Pro Gly Phe Gly Asn Arg Cys Leu Lys Glu Gly Trp Leu Pro Glu
                85                  90                  95

Tyr Pro Cys Gly Asn Ser Thr Pro Trp Lys Thr Pro Ser Val Ser Pro
            100                 105                 110

Asn Ile Thr Gln Leu Phe Gln Lys Gln Lys Trp Thr Gln Val Asn Pro
        115                 120                 125

Ser Pro Ser Cys Arg Cys Ser Thr Arg Glu Lys Leu Thr Met Leu Pro
130                 135                 140

Glu Cys Pro Glu Gly Ala Gly Gly Leu Pro Pro Gln Arg Thr Gln
145                 150                 155                 160

Arg Ser Thr Glu Ile Leu Gln Asp Leu Thr Asp Arg Asn Ile Ser Asp
                165                 170                 175

Phe Leu Val Lys Thr Tyr Pro Ala Leu Ile Arg Ser Ser Leu Lys Ser
            180                 185                 190

Lys Phe Trp Val Asn Glu Gln Arg Tyr Gly Gly Ile Ser Ile Gly Gly
        195                 200                 205

Lys Leu Pro Val Val Pro Ile Thr Gly Glu Ala Leu Val Gly Phe Leu
```

```
                210                 215                 220
Ser Asp Leu Gly Arg Ile Met Asn Val Ser Gly Pro Ile Thr Arg
225                 230                 235                 240

Glu Ala Ser Lys Glu Ile Pro Asp Phe Leu Lys His Leu Glu Thr Glu
                245                 250                 255

Asp Asn Ile Lys Val Trp Phe Asn Asn Lys Gly Trp His Ala Leu Val
                260                 265                 270

Ser Phe Leu Asn Val Ala His Asn Ala Ile Leu Arg Ala Ser Leu Pro
                275                 280                 285

Lys Asp Arg Ser Pro Glu Glu Tyr Gly Ile Thr Val Ile Ser Gln Pro
                290                 295                 300

Leu Asn Leu Thr Lys Glu Gln Leu Ser Glu Ile Thr Val Leu Thr Thr
305                 310                 315                 320

Ser Val Asp Ala Val Val Ala Ile Cys Val Ile Phe Ser Met Ser Phe
                325                 330                 335

Val Pro Ala Ser Phe Val Leu Tyr Leu Ile Gln Glu Arg Val Asn Lys
                340                 345                 350

Ser Lys His Leu Gln Phe Ile Ser Gly Val Ser Pro Thr Thr Tyr Trp
                355                 360                 365

Val Thr Asn Phe Leu Trp Asp Ile Met Asn Tyr Ser Val Ser Ala Gly
                370                 375                 380

Leu Val Val Gly Ile Phe Ile Gly Phe Gln Lys Lys Ala Tyr Thr Ser
385                 390                 395                 400

Pro Glu Asn Leu Pro Ala Leu Val Ala Leu Leu Leu Tyr Gly Trp
                405                 410                 415

Ala Val Ile Pro Met Met Tyr Pro Ala Ser Phe Leu Phe Asp Val Pro
                420                 425                 430

Ser Thr Ala Tyr Val Ala Leu Ser Cys Ala Asn Leu Phe Ile Gly Ile
                435                 440                 445

Asn Ser Ser Ala Ile Thr Phe Ile Leu Glu Leu Phe Glu Asn Asn Arg
                450                 455                 460

Thr Leu Leu Arg Phe Asn Ala Val Leu Arg Lys Leu Leu Ile Val Phe
465                 470                 475                 480

Pro His Phe Cys Leu Gly Arg Gly Leu Ile Asp Leu Ala Leu Ser Gln
                485                 490                 495

Ala Val Thr Asp Val Tyr Ala Arg Phe Gly Glu Glu His Ser Ala Asn
                500                 505                 510

Pro Phe His Trp Asp Leu Ile Gly Lys Asn Leu Phe Ala Met Val Val
                515                 520                 525

Glu Gly Val Val Tyr Phe Leu Leu Thr Leu Leu Val Gln Arg His Phe
                530                 535                 540

Phe Leu Ser Gln Trp Ile Ala Glu Pro Thr Lys Glu Pro Ile Val Asp
545                 550                 555                 560

Glu Asp Asp Val Ala Glu Glu Arg Gln Arg Ile Ile Thr Gly Gly
                565                 570                 575

Asn Lys Thr Asp Ile Leu Arg Leu His Glu Leu Thr Lys Ile Tyr Pro
                580                 585                 590

Gly Thr Ser Ser Pro Ala Val Asp Arg Leu Cys Val Gly Val Arg Pro
                595                 600                 605

Gly Glu Cys Phe Gly Leu Leu Gly Val Asn Gly Ala Gly Lys Thr Thr
                610                 615                 620

Thr Phe Lys Met Leu Thr Gly Asp Thr Thr Val Thr Ser Gly Asp Ala
625                 630                 635                 640
```

```
Thr Val Ala Gly Lys Ser Ile Leu Thr Asn Ile Ser Glu Val His Gln
                645                 650                 655

Asn Met Gly Tyr Cys Pro Gln Phe Asp Ala Ile Asp Glu Leu Leu Thr
            660                 665                 670

Gly Arg Glu His Leu Tyr Leu Tyr Ala Arg Leu Arg Gly Val Pro Ala
        675                 680                 685

Glu Glu Ile Glu Lys Val Ala Asn Trp Ser Ile Lys Ser Leu Gly Leu
    690                 695                 700

Thr Val Tyr Ala Asp Cys Leu Ala Gly Thr Tyr Ser Gly Gly Asn Lys
705                 710                 715                 720

Arg Lys Leu Ser Thr Ala Ile Ala Leu Ile Gly Cys Pro Pro Leu Val
                725                 730                 735

Leu Leu Asp Glu Pro Thr Thr Gly Met Asp Pro Gln Ala Arg Arg Met
            740                 745                 750

Leu Trp Asn Val Ile Val Ser Ile Ile Arg Glu Gly Arg Ala Val Val
        755                 760                 765

Leu Thr Ser His Ser Met Glu Glu Cys Glu Ala Leu Cys Thr Arg Leu
    770                 775                 780

Ala Ile Met Val Lys Gly Ala Phe Arg Cys Met Gly Thr Ile Gln His
785                 790                 795                 800

Leu Lys Ser Lys Phe Gly Asp Gly Tyr Ile Val Thr Met Lys Ile Lys
                805                 810                 815

Ser Pro Lys Asp Asp Leu Leu Pro Asp Leu Asn Pro Val Glu Gln Phe
            820                 825                 830

Phe Gln Gly Asn Phe Pro Gly Ser Val Gln Arg Glu His Tyr Asn
        835                 840                 845

Met Leu Gln Phe Gln Val Ser Ser Ser Leu Ala Arg Ile Phe Gln
    850                 855                 860

Leu Leu Leu Ser His Lys Asp Ser Leu Leu Ile Glu Glu Tyr Ser Val
865                 870                 875                 880

Thr Gln Thr Thr Leu Asp Gln Val Phe Val Asn Phe Ala Lys Gln Gln
                885                 890                 895

Thr Glu Ser His Asp Leu Pro Leu His Pro Arg Ala Ala Gly Ala Ser
            900                 905                 910

Arg Gln Ala Gln Asp
        915

<210> SEQ ID NO 22
<211> LENGTH: 1152
<212> TYPE: PRT
<213> ORGANISM: Artificial Sequence
<220> FEATURE:
<223> OTHER INFORMATION: Synthetic Polypeptide

<400> SEQUENCE: 22

Met Gly Phe Val Arg Gln Ile Gln Leu Leu Leu Trp Lys Asn Trp Thr
1               5                   10                  15

Leu Arg Lys Arg Gln Lys Ile Arg Phe Val Val Glu Leu Val Trp Pro
                20                  25                  30

Leu Ser Leu Phe Leu Val Leu Ile Trp Leu Arg Asn Ala Asn Pro Leu
            35                  40                  45

Tyr Met Pro Tyr Pro Cys Phe Val Asp Asp Ser Phe Met Ile Ile Leu
        50                  55                  60

Asn Arg Cys Phe Pro Ile Phe Met Val Leu Ala Trp Ile Tyr Ser Val
65                  70                  75                  80
```

-continued

Ser Met Thr Val Lys Ser Ile Val Leu Glu Lys Glu Leu Arg Leu Lys
                85                  90                  95

Glu Thr Leu Lys Asn Gln Gly Val Ser Asn Ala Val Ile Trp Cys Thr
            100                 105                 110

Trp Phe Leu Asp Ser Phe Ser Ile Met Ser Met Ser Ile Phe Leu Leu
        115                 120                 125

Thr Ile Phe Ile Met His Gly Arg Ile Leu His Tyr Ser Asp Pro Phe
    130                 135                 140

Ile Leu Phe Leu Phe Leu Leu Ala Phe Ser Thr Ala Thr Ile Met Leu
145                 150                 155                 160

Cys Phe Leu Leu Ser Thr Phe Phe Ser Lys Ala Ser Leu Ala Ala Ala
                165                 170                 175

Cys Ser Gly Val Ile Tyr Phe Thr Leu Tyr Leu Pro His Ile Leu Cys
            180                 185                 190

Phe Ala Trp Gln Asp Arg Met Thr Ala Glu Leu Lys Lys Ala Val Ser
        195                 200                 205

Leu Leu Ser Pro Val Ala Phe Gly Phe Gly Thr Glu Tyr Leu Val Arg
    210                 215                 220

Phe Glu Glu Gln Gly Leu Gly Leu Gln Trp Ser Asn Ile Gly Asn Ser
225                 230                 235                 240

Pro Thr Glu Gly Asp Glu Phe Ser Phe Leu Leu Ser Met Gln Met Met
                245                 250                 255

Leu Leu Asp Ala Ala Val Tyr Gly Leu Leu Ala Trp Tyr Leu Asp Gln
            260                 265                 270

Val Phe Pro Gly Asp Tyr Gly Thr Pro Leu Pro Trp Tyr Phe Leu Leu
        275                 280                 285

Gln Glu Ser Tyr Trp Leu Gly Gly Glu Gly Cys Ser Thr Arg Glu Glu
    290                 295                 300

Arg Ala Leu Glu Lys Thr Glu Pro Leu Thr Glu Thr Glu Asp Pro
305                 310                 315                 320

Glu His Pro Glu Gly Ile His Asp Ser Phe Phe Glu Arg Glu His Pro
                325                 330                 335

Gly Trp Val Pro Gly Val Cys Val Lys Asn Leu Val Lys Ile Phe Glu
            340                 345                 350

Pro Cys Gly Arg Pro Ala Val Asp Arg Leu Asn Ile Thr Phe Tyr Glu
        355                 360                 365

Asn Gln Ile Thr Ala Phe Leu Gly His Asn Gly Ala Gly Lys Thr Thr
    370                 375                 380

Thr Leu Ser Ile Leu Thr Gly Leu Leu Pro Pro Thr Ser Gly Thr Val
385                 390                 395                 400

Leu Val Gly Gly Arg Asp Ile Glu Thr Ser Leu Asp Ala Val Arg Gln
                405                 410                 415

Ser Leu Gly Met Cys Pro Gln His Asn Ile Leu Phe His His Leu Thr
            420                 425                 430

Val Ala Glu His Met Leu Phe Tyr Ala Gln Leu Lys Gly Lys Ser Gln
        435                 440                 445

Glu Glu Ala Gln Leu Glu Met Glu Ala Met Leu Glu Asp Thr Gly Leu
    450                 455                 460

His His Lys Arg Asn Glu Glu Ala Gln Asp Leu Ser Gly Gly Met Gln
465                 470                 475                 480

Arg Lys Leu Ser Val Ala Ile Ala Phe Val Gly Asp Ala Lys Val Val
                485                 490                 495

```
Ile Leu Asp Glu Pro Thr Ser Gly Val Asp Pro Tyr Ser Arg Arg Ser
            500                 505                 510

Ile Trp Asp Leu Leu Leu Lys Tyr Arg Ser Gly Arg Thr Ile Ile Met
        515                 520                 525

Ser Thr His His Met Asp Glu Ala Asp Leu Leu Gly Asp Arg Ile Ala
    530                 535                 540

Ile Ile Ala Gln Gly Arg Leu Tyr Cys Ser Gly Thr Pro Leu Phe Leu
545                 550                 555                 560

Lys Asn Cys Phe Gly Thr Gly Leu Asp Phe Leu Ala Gln Ile Val Leu
                565                 570                 575

Pro Ala Thr Phe Val Phe Leu Ala Leu Met Leu Ser Ile Val Ile Pro
            580                 585                 590

Pro Phe Gly Glu Tyr Pro Ala Thr Thr Tyr Trp Val Thr Asn Phe Leu
        595                 600                 605

Trp Asp Ile Met Asn Tyr Ser Val Ser Ala Gly Leu Val Val Gly Ile
        610                 615                 620

Phe Ile Gly Phe Gln Lys Lys Ala Tyr Thr Ser Pro Glu Asn Leu Pro
625                 630                 635                 640

Ala Leu Val Ala Leu Leu Leu Tyr Gly Trp Ala Val Ile Pro Met
                645                 650                 655

Met Tyr Pro Ala Ser Phe Leu Phe Asp Val Pro Ser Thr Ala Tyr Val
            660                 665                 670

Ala Leu Ser Cys Ala Asn Leu Phe Ile Gly Ile Asn Ser Ser Ala Ile
        675                 680                 685

Thr Phe Ile Leu Glu Leu Phe Glu Asn Asn Arg Thr Leu Leu Arg Phe
    690                 695                 700

Asn Ala Val Leu Arg Lys Leu Leu Ile Val Phe Pro His Phe Cys Leu
705                 710                 715                 720

Gly Arg Gly Leu Ile Asp Leu Ala Leu Ser Gln Ala Val Thr Asp Val
                725                 730                 735

Tyr Ala Arg Phe Gly Glu Glu His Ser Ala Asn Pro Phe His Trp Asp
            740                 745                 750

Leu Ile Gly Lys Asn Leu Phe Ala Met Val Val Glu Gly Val Val Tyr
        755                 760                 765

Phe Leu Leu Thr Leu Leu Val Gln Arg His Phe Phe Leu Ser Gln Trp
770                 775                 780

Ile Ala Glu Pro Thr Lys Glu Pro Ile Val Asp Glu Asp Asp Asp Val
785                 790                 795                 800

Ala Glu Glu Arg Gln Arg Ile Ile Thr Gly Gly Asn Lys Thr Asp Ile
                805                 810                 815

Leu Arg Leu His Glu Leu Thr Lys Ile Tyr Pro Gly Thr Ser Ser Pro
            820                 825                 830

Ala Val Asp Arg Leu Cys Val Gly Val Arg Pro Gly Glu Cys Phe Gly
        835                 840                 845

Leu Leu Gly Val Asn Gly Ala Gly Lys Thr Thr Thr Phe Lys Met Leu
850                 855                 860

Thr Gly Asp Thr Thr Val Thr Ser Gly Asp Ala Thr Val Ala Gly Lys
865                 870                 875                 880

Ser Ile Leu Thr Asn Ile Ser Glu Val His Gln Asn Met Gly Tyr Cys
                885                 890                 895

Pro Gln Phe Asp Ala Ile Asp Glu Leu Leu Thr Gly Arg Glu His Leu
            900                 905                 910

Tyr Leu Tyr Ala Arg Leu Arg Gly Val Pro Ala Glu Glu Ile Glu Lys
```

-continued

```
                915                 920                 925
Val Ala Asn Trp Ser Ile Lys Ser Leu Gly Leu Thr Val Tyr Ala Asp
    930                 935                 940

Cys Leu Ala Gly Thr Tyr Ser Gly Gly Asn Lys Arg Lys Leu Ser Thr
945                 950                 955                 960

Ala Ile Ala Leu Ile Gly Cys Pro Pro Leu Val Leu Asp Glu Pro
                965                 970                 975

Thr Thr Gly Met Asp Pro Gln Ala Arg Arg Met Leu Trp Asn Val Ile
            980                 985                 990

Val Ser Ile Ile Arg Glu Gly Arg Ala Val Val Leu Thr Ser His Ser
                995                1000                1005

Met Glu Glu Cys Glu Ala Leu Cys Thr Arg Leu Ala Ile Met Val
   1010                1015                1020

Lys Gly Ala Phe Arg Cys Met Gly Thr Ile Gln His Leu Lys Ser
   1025                1030                1035

Lys Phe Gly Asp Gly Tyr Ile Val Thr Met Lys Ile Lys Ser Pro
   1040                1045                1050

Lys Asp Asp Leu Leu Pro Asp Leu Asn Pro Val Glu Gln Phe Phe
   1055                1060                1065

Gln Gly Asn Phe Pro Gly Ser Val Gln Arg Glu Arg His Tyr Asn
   1070                1075                1080

Met Leu Gln Phe Gln Val Ser Ser Ser Leu Ala Arg Ile Phe
   1085                1090                1095

Gln Leu Leu Leu Ser His Lys Asp Ser Leu Leu Ile Glu Glu Tyr
   1100                1105                1110

Ser Val Thr Gln Thr Thr Leu Asp Gln Val Phe Val Asn Phe Ala
   1115                1120                1125

Lys Gln Gln Thr Glu Ser His Asp Leu Pro Leu His Pro Arg Ala
   1130                1135                1140

Ala Gly Ala Ser Arg Gln Ala Gln Asp
   1145                1150
```

<210> SEQ ID NO 23
<211> LENGTH: 1259
<212> TYPE: PRT
<213> ORGANISM: Artificial Sequence
<220> FEATURE:
<223> OTHER INFORMATION: Synthetic Polypeptide

<400> SEQUENCE: 23

```
Met Gly Phe Val Arg Gln Ile Gln Leu Leu Trp Lys Asn Trp Thr
1               5                  10                  15

Leu Arg Lys Arg Gln Lys Ile Arg Phe Val Val Glu Leu Val Trp Pro
                20                  25                  30

Leu Ser Leu Phe Leu Val Leu Ile Trp Leu Arg Asn Ala Asn Pro Leu
            35                  40                  45

Tyr Ser His His Glu Cys His Phe Pro Asn Lys Ala Met Pro Ser Ala
    50                  55                  60

Gly Met Leu Pro Trp Leu Gln Gly Ile Phe Cys Asn Val Asn Asn Pro
65                  70                  75                  80

Cys Phe Gln Ser Pro Thr Pro Gly Glu Ser Pro Gly Ile Val Ser Asn
                85                  90                  95

Tyr Asn Asn Ser Ile Leu Ala Arg Val Tyr Arg Asp Phe Gln Glu Leu
                100                 105                 110

Leu Met Asn Ala Pro Glu Ser Gln His Leu Gly Arg Ile Trp Thr Glu
```

```
            115                 120                 125
Leu His Ile Leu Ser Gln Phe Met Asp Thr Leu Arg Thr His Pro Glu
            130                 135                 140

Arg Ile Ala Gly Arg Gly Ile Arg Ile Arg Asp Ile Leu Lys Asp Glu
145                 150                 155                 160

Glu Thr Leu Thr Leu Phe Leu Ile Lys Asn Ile Gly Leu Ser Asp Ser
                    165                 170                 175

Val Val Tyr Leu Leu Ile Asn Ser Gln Val Arg Pro Glu Gln Phe Ala
            180                 185                 190

His Gly Val Pro Asp Leu Ala Leu Lys Asp Ile Ala Cys Ser Glu Ala
            195                 200                 205

Leu Leu Glu Arg Phe Ile Ile Phe Ser Gln Arg Arg Gly Ala Lys Thr
            210                 215                 220

Val Arg Tyr Ala Leu Cys Ser Leu Ser Gln Gly Thr Leu Gln Trp Ile
225                 230                 235                 240

Glu Asp Thr Leu Tyr Ala Asn Val Asp Phe Phe Lys Leu Phe Arg Val
                    245                 250                 255

Leu Pro Thr Leu Leu Asp Ser Arg Ser Gln Gly Ile Asn Leu Arg Ser
            260                 265                 270

Trp Gly Gly Ile Leu Ser Asp Met Ser Pro Arg Ile Gln Glu Phe Ile
            275                 280                 285

His Arg Pro Ser Met Gln Asp Leu Leu Trp Val Thr Arg Pro Leu Met
290                 295                 300

Gln Asn Gly Gly Pro Glu Thr Phe Thr Lys Leu Met Gly Ile Leu Ser
305                 310                 315                 320

Asp Leu Leu Cys Gly Tyr Pro Glu Gly Gly Ser Arg Val Leu Ser
                    325                 330                 335

Phe Asn Trp Tyr Glu Asp Asn Asn Tyr Lys Ala Phe Leu Gly Ile Asp
            340                 345                 350

Ser Thr Arg Lys Asp Pro Ile Tyr Ser Tyr Asp Arg Arg Thr Thr Ser
            355                 360                 365

Phe Cys Asn Ala Leu Ile Gln Ser Leu Glu Ser Asn Pro Leu Thr Lys
            370                 375                 380

Ile Ala Trp Arg Ala Ala Lys Pro Leu Leu Met Gly Lys Ile Leu Tyr
385                 390                 395                 400

Thr Pro Asp Ser Pro Ala Ala Arg Arg Ile Leu Lys Asn Ala Asn Ser
                    405                 410                 415

Thr Phe Glu Glu Leu Glu His Val Arg Lys Leu Val Lys Ala Trp Glu
            420                 425                 430

Glu Val Gly Pro Gln Ile Trp Tyr Phe Phe Asp Asn Ser Thr Gln Met
            435                 440                 445

Asn Met Ile Arg Asp Thr Leu Gly Asn Pro Thr Val Lys Asp Phe Leu
            450                 455                 460

Asn Arg Gln Leu Gly Glu Glu Gly Ile Thr Ala Glu Ala Ile Leu Asn
465                 470                 475                 480

Phe Leu Tyr Lys Gly Pro Arg Glu Ser Gln Ala Asp Met Ala Asn
                    485                 490                 495

Phe Asp Trp Arg Asp Ile Phe Asn Ile Thr Asp Arg Thr Leu Arg Leu
            500                 505                 510

Val Asn Gln Tyr Leu Glu Cys Leu Val Leu Asp Lys Phe Glu Ser Tyr
            515                 520                 525

Asn Asp Glu Thr Gln Leu Thr Gln Arg Ala Leu Ser Leu Leu Glu Glu
            530                 535                 540
```

-continued

```
Asn Met Phe Trp Ala Gly Val Val Phe Pro Asp Met Tyr Pro Trp Thr
545                 550                 555                 560
Ser Ser Leu Pro Pro His Val Lys Tyr Lys Ile Arg Met Asp Ile Asp
                565                 570                 575
Val Val Glu Lys Thr Asn Lys Ile Lys Asp Arg Tyr Trp Asp Ser Gly
            580                 585                 590
Pro Arg Ala Asp Pro Val Glu Asp Phe Arg Tyr Ile Trp Gly Gly Phe
        595                 600                 605
Ala Tyr Leu Gln Asp Met Val Glu Gln Gly Ile Thr Arg Ser Gln Val
    610                 615                 620
Gln Ala Glu Ala Pro Val Gly Ile Tyr Leu Gln Met Pro Tyr Pro
625                 630                 635                 640
Cys Phe Val Asp Asp Ser Phe Met Ile Ile Leu Asn Arg Cys Phe Pro
                645                 650                 655
Ile Phe Met Val Leu Ala Trp Ile Tyr Ser Val Ser Met Thr Val Lys
                660                 665                 670
Ser Ile Val Leu Glu Lys Glu Leu Arg Leu Lys Glu Thr Leu Lys Asn
                675                 680                 685
Gln Gly Val Ser Asn Ala Val Ile Trp Cys Thr Trp Phe Leu Asp Ser
690                 695                 700
Phe Ser Ile Met Ser Met Ser Ile Phe Leu Leu Thr Ile Phe Ile Met
705                 710                 715                 720
His Gly Arg Ile Leu His Tyr Ser Asp Pro Phe Ile Leu Phe Leu Phe
                725                 730                 735
Leu Leu Ala Phe Ser Thr Ala Thr Ile Met Leu Cys Phe Leu Leu Ser
                740                 745                 750
Thr Phe Phe Ser Lys Ala Ser Leu Ala Ala Ala Cys Ser Gly Val Ile
                755                 760                 765
Tyr Phe Thr Leu Tyr Leu Pro His Ile Leu Cys Phe Ala Trp Gln Asp
                770                 775                 780
Arg Met Thr Ala Glu Leu Lys Lys Ala Val Ser Leu Leu Ser Pro Val
785                 790                 795                 800
Ala Phe Gly Phe Gly Thr Glu Tyr Leu Val Arg Phe Glu Glu Gln Gly
                805                 810                 815
Leu Gly Leu Gln Trp Ser Asn Ile Gly Asn Ser Pro Thr Glu Gly Asp
                820                 825                 830
Glu Phe Ser Phe Leu Leu Ser Met Gln Met Met Leu Leu Asp Ala Ala
                835                 840                 845
Val Tyr Gly Leu Leu Ala Trp Tyr Leu Asp Gln Val Val Pro Gly Val
                850                 855                 860
Cys Val Lys Asn Leu Val Lys Ile Phe Glu Pro Cys Gly Arg Pro Ala
865                 870                 875                 880
Val Asp Arg Leu Asn Ile Thr Phe Tyr Glu Asn Gln Ile Thr Ala Phe
                885                 890                 895
Leu Gly His Asn Gly Ala Gly Lys Thr Thr Thr Leu Ser Ile Leu Thr
                900                 905                 910
Gly Leu Leu Pro Pro Thr Ser Gly Thr Val Leu Val Gly Gly Arg Asp
                915                 920                 925
Ile Glu Thr Ser Leu Asp Ala Val Arg Gln Ser Leu Gly Met Cys Pro
                930                 935                 940
Gln His Asn Ile Leu Phe His His Leu Thr Val Ala Glu His Met Leu
945                 950                 955                 960
```

Phe Tyr Ala Gln Leu Lys Gly Lys Ser Gln Glu Ala Gln Leu Glu
                965                 970                 975

Met Glu Ala Met Leu Glu Asp Thr Gly Leu His His Lys Arg Asn Glu
            980                 985                 990

Glu Ala Gln Asp Leu Ser Gly Gly Met Gln Arg Lys Leu Ser Val Ala
        995                 1000                1005

Ile Ala Phe Val Gly Asp Ala Lys Val Val Ile Leu Asp Glu Pro
    1010                1015                1020

Thr Ser Gly Val Asp Pro Tyr Ser Arg Arg Ser Ile Trp Asp Leu
    1025                1030                1035

Leu Leu Lys Tyr Arg Ser Gly Arg Thr Ile Ile Met Ser Thr His
    1040                1045                1050

His Met Asp Glu Ala Asp Leu Leu Gly Asp Arg Ile Ala Ile Ile
    1055                1060                1065

Ala Gln Gly Arg Leu Tyr Cys Ser Gly Thr Pro Leu Phe Leu Lys
    1070                1075                1080

Asn Cys Phe Val Thr Asn Phe Leu Trp Asp Ile Met Asn Tyr Ser
    1085                1090                1095

Val Ser Ala Gly Leu Val Val Gly Ile Phe Ile Gly Phe Gln Lys
    1100                1105                1110

Lys Ala Tyr Thr Ser Pro Glu Asn Leu Pro Ala Leu Val Ala Leu
    1115                1120                1125

Leu Leu Leu Tyr Gly Trp Ala Val Ile Pro Met Met Tyr Pro Ala
    1130                1135                1140

Ser Phe Leu Phe Asp Val Pro Ser Thr Ala Tyr Val Ala Leu Ser
    1145                1150                1155

Cys Ala Asn Leu Phe Ile Gly Ile Asn Ser Ser Ala Ile Thr Phe
    1160                1165                1170

Ile Leu Glu Leu Phe Glu Asn Asn Arg Thr Leu Leu Arg Phe Asn
    1175                1180                1185

Ala Val Leu Arg Lys Leu Leu Ile Val Phe Pro His Phe Cys Leu
    1190                1195                1200

Gly Arg Gly Leu Ile Asp Leu Ala Leu Ser Gln Ala Val Thr Asp
    1205                1210                1215

Val Tyr Ala Arg Phe Gly Glu Glu His Ser Ala Asn Pro Phe His
    1220                1225                1230

Trp Asp Leu Ile Gly Lys Asn Leu Phe Ala Met Val Val Glu Gly
    1235                1240                1245

Val Val Tyr Phe Leu Leu Thr Leu Leu Val Gln
    1250                1255

<210> SEQ ID NO 24
<211> LENGTH: 1165
<212> TYPE: PRT
<213> ORGANISM: Artificial Sequence
<220> FEATURE:
<223> OTHER INFORMATION: Synthetic Polypeptide

<400> SEQUENCE: 24

Met Gly Phe Val Arg Gln Ile Gln Leu Leu Leu Trp Lys Asn Trp Thr
1               5                   10                  15

Leu Arg Lys Arg Gln Lys Ile Arg Phe Val Val Glu Leu Val Trp Pro
            20                  25                  30

Leu Ser Leu Phe Leu Val Leu Ile Trp Leu Arg Asn Ala Asn Val Asp
        35                  40                  45

```
Asp Ser Phe Met Ile Ile Leu Asn Arg Cys Phe Pro Ile Phe Met Val
    50                  55                  60

Leu Ala Trp Ile Tyr Ser Val Ser Met Thr Val Lys Ser Ile Val Leu
65                  70                  75                  80

Glu Lys Glu Leu Arg Leu Lys Glu Thr Leu Lys Asn Gln Gly Val Ser
                85                  90                  95

Asn Ala Val Ile Trp Cys Thr Trp Phe Leu Asp Ser Phe Ser Ile Met
                100                 105                 110

Ser Met Ser Ile Phe Leu Leu Thr Ile Phe Ile Met His Gly Arg Ile
            115                 120                 125

Leu His Tyr Ser Asp Pro Phe Ile Leu Phe Leu Phe Leu Leu Ala Phe
        130                 135                 140

Ser Thr Ala Thr Ile Met Leu Cys Phe Leu Leu Ser Thr Phe Phe Ser
145                 150                 155                 160

Lys Ala Ser Leu Ala Ala Ala Cys Ser Gly Val Ile Tyr Phe Thr Leu
                165                 170                 175

Tyr Leu Pro His Ile Leu Cys Phe Ala Trp Gln Asp Arg Met Thr Ala
                180                 185                 190

Glu Leu Lys Lys Ala Val Ser Leu Leu Ser Pro Val Ala Phe Gly Phe
            195                 200                 205

Gly Thr Glu Tyr Leu Val Arg Phe Glu Glu Gln Gly Leu Gly Leu Gln
        210                 215                 220

Trp Ser Asn Ile Gly Asn Ser Pro Thr Glu Gly Asp Glu Phe Ser Phe
225                 230                 235                 240

Leu Leu Ser Met Gln Met Met Leu Leu Asp Ala Ala Val Tyr Gly Leu
                245                 250                 255

Leu Ala Trp Tyr Leu Asp Gln Val Phe Leu Ala Gln Ile Val Leu Pro
                260                 265                 270

Ala Thr Phe Val Phe Leu Ala Leu Met Leu Ser Ile Val Ile Pro Pro
            275                 280                 285

Phe Gly Glu Tyr Pro Ala Leu Thr Leu His Pro Trp Ile Tyr Gly Gln
        290                 295                 300

Gln Tyr Thr Phe Phe Ser Met Asp Glu Pro Gly Ser Glu Gln Phe Thr
305                 310                 315                 320

Val Leu Ala Asp Val Leu Leu Asn Lys Pro Gly Phe Gly Asn Arg Cys
                325                 330                 335

Leu Lys Glu Gly Trp Leu Pro Glu Tyr Pro Cys Gly Asn Ser Thr Pro
                340                 345                 350

Trp Lys Thr Pro Ser Val Ser Pro Asn Ile Thr Gln Leu Phe Gln Lys
            355                 360                 365

Gln Lys Trp Thr Gln Val Asn Pro Ser Pro Ser Cys Arg Cys Ser Thr
        370                 375                 380

Arg Glu Lys Leu Thr Met Leu Pro Glu Cys Pro Glu Gly Ala Gly Gly
385                 390                 395                 400

Leu Pro Pro Pro Gln Arg Thr Gln Arg Ser Thr Glu Ile Leu Gln Asp
                405                 410                 415

Leu Thr Asp Arg Asn Ile Ser Asp Phe Leu Val Lys Thr Tyr Pro Ala
                420                 425                 430

Leu Ile Arg Ser Ser Leu Lys Ser Lys Phe Trp Val Asn Glu Gln Arg
            435                 440                 445

Tyr Gly Gly Ile Ser Ile Gly Gly Lys Leu Pro Val Val Pro Ile Thr
        450                 455                 460

Gly Glu Ala Leu Val Gly Phe Leu Ser Asp Leu Gly Arg Ile Met Asn
```

```
            465                 470                 475                 480
Val Ser Gly Gly Pro Ile Thr Arg Glu Ala Ser Lys Glu Ile Pro Asp
                485                 490                 495

Phe Leu Lys His Leu Glu Thr Glu Asp Asn Ile Lys Val Trp Phe Asn
                500                 505                 510

Asn Lys Gly Trp His Ala Leu Val Ser Phe Leu Asn Val Ala His Asn
                515                 520                 525

Ala Ile Leu Arg Ala Ser Leu Pro Lys Asp Arg Ser Pro Glu Glu Tyr
                530                 535                 540

Gly Ile Thr Val Ile Ser Gln Pro Leu Asn Leu Thr Lys Glu Gln Leu
545                 550                 555                 560

Ser Glu Ile Thr Val Leu Thr Thr Ser Val Asp Ala Val Val Ala Ile
                565                 570                 575

Cys Val Ile Phe Ser Met Ser Phe Val Pro Ala Ser Phe Val Leu Tyr
                580                 585                 590

Leu Ile Gln Glu Arg Val Asn Lys Ser Lys His Leu Gln Phe Ile Ser
                595                 600                 605

Gly Val Ser Pro Thr Thr Tyr Trp Val Thr Asn Phe Leu Trp Asp Ile
                610                 615                 620

Met Asn Tyr Ser Val Ser Ala Gly Leu Val Val Gly Ile Phe Ile Gly
625                 630                 635                 640

Phe Gln Lys Lys Ala Tyr Thr Ser Pro Glu Asn Leu Pro Ala Leu Val
                645                 650                 655

Ala Leu Leu Leu Leu Tyr Gly Trp Ala Val Ile Pro Met Met Tyr Pro
                660                 665                 670

Ala Ser Phe Leu Phe Asp Val Pro Ser Thr Ala Tyr Val Ala Leu Ser
                675                 680                 685

Cys Ala Asn Leu Phe Ile Gly Ile Asn Ser Ser Ala Ile Thr Phe Ile
                690                 695                 700

Leu Glu Leu Phe Glu Asn Asn Arg Thr Leu Leu Arg Phe Asn Ala Val
705                 710                 715                 720

Leu Arg Lys Leu Leu Ile Val Phe Pro His Phe Cys Leu Gly Arg Gly
                725                 730                 735

Leu Ile Asp Leu Ala Leu Ser Gln Ala Val Thr Asp Val Tyr Ala Arg
                740                 745                 750

Phe Gly Glu Glu His Ser Ala Asn Pro Phe His Trp Asp Leu Ile Gly
                755                 760                 765

Lys Asn Leu Phe Ala Met Val Val Glu Gly Val Val Tyr Phe Leu Leu
770                 775                 780

Thr Leu Leu Val Gln Arg His Phe Phe Leu Ser Gln Trp Ile Ala Glu
785                 790                 795                 800

Pro Thr Lys Glu Pro Ile Val Asp Glu Asp Asp Val Ala Glu Glu
                805                 810                 815

Arg Gln Arg Ile Ile Thr Gly Gly Asn Lys Thr Asp Ile Leu Arg Leu
                820                 825                 830

His Glu Leu Thr Lys Ile Tyr Pro Gly Thr Ser Ser Pro Ala Val Asp
                835                 840                 845

Arg Leu Cys Val Gly Val Arg Pro Gly Glu Cys Phe Gly Leu Leu Gly
                850                 855                 860

Val Asn Gly Ala Gly Lys Thr Thr Thr Phe Lys Met Leu Thr Gly Asp
865                 870                 875                 880

Thr Thr Val Thr Ser Gly Asp Ala Thr Val Ala Gly Lys Ser Ile Leu
                885                 890                 895
```

```
Thr Asn Ile Ser Glu Val His Gln Asn Met Gly Tyr Cys Pro Gln Phe
            900                 905                 910

Asp Ala Ile Asp Glu Leu Leu Thr Gly Arg Glu His Leu Tyr Leu Tyr
            915                 920                 925

Ala Arg Leu Arg Gly Val Pro Ala Glu Glu Ile Glu Lys Val Ala Asn
            930                 935             940

Trp Ser Ile Lys Ser Leu Gly Leu Thr Val Tyr Ala Asp Cys Leu Ala
945                 950                 955                 960

Gly Thr Tyr Ser Gly Gly Asn Lys Arg Lys Leu Ser Thr Ala Ile Ala
                965                 970                 975

Leu Ile Gly Cys Pro Pro Leu Val Leu Leu Asp Glu Pro Thr Thr Gly
            980                 985                 990

Met Asp Pro Gln Ala Arg Arg Met  Leu Trp Asn Val Ile  Val Ser Ile
            995                 1000                1005

Ile Arg Glu Gly Arg Ala Val  Val Leu Thr Ser His  Ser Met Glu
        1010                1015                1020

Glu Cys Glu Ala Leu Cys Thr  Arg Leu Ala Ile Met  Val Lys Gly
        1025                1030                1035

Ala Phe Arg Cys Met Gly Thr  Ile Gln His Leu Lys  Ser Lys Phe
        1040                1045                1050

Gly Asp Gly Tyr Ile Val Thr  Met Lys Ile Lys Ser  Pro Lys Asp
        1055                1060                1065

Asp Leu Leu Pro Asp Leu Asn  Pro Val Glu Gln Phe  Phe Gln Gly
        1070                1075                1080

Asn Phe Pro Gly Ser Val Gln  Arg Glu Arg His Tyr  Asn Met Leu
        1085                1090                1095

Gln Phe Gln Val Ser Ser Ser  Ser Leu Ala Arg Ile  Phe Gln Leu
        1100                1105                1110

Leu Leu Ser His Lys Asp Ser  Leu Leu Ile Glu Glu  Tyr Ser Val
        1115                1120                1125

Thr Gln Thr Thr Leu Asp Gln  Val Phe Val Asn Phe  Ala Lys Gln
        1130                1135                1140

Gln Thr Glu Ser His Asp Leu  Pro Leu His Pro Arg  Ala Ala Gly
        1145                1150                1155

Ala Ser Arg Gln Ala Gln Asp
        1160                1165
```

GENE THERAPIES FOR STARGARDT DISEASE (ABCA4)

RELATED APPLICATION

This application is a national stage filing under 35 U.S.C. § 371 of international PCT application PCT/US2020/028504, filed Apr. 16, 2020, which claims priority under 35 U.S.C. § 119(e) to U.S. provisional patent application, U.S. Ser. No. 62/836,493, filed Apr. 19, 2019, the entire contents of each of which are incorporated herein by reference.

BACKGROUND

Stargardt Disease is the most common type of autosomal recessive macular degeneration. This disease is caused by mutations in the ABCA4 gene. The human ABCA4 gene is ~7 kb long, which exceeds the limit to package into conventional Adeno-associated Viral (AAV) vectors for gene delivery.

SUMMARY

Aspects of the disclosure relate to compositions and methods useful for delivering minigenes to a subject. Accordingly, the disclosure is based, in part, on isolated nucleic acids and gene therapy vectors, such as viral (e.g., rAAV) vectors, comprising one or more gene fragments encoding a therapeutic gene product, such as a protein or peptide (e.g., a minigene). In some embodiments, the disclosure relates to gene therapy vectors encoding a ABCA4 protein (e.g., the gene product of ABCA4) or a portion thereof. In some embodiments, compositions described by the disclosure are useful for treating diseases associated with mutations in the ABCA4 gene, for example Stargardt disease.

Accordingly, in some aspects, the disclosure provides an isolated nucleic acid comprising a transgene encoding a ABCA4 minigene having the sequence set forth in any one of SEQ ID NOs: 3-8 and 15-19.

In some aspects, the disclosure provides an isolated nucleic acid comprising a transgene having a nucleic acid sequence encoding a ABCA4 protein, wherein the ABCA4 protein comprises an amino acid sequence as set forth in any one of SEQ ID NOs: 9-14 and 20-24.

In some embodiments, a transgene further comprises a promoter operably linked to a ABCA4 minigene-encoding sequence. In some embodiments, a promoter is a constitutive promoter, inducible promoter, or a tissue-specific promoter. In some embodiments, the promoter comprises a chicken beta-actin (CBA) promoter. In some embodiments, tissue specific promoter is a photoreceptor-specific promoter. In some embodiments, a photoreceptor-specific promoter comprises a rhodopsin kinase promoter, such as a human GRK promoter.

In some embodiments, a transgene is flanked by adeno-associated virus (AAV) inverted terminal repeats (ITRs). In some embodiments, at least one of the ITRs flanking a transgene is an AAV2 ITR. In some embodiments, at least one ITR flanking a transgene lacks a terminal resolution site, for example a ΔITR.

In some aspects, the disclosure provides a vector comprising an isolated nucleic acid as described herein. In some embodiments, a vector is a plasmid DNA, or closed-ended DNA, or lipid/DNA nanoparticle, or a viral vector. In some embodiments, a viral vector is an adeno-associated virus (AAV) vector, adenoviral (Ad) vector, lentiviral vector, retroviral vector, or Baculovirus vector.

In some aspects, the disclosure provides a host cell comprising an isolated nucleic acid or a vector as described herein. In some embodiments, a cell is a mammalian (human) cell, bacterial cell, yeast cell, or insect cell.

In some aspects, the disclosure provides a recombinant adeno-associated virus (rAAV) comprising: an isolated nucleic acid as described herein; and an AAV capsid protein.

In some embodiments, a capsid protein has a tropism for ocular cells. In some embodiments, a capsid protein is AAV8 capsid protein.

In some embodiments, an rAAV is formulated for delivery to the eye. In some embodiments, an rAAV is formulated for delivery to photoreceptor cells or retinal pigmented endothelium (RPE).

In some aspects, the disclosure provides a composition comprising an isolated nucleic acid or an rAAV as described herein, and a pharmaceutically acceptable excipient.

In some aspects, the disclosure provides a method for delivering a transgene to a cell, the method comprising administering an isolated nucleic acid or an rAAV as described herein to a cell.

In some embodiments, a cell is in a subject. In some embodiments, a subject is a mammalian subject, such as a human subject. In some embodiments, a cell is an eye cell. In some embodiments, an eye cell is a photoreceptor cell or retinal pigmented epithelium (RPE).

In some aspects, the disclosure provides a method for treating Stargardt disease in a subject in need thereof, the method comprising administering an isolated nucleic acid or an rAAV as described herein to the subject.

In some embodiments, a subject is a mammal. In some embodiments, a subject is a human.

In some embodiments, a subject is characterized by having one or more mutations in a ABCA4 gene. In some embodiments, a subject has one or more mutations that result in an amino acid substitution selected from G1961E and D2177N corresponding to a wild-type ABCA4 protein (e.g., the amino acid sequence set forth in SEQ ID NO: 2).

In some embodiments, administration is via injection. In some embodiments, the injection is subretinal injection or intravitreal injection or suprachoroidal injection.

In some embodiments, administration is topical administration to the eye of a subject.

DETAILED DESCRIPTION

Figure 1:
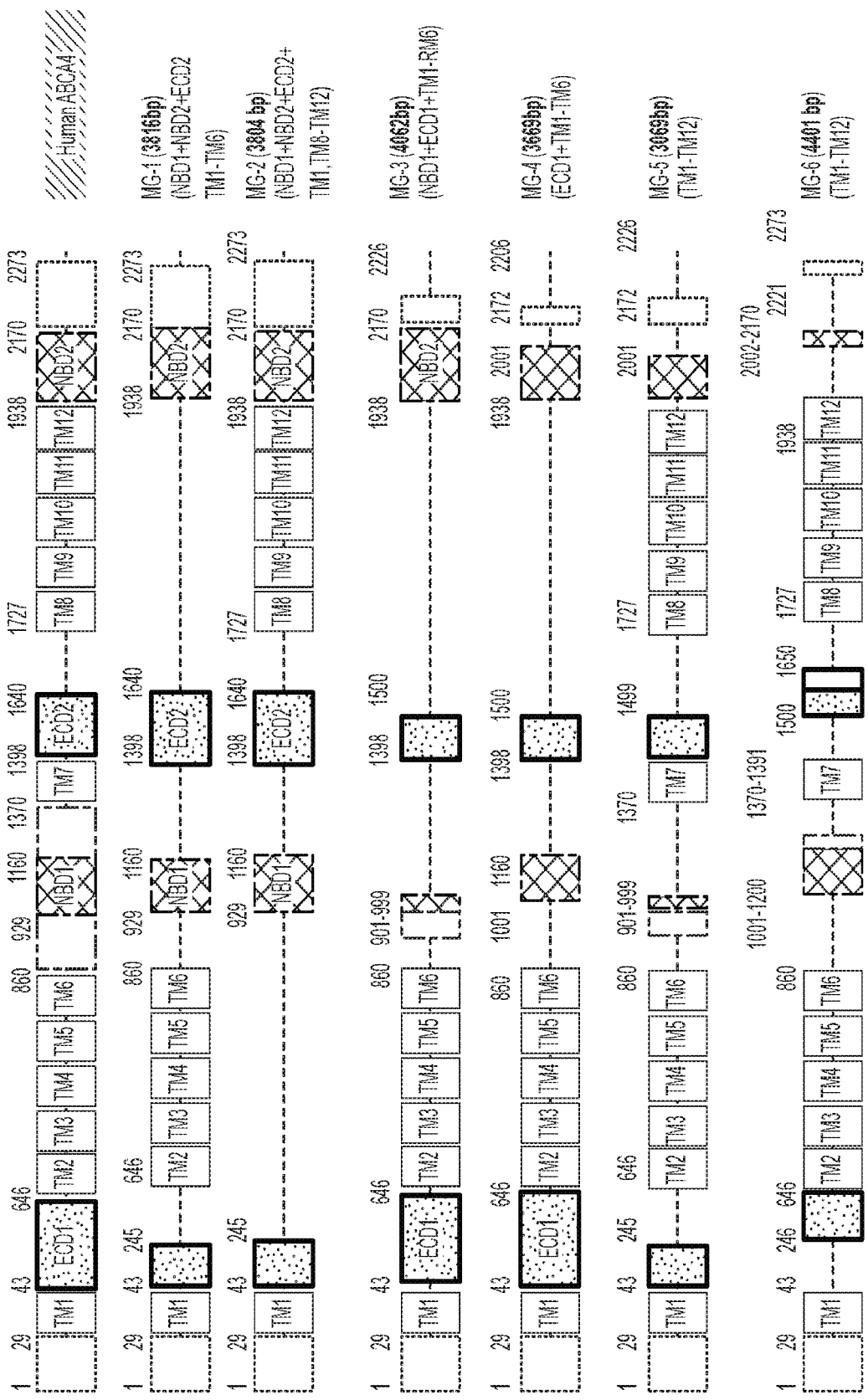
FIG. 1 is a schematic of several embodiments of Mini-ABCA4 constructs. MG-1, MG-2, MG-3, MG-4, MG-5, and MG-6, having amino acid sequences corresponding to SEQ ID NOs: 9-14, are shown.

In some aspects, the disclosure relates to compositions and methods useful for treating certain genetic diseases, for example Stargardt disease. The disclosure is based, in part, on isolated nucleic acids and gene therapy vectors, such as viral (e.g., rAAV) vectors, comprising one or more gene fragments encoding a therapeutic gene product, such as a MiniABCA4 protein (e.g., the gene product of an ABCA4 minigene).

A "nucleic acid" sequence refers to a DNA or RNA sequence. In some embodiments, proteins and nucleic acids of the disclosure are isolated. As used herein, the term "isolated" means artificially produced. As used herein with respect to nucleic acids, the term "isolated" means: (i) amplified in vitro by, for example, polymerase chain reaction (PCR); (ii) recombinantly produced by cloning; (iii) purified, as by cleavage and gel separation; or (iv) synthesized by, for example, chemical synthesis. An isolated nucleic acid is one which is readily manipulable by recombinant DNA techniques well known in the art. Thus, a nucleotide sequence contained in a vector in which 5' and 3' restriction sites are known or for which polymerase chain reaction (PCR) primer sequences have been disclosed is considered isolated but a nucleic acid sequence existing in its native state in its natural host is not. An isolated nucleic acid may be substantially purified, but need not be. For example, a nucleic acid that is isolated within a cloning or expression vector is not pure in that it may comprise only a tiny percentage of the material in the cell in which it resides. Such a nucleic acid is isolated, however, as the term is used herein because it is readily manipulable by standard techniques known to those of ordinary skill in the art. As used herein with respect to proteins or peptides, the term "isolated" refers to a protein or peptide that has been isolated from its natural environment or artificially produced (e.g., by chemical synthesis, by recombinant DNA technology, etc.). In some embodiments, an isolated nucleic acid encodes an ABCA4 protein, such as a MiniABCA4 protein (e.g., a gene product expressed from a ABCA4 gene or a portion thereof, such as an ABCA4 minigene).

In humans, the ABCA4 gene (also referred to as STGD) encodes ATP-binding cassette, sub-family A (ABC1), member 4 protein, which is localized to outer segment disk edges of rods and cones and may function as an inward-directed flippase. Mutations in ABCA4 gene have been observed to cause Stargardt disease, which is a form of macular degeneration. In some embodiments, an ABCA4 gene comprises the nucleic acid sequence set forth in NCBI Reference Sequence Accession Number NM_000350.3 (SEQ ID NO: 1). In some embodiments, an ABCA4 gene encodes a protein having the amino acid sequence set forth in NCBI Reference Sequence Accession Number NP_000341.2 (SEQ ID NO: 2).

As used herein, "minigene" refers to an isolated nucleic acid sequence encoding a recombinant peptide or protein where one or more non-essential elements of the corresponding gene encoding the naturally-occurring peptide or protein have been removed and where the peptide or protein encoded by the minigene retains function of the corresponding naturally-occurring peptide or protein. A "therapeutic minigene" refers to a minigene encoding a peptide or protein useful for treatment of a genetic disease, for example dystrophin, dysferlin, Factor VIII, Amyloid precursor protein (APP), Tyrosinase (Tyr), etc. Minigenes are known in the art and are described, for example by Karpati and Acsadi (1994) *Clin Invest* Med 17(5):499-509; Plantier et al. (2001) *Thromb Haemost.* 86(2):596-603; and Xiao et al. (2007) *World J. Gastroenterol.* 13(2):244-9. In some embodiments, a minigene does not comprise the sequence of the corresponding naturally-occurring peptide or protein.

In some aspects the disclosure relates to isolated nucleic acids encoding an ABCA4 minigene. Generally, an isolated nucleic acid encoding a minigene (e.g., a therapeutic minigene, such as an ABCA4 minigene) is between about 10% and about 99% (e.g., about 10%, about 15%, about 20%, about 25%, about 30%, about 40% about 50%, about 60%, about 70%, about 75%, about 80%, about 90%, about 99%, etc.) truncated with respect to a nucleic acid sequence encoding the corresponding naturally-occurring wild-type protein (e.g., SEQ ID NO: 1). The truncations may be continuous (e.g., single, continuous truncation of amino acid residues) or discontinuous (e.g., two or more truncations of amino acids, for example truncation of two or more domains, that are separated by one or more peptides). For example, in some embodiments, a minigene encoding a Mini ABCA4 protein is between about 61% and truncated (e.g., comprises about 50% of the nucleic acid sequence) compared to a wild-type ABCA4 gene (e.g., SEQ ID NO: 1). In some embodiments, an ABCA4 minigene comprises (or consists of) the nucleic acid sequence set forth in any one of SEQ ID NOs: 3-8 and 15-19. In some embodiments, an ABCA4 minigene encodes a protein (referred to as a Mini-ABCA4 protein) that comprises (or consists of) an amino acid sequence set forth in any one of SEQ ID NOs: 9-14 and 20-24. In some embodiments, a nucleic acid encoding an ABCA4 protein (e.g., a MiniABCA4 protein) comprises a start codon (e.g., the nucleic acid sequence ATG) prior to the nucleic acid sequence encoding the MiniABCA4 protein. In some embodiments a nucleic acid sequence encoding a MiniABCA4 protein is codon-optimized.

An isolated nucleic acid sequence encoding an ABCA4 protein may be operably linked to a promoter. A "promoter" refers to a DNA sequence recognized by the synthetic machinery of the cell, or introduced synthetic machinery, required to initiate the specific transcription of a gene. The phrases "operatively positioned," "under control" or "under transcriptional control" means that the promoter is in the correct location and orientation in relation to the nucleic acid to control RNA polymerase initiation and expression of the gene. A promoter may be a constitutive promoter, inducible promoter, or a tissue-specific promoter.

Examples of constitutive promoters include, without limitation, the retroviral Rous sarcoma virus (RSV) LTR promoter (optionally with the RSV enhancer), the cytomegalovirus (CMV) promoter (optionally with the CMV enhancer) [see, e.g., Boshart et al., Cell, 41:521-530 (1985)], the SV40 promoter, the dihydrofolate reductase promoter, the β-actin promoter, the phosphoglycerol kinase (PGK) promoter, and the EF1α promoter [Invitrogen]. In some embodiments, a promoter comprises a chicken beta-actin (CBA) promoter. In some embodiments, a promoter is an enhanced chicken β-actin promoter. In some embodiments, a promoter is a U6 promoter. In some embodiments, a promoter is a chicken beta-actin (CBA) promoter.

Inducible promoters allow regulation of gene expression and can be regulated by exogenously supplied compounds, environmental factors such as temperature, or the presence of a specific physiological state, e.g., acute phase, a particular differentiation state of the cell, or in replicating cells only. Inducible promoters and inducible systems are available from a variety of commercial sources, including, without limitation, Invitrogen, Clontech and Ariad. Many other systems have been described and can be readily selected by one of skill in the art. Examples of inducible promoters regulated by exogenously supplied promoters include the zinc-inducible sheep metallothionine (MT) promoter, the dexamethasone (Dex)-inducible mouse mammary tumor virus (MMTV) promoter, the T7 polymerase promoter system (WO 98/10088); the ecdysone insect promoter (No et al., Proc. Natl. Acad. Sci. USA, 93:3346-3351 (1996)), the tetracycline-repressible system (Gossen et al., Proc. Natl. Acad. Sci. USA, 89:5547-5551 (1992)), the tetracycline-inducible system (Gossen et al., Science, 268:1766-1769 (1995), see also Harvey et al., Curr. Opin. Chem. Biol., 2:512-518 (1998)), the RU486-inducible system (Wang et al., Nat. Biotech., 15:239-243 (1997) and Wang et al., Gene Ther., 4:432-441 (1997)) and the rapamycin-inducible system (Magari et al., J. Clin. Invest., 100:2865-2872 (1997)). Still other types of inducible promoters which may be useful in this context are those which are regulated by a specific physiological state, e.g., temperature, acute phase, a particular differentiation state of the cell, or in replicating cells only.

In some embodiments, the regulatory sequences impart tissue-specific gene expression capabilities. In some cases, the tissue-specific regulatory sequences bind tissue-specific transcription factors that induce transcription in a tissue specific manner. Such tissue-specific regulatory sequences (e.g., promoters, enhancers, etc.) are well known in the art. In some embodiments, the tissue-specific promoter is an eye-specific promoter. Examples of eye-specific promoters include but are not limited to a retinoschisin promoter, K12 promoter, a rhodopsin promoter, a rod-specific promoter, a cone-specific promoter, a rhodopsin kinase promoter, a GRK1 promoter, an interphotoreceptor retinoid-binding protein proximal (IRBP) promoter, and an opsin promoter (e.g., a red opsin promoter, a blue opsin promoter, etc.).

In some embodiments, a promoter is a RNA polymerase III (pol III) promoter. Non-limiting examples of pol III promoters include U6 and H1 promoter sequences. In some embodiments, a promoter is a RNA polymerase II (pol II) promoter. Non-limiting examples of pol II promoters include T7, T3, SP6, RSV, and cytomegalovirus promoter sequences.

Aspects of the disclosure relate to gene therapy vectors comprising an isolated nucleic acid as described herein. A gene therapy vector may be a viral vector (e.g., a lentiviral vector, an adeno-associated virus vector, an adenoviral (Ad) vector, etc.), a plasmid, a closed-ended DNA (e.g., ceDNA), a lipid/DNA nanoparticle, etc. In some embodiments, a gene therapy vector is a viral vector. In some embodiments, an expression cassette encoding a minigene is flanked by one or more viral replication sequences, for example lentiviral long terminal repeats (LTRs) or adeno-associated virus (AAV) inverted terminal repeats (ITRs). In some embodiments, a viral vector is a Baculovirus vector.

An isolated nucleic acid described herein may also contain an intron, desirably located between the promoter/ enhancer sequence and the transgene. In some embodiments, an intron is a synthetic or artificial (e.g., heterologous) intron. Examples of synthetic introns include an intron sequence derived from SV-40 (referred to as the SV-40 T intron sequence) and intron sequences derived from chicken beta-actin gene. In some embodiments, a transgene described by the disclosure comprises one or more (1, 2, 3, 4, 5, or more) artificial introns. In some embodiments, the one or more artificial introns are positioned between a promoter and a nucleic acid sequence encoding a transgene.

In some embodiments, the rAAV comprises a posttranscriptional response element. As used herein, the term "posttranscriptional response element" refers to a nucleic acid sequence that, when transcribed, adopts a tertiary structure that enhances expression of a gene. Examples of posttranscriptional regulatory elements include, but are not limited to, woodchuck hepatitis virus posttranscriptional regulatory element (WPRE), mouse RNA transport element (RTE), constitutive transport element (CTE) of the simian retrovirus type 1 (SRV-1), the CTE from the Mason-Pfizer monkey virus (MPMV), and the 5' untranslated region of the human heat shock protein 70 (Hsp70 5'UTR). In some embodiments, the rAAV vector comprises a woodchuck hepatitis virus posttranscriptional regulatory element (WPRE).

In some embodiments, the vector further comprises conventional control elements which are operably linked with elements of the transgene in a manner that permits its transcription, translation and/or expression in a cell transfected with the vector or infected with the virus produced by the disclosure. As used herein, "operably linked" sequences include both expression control sequences that are contiguous with the gene of interest and expression control sequences that act in trans or at a distance to control the gene of interest. Expression control sequences include appropriate transcription initiation, termination, promoter and enhancer sequences; efficient RNA processing signals such as splicing and polyadenylation (polyA) signals; sequences that stabilize cytoplasmic mRNA; sequences that enhance translation efficiency (e.g., Kozak consensus sequence); sequences that enhance protein stability; and when desired, sequences that enhance secretion of the encoded product. A number of expression control sequences, including promoters which are native, constitutive, inducible and/or tissue-specific, are known in the art and may be utilized.

A polyadenylation sequence generally is inserted following the transgene sequences and optionally before a 3' AAV ITR sequence. A rAAV construct useful in the disclosure may also contain an intron, desirably located between the promoter/enhancer sequence and the transgene. One possible intron sequence is derived from SV-40, and is referred to as the SV-40 T intron sequence. Another vector element that may be used is an internal ribosome entry site (IRES). An IRES sequence is used to produce more than one polypeptide from a single gene transcript. An IRES sequence would be used to produce a protein that contain more than one polypeptide chains. Selection of these and other common vector elements are conventional and many such sequences are available [see, e.g., Sambrook et al., and references cited therein at, for example, pages 3.18 3.26 and 16.17 16.27 and Ausubel et al., Current Protocols in Molecular Biology, John Wiley & Sons, New York, 1989].

The isolated nucleic acids of the disclosure may be recombinant adeno-associated virus (AAV) vectors (rAAV vectors). In some embodiments, an isolated nucleic acid as described by the disclosure comprises a region (e.g., a first region) comprising a first adeno-associated virus (AAV)

inverted terminal repeat (ITR), or a variant thereof. The isolated nucleic acid (e.g., the recombinant AAV vector) may be packaged into a capsid protein and administered to a subject and/or delivered to a selected target cell. "Recombinant AAV (rAAV) vectors" are typically composed of, at a minimum, a transgene and its regulatory sequences, and 5' and 3' AAV inverted terminal repeats (ITRs). The transgene may comprise, as disclosed elsewhere herein, one or more regions that encode one or more proteins (e.g., human ABCA4, or a fragment thereof). The transgene may also comprise a region encoding, for example, a miRNA binding site, and/or an expression control sequence (e.g., a poly-A tail).

Generally, ITR sequences are about 145 bp in length. Preferably, substantially the entire sequences encoding the ITRs are used in the molecule, although some degree of minor modification of these sequences is permissible. The ability to modify these ITR sequences is within the skill of the art. (See, e.g., texts such as Sambrook et al., "Molecular Cloning. A Laboratory Manual", 2d ed., Cold Spring Harbor Laboratory, New York (1989); and K. Fisher et al., J Virol., 70:520 532 (1996)). An example of such a molecule employed in the present invention is a "cis-acting" plasmid containing the transgene, in which the selected transgene sequence and associated regulatory elements are flanked by the 5' and 3' AAV ITR sequences. The AAV ITR sequences may be obtained from any known AAV, including presently identified mammalian AAV types. In some embodiments, the isolated nucleic acid (e.g., the rAAV vector) comprises at least one ITR having a serotype selected from AAV1, AAV2, AAV5, AAV6, AAV6.2, AAV7, AAV8, AAV9, AAV10, AAV11, and variants thereof. In some embodiments, the isolated nucleic acid comprises a region (e.g., a first region) encoding an AAV2 ITR. In some embodiments, the isolated nucleic acid further comprises a region (e.g., a second region, a third region, a fourth region, etc.) comprising a second AAV ITR. In some embodiments, the second AAV ITR has a serotype selected from AAV1, AAV2, AAV5, AAV6, AAV6.2, AAV7, AAV8, AAV9, AAV10, AAV11, and variants thereof. In some embodiments, the second AAV ITR is an AAV2 ITR. In some embodiments, the second ITR is a mutant ITR that lacks a functional terminal resolution site (TRS). The term "lacking a terminal resolution site" can refer to an AAV ITR that comprises a mutation (e.g., a sense mutation such as a non-synonymous mutation, or missense mutation) that abrogates the function of the terminal resolution site (TRS) of the ITR, or to a truncated AAV ITR that lacks a nucleic acid sequence encoding a functional TRS (e.g., a ATRS ITR, or ΔITR). Without wishing to be bound by any particular theory, a rAAV vector comprising an ITR lacking a functional TRS produces a self-complementary rAAV vector, for example as described by McCarthy (2008) *Molecular Therapy* 16(10):1648-1656.

Recombinant Adeno-Associated Viruses (rAAVs)

In some aspects, the disclosure provides isolated adeno-associated viruses (AAVs). As used herein with respect to AAVs, the term "isolated" refers to an AAV that has been artificially produced or obtained. Isolated AAVs may be produced using recombinant methods. Such AAVs are referred to herein as "recombinant AAVs". Recombinant AAVs (rAAVs) preferably have tissue-specific targeting capabilities, such that a nuclease and/or transgene of the rAAV will be delivered specifically to one or more predetermined tissue(s). The AAV capsid is an important element in determining these tissue-specific targeting capabilities. Thus, an rAAV having a capsid appropriate for the tissue being targeted can be selected.

Methods for obtaining recombinant AAVs having a desired capsid protein are well known in the art. (See, for example, US 2003/0138772), the contents of which are incorporated herein by reference in their entirety). Typically the methods involve culturing a host cell which contains a nucleic acid sequence encoding an AAV capsid protein; a functional rep gene; a recombinant AAV vector composed of, AAV inverted terminal repeats (ITRs) and a transgene; and sufficient helper functions to permit packaging of the recombinant AAV vector into the AAV capsid proteins. In some embodiments, capsid proteins are structural proteins encoded by the cap gene of an AAV. AAVs comprise three capsid proteins, virion proteins 1 to 3 (named VP1, VP2 and VP3), all of which are transcribed from a single cap gene via alternative splicing. In some embodiments, the molecular weights of VP1, VP2 and VP3 are respectively about 87 kDa, about 72 kDa and about 62 kDa. In some embodiments, upon translation, capsid proteins form a spherical 60-mer protein shell around the viral genome. In some embodiments, the functions of the capsid proteins are to protect the viral genome, deliver the genome and interact with the host. In some aspects, capsid proteins deliver the viral genome to a host in a tissue specific manner.

In some embodiments, an AAV capsid protein is of an AAV serotype selected from the group consisting of AAV2, AAV3, AAV4, AAV5, AAV6, AAV8, AAVrh8, AAV9, and AAV10. In some embodiments, an AAV capsid protein is of a serotype derived from a non-human primate, for example AAVrh8 serotype. In some embodiments, the AAV capsid protein is of a serotype that has tropism for the eye of a subject, for example an AAV (e.g., AAV5, AAV6, AAV6.2, AAV7, AAV8, AAV9, AAVrh.8, AAVrh.10, AAVrh.39 and AAVrh.43) that transduces ocular cells of a subject more efficiently than other AAV capsid proteins. In some embodiments, an AAV capsid protein is of an AAV8 serotype.

The components to be cultured in the host cell to package a rAAV vector in an AAV capsid may be provided to the host cell in trans. Alternatively, any one or more of the required components (e.g., recombinant AAV vector, rep sequences, cap sequences, and/or helper functions) may be provided by a stable host cell which has been engineered to contain one or more of the required components using methods known to those of skill in the art. Most suitably, such a stable host cell will contain the required component(s) under the control of an inducible promoter. However, the required component(s) may be under the control of a constitutive promoter. Examples of suitable inducible and constitutive promoters are provided herein, in the discussion of regulatory elements suitable for use with the transgene. In still another alternative, a selected stable host cell may contain selected component(s) under the control of a constitutive promoter and other selected component(s) under the control of one or more inducible promoters. For example, a stable host cell may be generated which is derived from 293 cells (which contain E1 helper functions under the control of a constitutive promoter), but which contain the rep and/or cap proteins under the control of inducible promoters. Still other stable host cells may be generated by one of skill in the art.

In some embodiments, the disclosure relates to a host cell containing a nucleic acid that comprises a coding sequence encoding a protein (e.g., a MiniABCA4 protein). In some embodiments, the host cell is a mammalian cell (e.g., HEK293 cell) or an insect cell (e.g., SF9 cell). In some embodiments, the disclosure relates to a composition comprising the host cell described above. In some embodiments, the composition comprising the host cell above further comprises a cryopreservative.

The recombinant AAV vector, rep sequences, cap sequences, and helper functions required for producing the rAAV of the disclosure may be delivered to the packaging host cell using any appropriate genetic element (vector). The selected genetic element may be delivered by any suitable method, including those described herein. The methods used to construct any embodiment of this disclosure are known to those with skill in nucleic acid manipulation and include genetic engineering, recombinant engineering, and synthetic techniques. See, e.g., Sambrook et al., Molecular Cloning: A Laboratory Manual, Cold Spring Harbor Press, Cold Spring Harbor, N.Y. Similarly, methods of generating rAAV virions are well known and the selection of a suitable method is not a limitation on the present disclosure. See, e.g., K. Fisher et al., J. Virol., 70:520-532 (1993) and U.S. Pat. No. 5,478,745.

In some embodiments, recombinant AAVs may be produced using the triple transfection method (described in detail in U.S. Pat. No. 6,001,650). Typically, the recombinant AAVs are produced by transfecting a host cell with an recombinant AAV vector (comprising a transgene) to be packaged into AAV particles, an AAV helper function vector, and an accessory function vector. An AAV helper function vector encodes the "AAV helper function" sequences (i.e., rep and cap), which function in trans for productive AAV replication and encapsidation. Preferably, the AAV helper function vector supports efficient AAV vector production without generating any detectable wild-type AAV virions (i.e., AAV virions containing functional rep and cap genes). Non-limiting examples of vectors suitable for use with the present disclosure include pHLP19, described in U.S. Pat. No. 6,001,650 and pRep6cap6 vector, described in U.S. Pat. No. 6,156,303, the entirety of both incorporated by reference herein. The accessory function vector encodes nucleotide sequences for non-AAV derived viral and/or cellular functions upon which AAV is dependent for replication (i.e., "accessory functions"). The accessory functions include those functions required for AAV replication, including, without limitation, those moieties involved in activation of AAV gene transcription, stage specific AAV mRNA splicing, AAV DNA replication, synthesis of cap expression products, and AAV capsid assembly. Viral-based accessory functions can be derived from any of the known helper viruses such as adenovirus, herpesvirus (other than herpes simplex virus type-1), and vaccinia virus.

In some aspects, the disclosure provides transfected host cells. The term "transfection" is used to refer to the uptake of foreign DNA by a cell, and a cell has been "transfected" when exogenous DNA has been introduced inside the cell membrane. A number of transfection techniques are generally known in the art. See, e.g., Graham et al. (1973) Virology, 52:456, Sambrook et al. (1989) Molecular Cloning, a laboratory manual, Cold Spring Harbor Laboratories, New York, Davis et al. (1986) Basic Methods in Molecular Biology, Elsevier, and Chu et al. (1981) Gene 13:197. Such techniques can be used to introduce one or more exogenous nucleic acids, such as a nucleotide integration vector and other nucleic acid molecules, into suitable host cells.

A "host cell" refers to any cell that harbors, or is capable of harboring, a substance of interest. Often a host cell is a mammalian cell. A host cell may be used as a recipient of an AAV helper construct, an AAV minigene plasmid, an accessory function vector, or other transfer DNA associated with the production of recombinant AAVs. The term includes the progeny of the original cell which has been transfected. Thus, a "host cell" as used herein may refer to a cell which has been transfected with an exogenous DNA sequence. It is understood that the progeny of a single parental cell may not necessarily be completely identical in morphology or in genomic or total DNA complement as the original parent, due to natural, accidental, or deliberate mutation.

As used herein, the term "cell line" refers to a population of cells capable of continuous or prolonged growth and division in vitro. Often, cell lines are clonal populations derived from a single progenitor cell. It is further known in the art that spontaneous or induced changes can occur in karyotype during storage or transfer of such clonal populations. Therefore, cells derived from the cell line referred to may not be precisely identical to the ancestral cells or cultures, and the cell line referred to includes such variants.

As used herein, the terms "recombinant cell" refers to a cell into which an exogenous DNA segment, such as DNA segment that leads to the transcription of a biologically-active polypeptide or production of a biologically active nucleic acid such as an RNA, has been introduced.

As used herein, the term "vector" includes any genetic element, such as a plasmid, phage, transposon, cosmid, chromosome, artificial chromosome, virus, virion, etc., which is capable of replication when associated with the proper control elements and which can transfer gene sequences between cells. Thus, the term includes cloning and expression vehicles, as well as viral vectors.

Methods

Methods for delivering a transgene to ocular (e.g., photoreceptors, such as rod cells or cone cells, retinal cells, etc.) tissue or the ear of a subject are provided herein. The methods typically involve administering to a subject an effective amount of a rAAV comprising a nucleic acid for expressing a transgene (e.g., a MiniABCA4 protein) in the subject. An "effective amount" of a rAAV is an amount sufficient to infect a sufficient number of cells of a target tissue in a subject. In some embodiments, a target tissue is ocular (e.g., photoreceptor, retinal, etc.) tissue. In some embodiments, a transgene is delivered to photoreceptor cells or retinal pigmented epithelium (RPE).

An effective amount of a rAAV may be an amount sufficient to have a therapeutic benefit in a subject, e.g., to improve in the subject one or more symptoms of disease, e.g., a symptom of Stargardt disease (e.g., a disease associated with a deletion or mutation of ABCA4 gene). Examples of mutations in ABCA4 gene include mutations resulting in amino acid substitutions G1961E and D2177N in an ABCA4 protein. The effective amount will depend on a variety of factors such as, for example, the species, age, weight, health of the subject, and the ocular tissue to be targeted, and may thus vary among subject and tissue. An effective amount may also depend on the rAAV used.

In certain embodiments, the effective amount of rAAV is $10^{10}$, $10^{12}$, $10^{11}$, $10^{13}$, or $10^{14}$ genome copies per kg. In certain embodiments, the effective amount of rAAV is $10^{10}$, $10^{11}$, $10^{12}$, $10^{13}$, $10^{14}$, or $10^{15}$ genome copies per subject.

Aspects of the disclosure relate to methods for treating Stargardt disease in a subject in need thereof. In some embodiments, a subject is a mammal, for example a human, mouse, rat, dog, cat, non-human primate, etc. In some embodiments, a subject is a human.

As used herein, the term "treating" refers to the application or administration of a composition (e.g., an isolated nucleic acid or rAAV as described herein) to a subject who exhibits one or more signs or symptoms of Stargardt disease (e.g., blurry or distorted vision, inability to see in low light, loss of color vision, one or more mutations in an ABCA4 gene, etc.), with the purpose to cure, heal, alleviate, relieve, alter, remedy, ameliorate, improve, or affect the disorder, the symptom of the disease, or the predisposition toward Stargardt disease.

Alleviating Stargardt disease includes delaying the development or progression of the disease, or reducing disease severity. Alleviating the disease does not necessarily require curative results. As used therein, "delaying" the development of Stargardt disease means to defer, hinder, slow, retard, stabilize, and/or postpone progression of the disease. This delay can be of varying lengths of time, depending on the history of the disease and/or individuals being treated. A method that "delays" or alleviates the development of a disease, or delays the onset of the disease, is a method that reduces probability of developing one or more symptoms of the disease in a given time frame and/or reduces extent of the symptoms in a given time frame, when compared to not using the method. Such comparisons are typically based on clinical studies, using a number of subjects sufficient to give a statistically significant result.

"Development" or "progression" of a disease means initial manifestations and/or ensuing progression of the disease. Development of the disease can be detectable and assessed using standard clinical techniques as well known in the art. However, development also refers to progression that may be undetectable. For purpose of this disclosure, development or progression refers to the biological course of the symptoms. "Development" includes occurrence, recurrence, and onset.

An effective amount may also depend on the mode of administration. For example, targeting an ocular (e.g., photoreceptor, retinal, etc.) tissue by intrastromal administration or subcutaneous injection may require different (e.g., higher or lower) doses, in some cases, than targeting an ocular (e.g., photoreceptor, retinal, etc.) tissue by another method (e.g., systemic administration, topical administration). In some embodiments, intrastromal injection (IS) of rAAV having certain serotypes (e.g., AAV5, AAV6, AAV6.2, AAV7, AAV8, AAV9, AAVrh.8, AAVrh.10, AAVrh.39, and AAVrh.43) mediates efficient transduction of ocular (e.g., corneal, photoreceptor, retinal, etc.) cells. Thus, in some embodiments, the injection is intrastromal injection (IS). In some embodiments, the administration is via injection, optionally subretinal injection or intravitreal injection or suprachoroidal injection. In some embodiments, the injection is topical administration (e.g., topical administration to an eye). In some cases, multiple doses of a rAAV are administered.

The rAAVs may be delivered to a subject in compositions according to any appropriate methods known in the art. The rAAV, preferably suspended in a physiologically compatible carrier (i.e., in a composition), may be administered to a subject, i.e. host animal, such as a human, mouse, rat, cat, dog, sheep, rabbit, horse, cow, goat, pig, guinea pig, hamster, chicken, turkey, or a non-human primate (e.g., Macaque). In some embodiments, a host animal does not include a human.

Delivery of the rAAVs to a mammalian subject may be by, for example, intraocular injection or topical administration (e.g., eye drops). In some embodiments, the intraocular injection comprises intrastromal injection, subconjunctival injection, or intravitreal injection. In some embodiments, the injection is not topical administration. Combinations of administration methods (e.g., topical administration and intrastromal injection) can also be used.

The compositions of the disclosure may comprise an rAAV alone, or in combination with one or more other viruses (e.g., a second rAAV encoding having one or more different transgenes, such as a transgene encoding a different MiniABCA4 protein). In some embodiments, a composition comprises 1, 2, 3, 4, 5, 6, 7, 8, 9, 10, or more different rAAVs each having one or more different transgenes.

In some embodiments, a composition further comprises a pharmaceutically acceptable carrier. Suitable carriers may be readily selected by one of skill in the art in view of the indication for which the rAAV is directed. For example, one suitable carrier includes saline, which may be formulated with a variety of buffering solutions (e.g., phosphate buffered saline).

Other exemplary carriers include sterile saline, lactose, sucrose, calcium phosphate, gelatin, dextran, agar, pectin, peanut oil, sesame oil, and water. The selection of the carrier is not a limitation of the present disclosure.

Optionally, the compositions of the disclosure may contain, in addition to the rAAV and carrier(s), other pharmaceutical ingredients, such as preservatives, or chemical stabilizers. Suitable exemplary preservatives include chlorobutanol, potassium sorbate, sorbic acid, sulfur dioxide, propyl gallate, the parabens, ethyl vanillin, glycerin, phenol, and parachlorophenol. Suitable chemical stabilizers include gelatin and albumin.

The rAAVs are administered in sufficient amounts to transfect the cells of a desired tissue (e.g., ocular tissue, such as photoreceptor, retinal, etc., tissue) and to provide sufficient levels of gene transfer and expression without undue adverse effects. Examples of pharmaceutically acceptable routes of administration include, but are not limited to, direct delivery to the selected organ (e.g., subretinal delivery to the eye), oral, inhalation (including intranasal and intratracheal delivery), intraocular, intravenous, intramuscular, subcutaneous, intradermal, intratumoral, and other parental routes of administration. Routes of administration may be combined, if desired.

The dose of rAAV virions required to achieve a particular "therapeutic effect," e.g., the units of dose in genome copies/per kilogram of body weight (GC/kg), will vary based on several factors including, but not limited to: the route of rAAV virion administration, the level of gene or RNA expression required to achieve a therapeutic effect, the specific disease or disorder being treated, and the stability of the gene or RNA product. One of skill in the art can readily determine a rAAV virion dose range to treat a patient having a particular disease or disorder based on the aforementioned factors, as well as other factors.

An effective amount of an rAAV is an amount sufficient to target infect an animal, target a desired tissue. The effective amount will depend primarily on factors such as the species, age, weight, health of the subject, and the tissue to be targeted, and may thus vary among animal and tissue. For example, an effective amount of the rAAV is generally in the range of from about 1 ml to about 100 ml of solution containing from about $10^9$ to $10^{16}$ genome copies. In some cases, a dosage between about $10^{11}$ to $10^{13}$ rAAV genome copies is appropriate. In certain embodiments, $10^9$ rAAV genome copies is effective to target ocular tissue (e.g., corneal tissue).

In some embodiments, a dose more concentrated than $10^9$ rAAV genome copies is toxic when administered to the eye of a subject. In some embodiments, an effective amount is produced by multiple doses of an rAAV. In some embodiments, a subject is administered one or more immunosuppressive agents (e.g., corticosteroids, methotrexate, cyclosporine A, mycophenolate mofetil, tacrolimus, Rituximab, sirolimus, methylprednisolone, CTLA4Ig, non-depleting CD4 Ab, and T cell-depleting anti-thymocyte gamma-globulin (ATG), etc.) prior to administration of the rAAV.

In some embodiments, a dose of rAAV is administered to a subject no more than once per calendar day (e.g., a 24-hour period). In some embodiments, a dose of rAAV is administered to a subject no more than once per 2, 3, 4, 5, 6, or 7 calendar days. In some embodiments, a dose of rAAV is administered to a subject no more than once per calendar week (e.g., 7 calendar days). In some embodiments, a dose of rAAV is administered to a subject no more than bi-weekly (e.g., once in a two calendar week period). In some embodiments, a dose of rAAV is administered to a subject no more than once per calendar month (e.g., once in 30 calendar days). In some embodiments, a dose of rAAV is administered to a subject no more than once per six calendar months. In some embodiments, a dose of rAAV is administered to a subject no more than once per calendar year (e.g., 365 days or 366 days in a leap year).

In some embodiments, rAAV compositions are formulated to reduce aggregation of AAV particles in the composition, particularly where high rAAV concentrations are present (e.g., ~$10^{13}$ GC/ml or more). Appropriate methods for reducing aggregation of may be used, including, for example, addition of surfactants, pH adjustment, salt concentration adjustment, etc. (See, e.g., Wright F R, et al., Molecular Therapy (2005) 12, 171-178, the contents of which are incorporated herein by reference.)

Formulation of pharmaceutically-acceptable excipients and carrier solutions is well-known to those of skill in the art, as is the development of suitable dosing and treatment regimens for using the particular compositions described herein in a variety of treatment regimens. Typically, these formulations may contain at least about 0.1% of the active compound or more, although the percentage of the active ingredient(s) may, of course, be varied and may conveniently be between about 1 or 2% and about 70% or 80% or more of the weight or volume of the total formulation. Naturally, the amount of active compound in each therapeutically-useful composition may be prepared is such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable.

In some embodiments, rAAVs in suitably formulated pharmaceutical compositions disclosed herein are delivered directly to target tissue, e.g., direct to ocular tissue (e.g., photoreceptor, retinal, etc., tissue) However, in certain circumstances it may be desirable to separately or in addition deliver the rAAV-based therapeutic constructs via another route, e.g., subcutaneously, intrapancreatically, intranasally, parenterally, intravenously, intramuscularly, intrathecally, or orally, intraperitoneally, or by inhalation. In some embodiments, the administration modalities as described in U.S. Pat. Nos. 5,543,158; 5,641,515 and 5,399,363 (each specifically incorporated herein by reference in its entirety) may be used to deliver rAAVs. In some embodiments, a preferred mode of administration is by intravitreal injection or subretinal injection.

The pharmaceutical forms suitable for injectable use include sterile aqueous solutions or dispersions and sterile powders for the extemporaneous preparation of sterile injectable solutions or dispersions. Dispersions may also be prepared in glycerol, liquid polyethylene glycols, and mixtures thereof and in oils. Under ordinary conditions of storage and use, these preparations contain a preservative to prevent the growth of microorganisms. In many cases the form is sterile and fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (e.g., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For administration of an injectable aqueous solution, for example, the solution may be suitably buffered, if necessary, and the liquid diluent first rendered isotonic with sufficient saline or glucose. These particular aqueous solutions are especially suitable for intravenous, intramuscular, subcutaneous and intraperitoneal administration. In this connection, a suitable sterile aqueous medium may be employed. For example, one dosage may be dissolved in 1 ml of isotonic NaCl solution and either added to 1000 ml of hypodermoclysis fluid or injected at the proposed site of infusion, (see for example, "Remington's Pharmaceutical Sciences" 15th Edition, pages 1035-1038 and 1570-1580). Some variation in dosage will necessarily occur depending on the condition of the host. The person responsible for administration will, in any event, determine the appropriate dose for the individual host.

Sterile injectable solutions are prepared by incorporating the active rAAV in the required amount in the appropriate solvent with various of the other ingredients enumerated herein, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

The rAAV compositions disclosed herein may also be formulated in a neutral or salt form. Pharmaceutically-acceptable salts, include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. Upon formulation, solutions will be administered in a manner compatible with the dosage formulation and in such amount as is therapeutically effective. The formulations are easily administered in a variety of dosage forms such as injectable solutions, drug-release capsules, and the like.

As used herein, "carrier" includes any and all solvents, dispersion media, vehicles, coatings, diluents, antibacterial and antifungal agents, isotonic and absorption delaying agents, buffers, carrier solutions, suspensions, colloids, and the like. The use of such media and agents for pharmaceutical active substances is well known in the art. Supplementary active ingredients can also be incorporated into the compositions. The phrase "pharmaceutically-acceptable" refers to molecular entities and compositions that do not produce an allergic or similar untoward reaction when administered to a host.

Delivery vehicles such as liposomes, nanocapsules, microparticles, microspheres, lipid particles, vesicles, and the like, may be used for the introduction of the compositions of the present disclosure into suitable host cells. In particular, the rAAV vector delivered transgenes may be formulated for delivery either encapsulated in a lipid particle, a liposome, a vesicle, a nanosphere, or a nanoparticle or the like.

Such formulations may be preferred for the introduction of pharmaceutically acceptable formulations of the nucleic acids or the rAAV constructs disclosed herein. The formation and use of liposomes is generally known to those of skill in the art. Recently, liposomes were developed with improved serum stability and circulation half-times (U.S. Pat. No. 5,741,516). Further, various methods of liposome and liposome like preparations as potential drug carriers have been described (U.S. Pat. Nos. 5,567,434; 5,552,157; 5,565,213; 5,738,868 and 5,795,587).

Liposomes have been used successfully with a number of cell types that are normally resistant to transfection by other procedures. In addition, liposomes are free of the DNA length constraints that are typical of viral-based delivery systems. Liposomes have been used effectively to introduce genes, drugs, radiotherapeutic agents, viruses, transcription factors and allosteric effectors into a variety of cultured cell lines and animals. In addition, several successful clinical trials examining the effectiveness of liposome-mediated drug delivery have been completed.

Liposomes are formed from phospholipids that are dispersed in an aqueous medium and spontaneously form multilamellar concentric bilayer vesicles (also termed multilamellar vesicles (MLVs). MLVs generally have diameters of from 25 nm to 4 µm. Sonication of MLVs results in the formation of small unilamellar vesicles (SUVs) with diameters in the range of 200 to 500 Å, containing an aqueous solution in the core.

Alternatively, nanocapsule formulations of the rAAV may be used. Nanocapsules can generally entrap substances in a stable and reproducible way. To avoid side effects due to intracellular polymeric overloading, such ultrafine particles (sized around 0.1 µm) should be designed using polymers able to be degraded in vivo. Biodegradable polyalkyl-cyanoacrylate nanoparticles that meet these requirements are contemplated for use.

EXAMPLES

Example 1: miniABC4 Gene Constructs MG-1 to MG-6

This example describes identification and production of AAV vectors (and rAAVs) having one or more domains of ABCA4 (e.g., ABCA4 minigenes and gene products thereof, "MiniABCA4") that retain function (e.g., partial ABCA4 function) in photoreceptors. Expression and stability of miniABCA4 proteins is tested by expressing them as MYC-tagged versions of the proteins in cultured HEK293 cells. The versions that show optimal expression and stability are injected in vivo to Abca4$^{-/-}$ mice. Viral particles are pseudotyped (e.g., AAV2/8) and expression is driven by promoters that predominantly target photoreceptors. MiniABCA4 constructs were administered using subretinal injection. FIG. 1 and SEQ ID NOs: 3-8 show embodiments of MiniABCA4 constructs MG-1 through MG-6. SEQ ID NOs: 9-14 show embodiments of MiniABCA4 proteins for MG-1 through MG-6.

Figure 2:
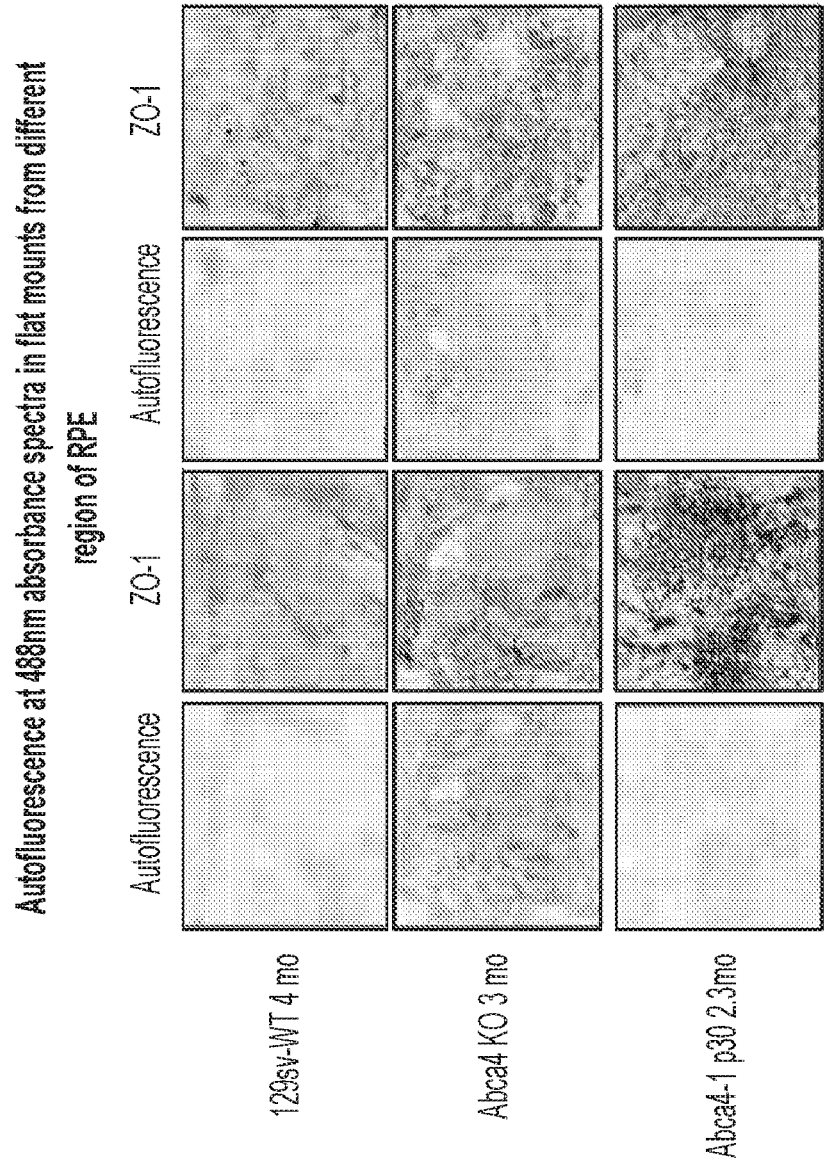
FIG. 2 is a graph showing RPE autofluorescence analysis of wild type ABCA4 knock-out mice (Abca KO), and ABCA4 knock-out mice injected with miniABCA4-1 (which corresponds to the MG-4 construct described in FIG. 1) by fluorescence microscopy. ZO-1 was used as cell marker.

Reduction of Retinal Pigment Epithelium (RPE) Background Autofluorescence was used as a surrogate assay to test the efficacy of miniABCA4 candidates. Abca4$^{-/-}$ mice were injected with Abca4-1 (MG-1) constructs 30 days postnatal, and the RPE autoflorescence was measured by fluorescent microscopy. The RPE cells were stained with a marker, ZO-1. Representative data is shown in FIG. 2. As compared to the wild type control, the Abca4$^{-/-}$ mouse showed higher RPE autofluorescence at 488 nM wavelength at 4 months of age. Injection of miniABCA4-1 resulted in a significant decline in the autofluorescence at 488 nM wavelength, indicating that miniABCA4-1 had rescue effects.

Figure 3:
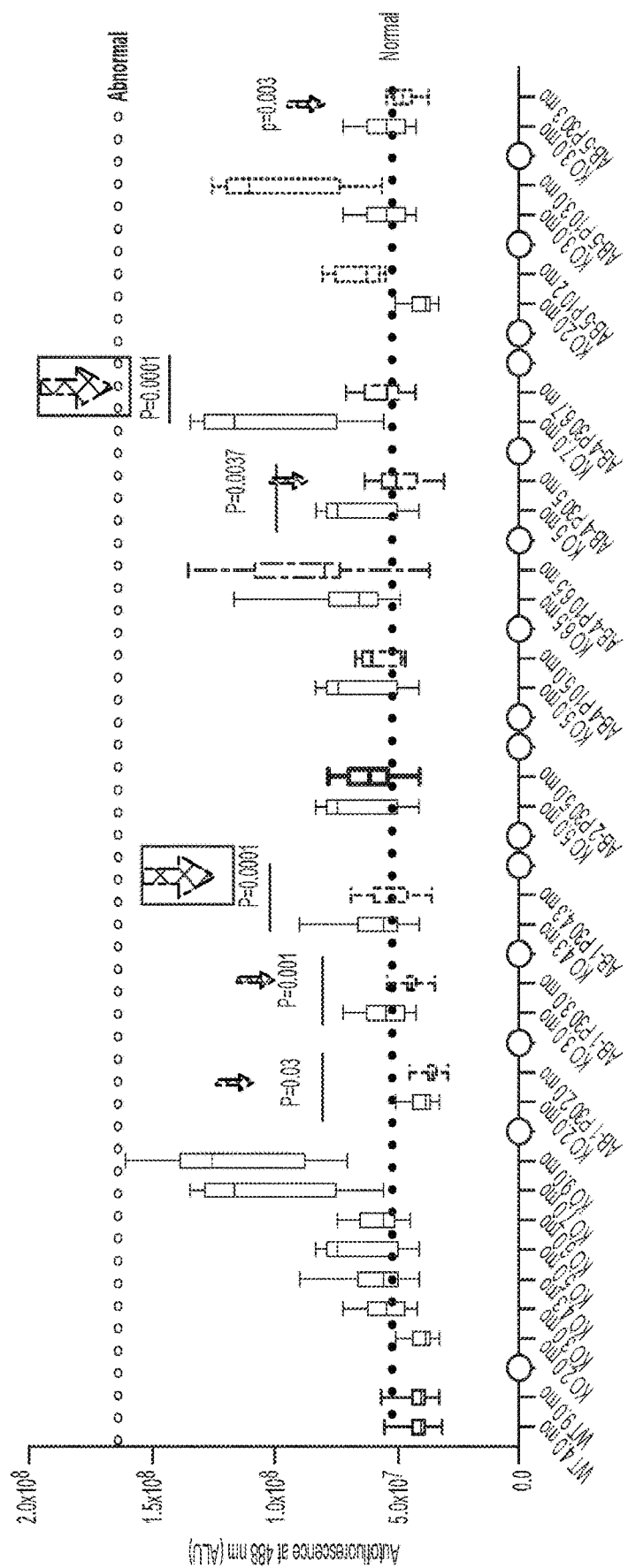
FIG. 3 is a graph showing quantification of RPE autofluorescence analysis of uninjected and injected ABCA4 knock-out mice at different ages. Arrows point to ABCA4 minigene versions that significantly improved autofluorescence. The injections were performed at day P10 or P30. The analyses were performed at the ages indicated with each minigene. Injections at P30 showed highly significant improvement as compared to P10 injections. In this graph, AB-1 corresponds to MG-1, AB-2 corresponds to MG-2, AB-5 corresponds to MG-5.

Other ABCA4 minigene constructs were tested using the RPE autofluorescence assay, and the results were quantified in FIG. 3. Abca4$^{-/-}$ mice were injected with miniABCA4-1 (MG-1), miniABCA4-2 (MG-2), miniABCA4-4 (MG-4), or miniABCA4-5 (MG-5). The injection was done either 10 days or 30 days postnatal (P10 or P30), and RPE autofluorescence was measured at the indicated time of age on the graph. Data indicate that several miniABCA4 constructs significantly reduced RPE autofluorescence compared to Abca4$^{-/-}$ mice not receiving the injections, and that injections at P30 resulted in better improvement of RPE autofluorescence compared to injections at P10.

Example 2: miniABC4 Gene Constructs MG-7 to MG-11

Figure 4:
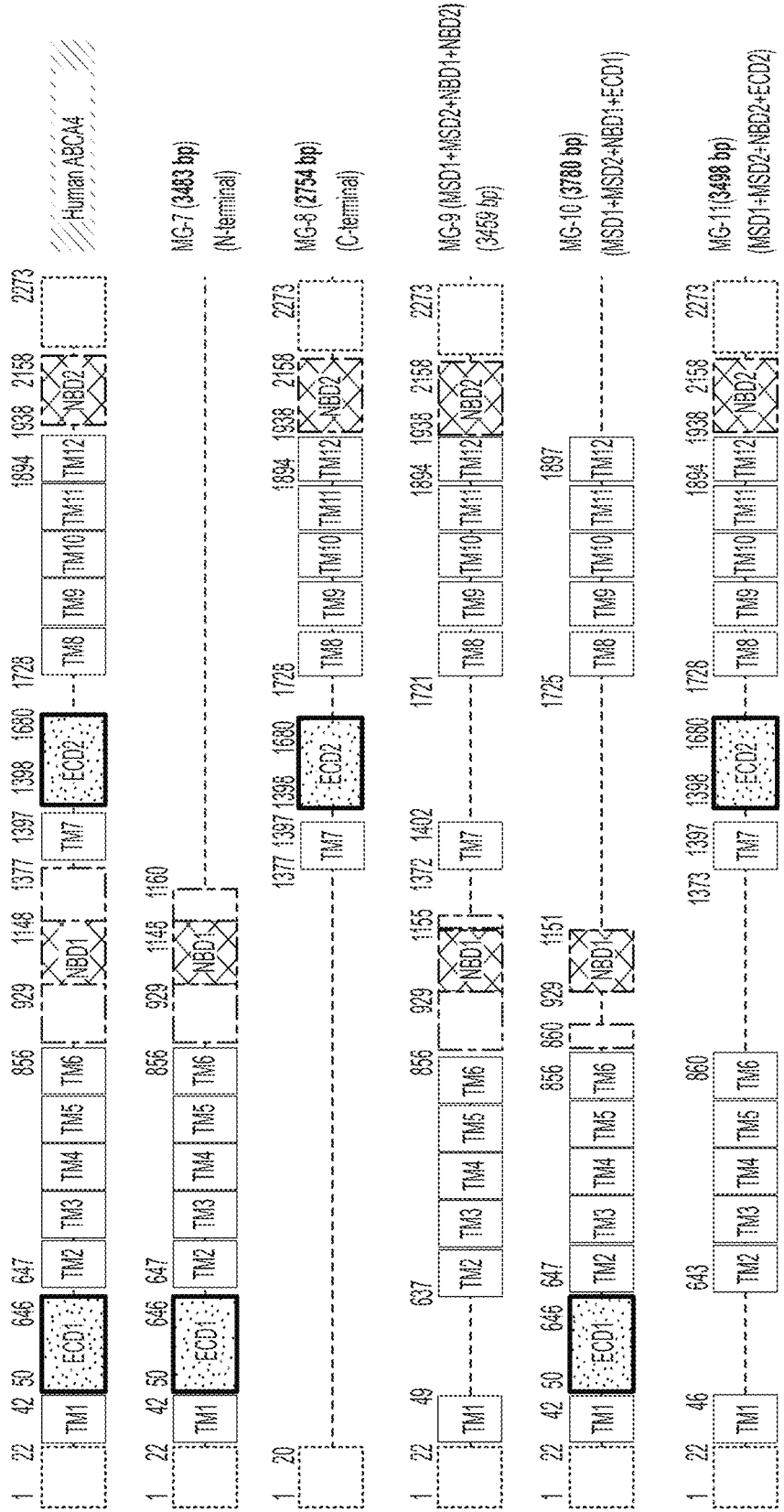
FIG. 4 is a schematic of several embodiments of Mini-ABCA4 constructs. MG-7, MG-8, MG-9, MG-10, and MG-11, having amino acid sequences corresponding to SEQ ID NOs: 20-24, are shown.
Figure 5:
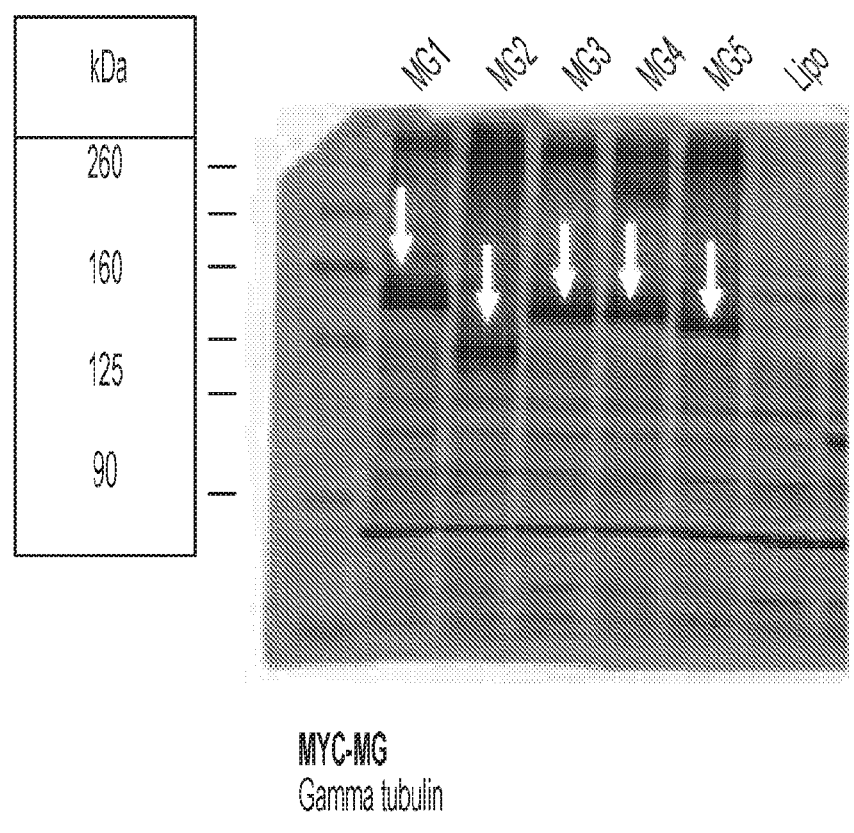
FIG. 5 is an immunoblot showing expression of the MiniABCA4 shown in FIG. 4 in HEK cells. Arrows indicate the expected bands. Lipo shows the cells transfected with the vehicle only.

This example describes additional ABCA4 minigene designs, referred to as MG-7 through MG-11, and production of AAV vector (and rAAVs) expressing these ABCA4 minigenes. Expression and stability of miniABCA4 proteins were tested by expressing them as MYC-tagged versions of the proteins in cultured HEK293 cells (FIG. 5). Tubulin was used as a loading control. FIG. 4 and SEQ ID NOs: 15-19 show embodiments of MiniABCA4 constructs MG-7 through MG-11. SEQ ID NOs: 20-24 show embodiments of MiniABCA4 proteins for MG-7 through MG-11.

Sequences

In some embodiments, an isolated nucleic acid or vector (e.g., rAAV vector) described by the disclosure comprises or consists of a sequence set forth in any one of SEQ ID NOs: 3-8 and 15-19. In some embodiments, an isolated nucleic acid or vector (e.g., rAAV vector) described by the disclosure comprises or consists of a sequence that is complementary (e.g., the complement of) a sequence set forth in any one of SEQ ID NOs: 3-8 and 15-19. In some embodiments, an isolated nucleic acid or vector (e.g., rAAV vector) described by the disclosure comprises or consists of a sequence that is a reverse complement of a sequence set forth in any one of SEQ ID NOs: 3-8 and 15-19. In some embodiments, an isolated nucleic acid or vector (e.g., rAAV vector) described by the disclosure comprises or consists of a portion of a sequence set forth in any one of SEQ ID NOs: 3-8 and 15-19. A portion may comprise at least 25%, 50%, 60%, 70%, 80%, 90%, 95%, or 99% of a sequence set forth in any one of SEQ ID NOs: 3-8 and 15-19. In some embodiments, a nucleic acid sequence described by the disclosure is a nucleic acid sense strand (e.g., 5' to 3' strand), or in the context of a viral sequences a plus (+) strand. In some embodiments, a nucleic acid sequence described by the disclosure is a nucleic acid antisense strand (e.g., 3' to 5' strand), or in the context of viral sequences a minus (−) strand.

EQUIVALENTS

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "about" and "substantially" preceding a numerical value represent ±10% of the recited numerical value.

What is claimed is:

1. An isolated nucleic acid comprising a transgene having a nucleic acid sequence encoding a ABCA4 protein, wherein the ABCA4 protein comprises the amino acid sequence as set forth in any one of SEQ ID NOs: 9-14 and 20-24, wherein the ABCA4 protein does not comprise the amino acid sequence set forth in SEQ ID NO: 2.

2. The isolated nucleic acid of claim 1, wherein the transgene further comprises a promoter operably linked to the nucleic acid sequence encoding the ABCA4 protein.

3. The isolated nucleic acid of claim 2, wherein the promoter is a constitutive promoter, inducible promoter, or a tissue-specific promoter.

4. The isolated nucleic acid of claim 1, wherein the transgene is flanked by adeno-associated virus (AAV) inverted terminal repeats (ITRs).

5. The isolated nucleic acid of claim 4, wherein at least one of the ITRs is an AAV2 ITR.

6. The isolated nucleic acid of claim 4, wherein at least one ITR lacks a terminal resolution site.

7. A vector comprising the isolated nucleic acid of claim 1.

8. A host cell comprising the isolated nucleic acid of claim 1.

9. A recombinant adeno-associated virus (rAAV) comprising:
   (i) the isolated nucleic acid of claim 1; and
   (ii) an AAV capsid protein.

10. The rAAV of claim 9, wherein the capsid protein has a tropism for ocular cells.

11. The rAAV of claim 9, wherein the rAAV is formulated for delivery to the eye.

12. A composition comprising the isolated nucleic acid of claim 1, and a pharmaceutically acceptable excipient.

13. The isolated nucleic acid of claim 1, wherein the nucleic acid sequence encoding the ABCA4 protein comprises the sequence set forth in any one of SEQ ID NOs: 3-8 and 15-19.

14. The isolated nucleic acid of claim 3, wherein the tissue-specific promoter is a photoreceptor-specific promoter.

15. The vector of claim 7, wherein the vector is a plasmid DNA, or closed-ended DNA, or a viral vector.

16. The host cell of claim 8, wherein the cell is a mammalian cell, bacterial cell, yeast cell, or insect cell.

17. The rAAV of claim 10, wherein the capsid protein is AAV8 capsid protein.

18. The rAAV of claim 11, wherein the rAAV is formulated for delivery to photoreceptor cells or retinal pigmented epithelium (RPE).

\* \* \* \* \*